US012802131B2

(12) United States Patent
Hara

(10) Patent No.: US 12,802,131 B2
(45) Date of Patent: Nov. 17, 2026

(54) CONNECTING AN APPLICATION WITH A DIGITAL ASSET HOLDER TO PROCESS A BLOCKCHAIN TRANSACTION

(71) Applicant: GOOGLE LLC, Mountain View, CA (US)

(72) Inventor: Kentaro Hara, Tokyo (JP)

(73) Assignee: GOOGLE LLC, Mountain View, CA (US)

( * ) Notice: Subject to any disclaimer, the term of this patent is extended or adjusted under 35 U.S.C. 154(b) by 68 days.

(21) Appl. No.: 18/315,834

(22) Filed: May 11, 2023

(65) Prior Publication Data

US 2023/0367662 A1 Nov. 16, 2023

Related U.S. Application Data

(60) Provisional application No. 63/366,177, filed on Jun. 10, 2022, provisional application No. 63/364,586, filed on May 12, 2022.

(51) Int. Cl.
*G06Q 40/04* (2012.01)
*G06F 3/0483* (2013.01)
(Continued)

(52) U.S. Cl.
CPC ........... *G06Q 40/04* (2013.01); *G06F 3/0483* (2013.01); *G06F 9/451* (2018.02); *G06F 9/542* (2013.01);
(Continued)

(58) Field of Classification Search
CPC .. G06Q 40/04; G06Q 20/3829; G06Q 20/389; G06Q 30/0641; G06F 3/0483;
(Continued)

(56) References Cited

U.S. PATENT DOCUMENTS 9,891,727 B2 * 2/2018 Smus .................... G06F 3/0488
10,613,713 B2 * 4/2020 Ozuysal .................... G06F 9/54
(Continued)

FOREIGN PATENT DOCUMENTS

CN 101078989 A * 11/2007
CN 111177614 A * 5/2020 ........... G06F 16/972
(Continued)

OTHER PUBLICATIONS

International Search Report and Written Opinion for PCT Application No. PCT/US2023/022071, mailed on Jul. 20, 2023, 13 pages.

*Primary Examiner* — Yingying Zhou
(74) *Attorney, Agent, or Firm* — BRAKE HUGHES BELLERMANN LLP

(57) ABSTRACT

According to an aspect, a method includes receiving, via an application programming interface of an application, an authenticated transaction request to add a transaction to a blockchain network from a digital asset holder that manages a private key to access data on the blockchain network, transmitting, by the application, the authenticated transaction request to the blockchain network, receiving, by the application, a transaction response from the blockchain network, the transaction response including a transaction identifier of the transaction added to the blockchain network, and transmitting, via the application programming interface of the application, a notification message to the digital asset holder, the notification message including the transaction identifier.

17 Claims, 45 Drawing Sheets

(51) Int. Cl.

| | |
|---|---|
| ***G06F 9/451*** | (2018.01) |
| ***G06F 9/54*** | (2006.01) |
| ***G06Q 20/38*** | (2012.01) |
| ***H04L 9/32*** | (2006.01) |

(52) U.S. Cl.
CPC .......... *G06F 9/547* (2013.01); *G06Q 20/3829* (2013.01); *G06Q 20/389* (2013.01); *H04L 9/3213* (2013.01)

(58) Field of Classification Search
CPC .......... G06F 9/451; G06F 9/542; G06F 9/547; G06F 9/541; H04L 9/3213; H04L 2209/56; H04L 9/50
See application file for complete search history.

(56) References Cited

U.S. PATENT DOCUMENTS

| | | | | |
|---|---|---|---|---|
| 10,726,401 | B2 * | 7/2020 | Hertel | G06Q 30/0222 |
| 10,861,095 | B1 | 12/2020 | Koch et al. | |
| 11,164,251 | B1 | 11/2021 | Skala et al. | |
| 11,182,467 | B1 | 11/2021 | Medina | |
| 11,250,493 | B2 * | 2/2022 | Isaacson | G06Q 20/3674 |
| 11,558,344 | B1 | 1/2023 | Pezeshki et al. | |
| 11,868,996 | B1 * | 1/2024 | Collison | G06Q 20/102 |
| 2008/0209514 | A1 * | 8/2008 | L'Heureux | G06F 21/105 726/3 |
| 2014/0372229 | A1 | 12/2014 | Huang et al. | |
| 2015/0262176 | A1 | 9/2015 | Langschaedel et al. | |
| 2017/0102845 | A1 | 4/2017 | Ozuysal et al. | |
| 2019/0299105 | A1 | 10/2019 | Knight et al. | |
| 2019/0356701 | A1 | 11/2019 | Prabhu et al. | |
| 2020/0005284 | A1 | 1/2020 | Vijayan | |
| 2020/0219094 | A1 | 7/2020 | Dikhit et al. | |
| 2021/0056541 | A1 | 2/2021 | Kim | |
| 2021/0119807 | A1 | 4/2021 | Chen et al. | |
| 2021/0398211 | A1 | 12/2021 | Maathur et al. | |
| 2022/0016529 | A1 | 1/2022 | Meilich et al. | |
| 2022/0076289 | A1 | 3/2022 | Williams Tubay | |
| 2022/0237597 | A1 | 7/2022 | Petersen et al. | |
| 2022/0405748 | A1 * | 12/2022 | Coughlan | G06Q 20/38215 |
| 2023/0033361 | A1 * | 2/2023 | Mitra | G06Q 20/0655 |
| 2023/0101940 | A1 | 3/2023 | Filter et al. | |
| 2023/0169826 | A1 | 6/2023 | Higgins et al. | |
| 2023/0195284 | A1 | 6/2023 | Wani et al. | |
| 2023/0214819 | A1 | 7/2023 | Tham et al. | |
| 2023/0274283 | A1 * | 8/2023 | Kryvoshei | H04L 9/3213 |
| 2023/0281607 | A1 * | 9/2023 | Kim | G06Q 20/401 705/67 |
| 2023/0351341 | A1 | 11/2023 | Lyren | |

FOREIGN PATENT DOCUMENTS

| | | | | |
|---|---|---|---|---|
| CN | 113254367 | A * | 8/2021 | G06F 13/102 |
| JP | 2020523716 | A | 8/2020 | |
| JP | 2021022160 | A | 2/2021 | |
| KR | 20200015517 | A | 2/2020 | |
| WO | 2020049442 | A1 | 3/2020 | |
| WO | 2021064504 | A1 | 4/2021 | |
| WO | 2021262090 | A1 | 12/2021 | |

* cited by examiner

1000

CONNECTING AN APPLICATION WITH A DIGITAL ASSET HOLDER TO PROCESS A BLOCKCHAIN TRANSACTION

RELATED APPLICATIONS

This application is a non-provisional of, and claims priority to, U.S. Provisional Application No. 63/364,586, filed on May 12, 2022, and to U.S. Provisional Application No. 63/366,177, filed on Jun. 10, 2022, the disclosures of which are incorporated herein in their entirety.

BACKGROUND

A user may enable a third-party extension to a web browser, where the third-party extension is used to process a blockchain transaction on web content rendered by the web browser. A native application on a mobile computing device may be used to process a blockchain transaction.

SUMMARY

This disclosure relates to connecting an application (e.g., a browser application) with a digital asset holder to process a blockchain transaction. For example, the application may operate as an intermediary between a user's digital asset holder and web content that can create blockchain transactions. The application may define one or more application programming interface(s) (API(s)) configured to communicate with the user's digital asset holder to authenticate a blockchain transaction and to communicate with a blockchain network to commit the blockchain transaction to the blockchain network. In some examples, this disclosure relates to customizing a browser application with blockchain data such as customizing a browser setting and/or a user interface of the browser application (e.g., setting a non-fungible token (NFT) as a profile image, setting an NFT as a background image, adjusting a color scheme or display aspect, shuffling through the user's NFTs as a background image or in an interface object, etc.).

In some examples, this disclosure relates to an application (e.g., a browser application) for managing inter-ledger blockchain transactions. For example, the application may function as an intermediary for transactions involving different payment networks (e.g., for inter-ledger payments on the blockchain network). For example, a buyer entity may have digital assets of a first type in their digital asset holder, but a seller entity may require digital assets of a second type. The application may facilitate conversion of a transactional amount of digital assets from the first type to the second type (e.g., by communicating with a digital asset exchange), and, after being converted, may communicate with a blockchain network to commit a transaction with the digital assets of the second type to the blockchain network. In some examples, the disclosure relates to registering a default digital assets holder with an application (e.g., a browser application). For example, a transaction can be initiated on web content or with an application other than a digital asset holder, where, in some examples, the application can communicate with the default digital asset holder to authenticate and commit a transaction to the blockchain network.

According to an aspect, a method includes receiving, via an application programming interface of an application, an authenticated transaction request to add a transaction to a blockchain network from a digital asset holder that manages a private key to access data on the blockchain network, transmitting, by the application, the authenticated transaction request to the blockchain network, receiving, by the application, a transaction response from the blockchain network, the transaction response including a transaction identifier of the transaction added to the blockchain network, and transmitting, via the application programming interface of the application, a notification message to the digital asset holder, the notification message including the transaction identifier.

According to an aspect, an apparatus includes at least one processor, and a non-transitory computer-readable medium storing executable instructions that when executed by the at least one processor cause the at least one processor to receive, via an application programming interface of a browser application, an authenticated transaction request to add a transaction to a blockchain network from a digital asset holder that manages a private key to access data on the blockchain network, transmit, by the browser application, the authenticated transaction request to the blockchain network, receive, by the browser application, a transaction response from the blockchain network, the transaction response including a transaction identifier of the transaction added to the blockchain network, and transmit, via the application programming interface of the browser application, a notification message to the digital asset holder, the notification message including the transaction identifier.

According to an aspect, a non-transitory computer-readable medium storing executable instructions that when executed by at least one processor cause the at least one processor to execute operations, the operations including rendering web content having a user-selectable item to institute a transaction on a blockchain network, in response to receiving a selection of the user-selectable item, receiving, by a browser application, an authenticated transaction request to add the transaction to the blockchain network from a digital asset holder that manages a private key to access data on the blockchain network, transmitting, by the browser application, the authenticated transaction request to the blockchain network, receiving, by the browser application, a transaction response from the blockchain network, the transaction response including a transaction identifier of the transaction added to the blockchain network, and transmitting, by the browser application, a notification message to the digital asset holder, the notification message including the transaction identifier.

According to an aspect, a method includes obtaining, by a browser application, an identifier associated with a token stored on a blockchain network, retrieving, by the browser application, digital data of the token using the identifier, and customizing a user interface of the browser application using the digital data of the token.

According to an aspect, an apparatus includes at least one processor, and a non-transitory computer-readable medium storing executable instructions that when executed by the at least one processor cause the at least one processor to connect a browser application to a digital asset holder storing a private key for enabling a transaction on a blockchain network, the digital asset holder identifying a token stored on the blockchain network, retrieve, by the browser application, digital data of the token, and customize a user interface of the browser application using the digital data of the token.

According to an aspect, a non-transitory computer-readable medium storing executable instructions that when executed by at least one processor cause the at least one processor to execute operations, where the operations include obtaining, by a browser application, an identifier associated with a token stored on a blockchain network, retrieving, by the browser application, digital data of the token using the identifier, and customizing a user interface of the browser application using the digital data of the token.

According to an aspect, a method includes receiving, by an application executable by a computing device, transaction information for completing a blockchain transaction with a requesting party, the transaction information specifying a first type of digital assets and a transaction amount, providing an interface on the computing device for receiving selection of a second type of digital assets associated with a digital asset holder, transmitting, by the application, a conversion request to a digital asset exchange, the conversion request configured to cause the digital asset exchange to convert the transaction amount of a user's digital assets in the digital asset holder from the second type of digital assets to the first type of digital assets, and transmitting, by the application, a transaction request to a blockchain network to initiate completion of the blockchain transaction.

According to an aspect, a system includes at least one processor, and a non-transitory computer-readable medium storing executable instructions that when executed by the at least one processor cause the at least one processor to receive transaction information for completing a blockchain transaction with a requesting party, the transaction information specifying a first type of digital assets, a transaction amount, and a shared address of a first digital asset holder associated with the requesting party, provide an interface on a computing device for receiving selection of a second type of digital assets associated with a second digital asset holder associated with a user of the computing device, transmit a conversion request to a digital asset exchange, the conversion request configured to cause the digital asset exchange to convert the transaction amount of a user's digital assets in the second digital asset holder from the second type of digital assets to the first type of digital assets, and transmit a transaction request to a blockchain network to associate the transaction amount with the first digital asset holder.

According to an aspect, a non-transitory computer-readable medium storing executable instructions that when executed by at least one processor cause the at least one processor to operations, where the operations include receiving, by a browser application executable by a computing device, transaction information for completing a blockchain transaction with a requesting party, the transaction information specifying a first type of digital assets and a transaction amount, providing, by the browser application, an interface on the computing device for receiving selection of a second type of digital assets associated with a digital asset holder, transmitting, by the browser application, a conversion request to a digital asset exchange, the conversion request configured to cause the digital asset exchange to convert the transaction amount of a user's digital assets in the digital asset holder from the second type of digital assets to the first type of digital assets, and transmitting, by the browser application, a transaction request to a blockchain network to initiate completion of the blockchain transaction.

According to an aspect, a method includes detecting, by an operating system of a computing device, a blockchain transaction request from an application, determining, in response to the blockchain transaction request, whether a digital asset holder is registered as a default digital asset holder, in response to the digital asset holder being determined as registered as the default digital asset holder, transferring, from the application to the default digital asset holder, an intent request to process a blockchain transaction, and transferring an intent response from the default digital asset holder to the application, the intent response identifying a result of the blockchain transaction.

According to an aspect, a system includes at least one processor and a non-transitory computer-readable medium storing executable instructions that, when executed by the at least one processor, cause the at least one processor to detect a blockchain transaction request from an application or web content determine, in response to the blockchain transaction request, whether a digital asset holder is registered as a default digital asset holder, in response to determining the digital asset holder is not registered as the default digital asset holder, render an interface on the computing device, the interface configured to receive a user selection of the digital asset holder as the default digital asset holder, and, in response to receiving the user selection of the digital asset holder, update a setting storage that identifies the digital asset holder as the default digital asset holder.

According to an aspect, a non-transitory computer-readable medium storing executable instructions that when executed by at least one processor cause the at least one processor to execute operations, the operations including detecting, by an operating system of a computing device, a blockchain transaction request from an application, determining, in response to the blockchain transaction request, whether a digital asset holder is registered as a default digital asset holder, in response to the digital asset holder not being determined as registered as the default digital asset holder, rendering an interface on a display of the computing device, the interface configured to receive a user selection of the digital asset holder as the default digital asset holder, and, in response to the digital asset holder being determined as registered as the default digital asset holder, transferring, from the application to the default digital asset holder, an intent request to add a blockchain transaction to a blockchain network.

According to an aspect, a method includes detecting, by a device application programming interface, a blockchain transaction request from web content, determining, in response to the blockchain transaction request, whether a digital asset holder is registered as a default digital asset holder, and, in response to the digital asset holder being determined as registered as the default digital asset holder, transmitting, from the device application programming interface to the default digital asset holder, an intent request to process a blockchain transaction.

According to an aspect, a system includes at least one processor, and a non-transitory computer-readable medium storing executable instructions that when executed by the at least one processor cause the at least one processor to detect, by a device application programming interface, a blockchain transaction request from web content, determine, in response to the blockchain transaction request, whether a digital asset holder is registered as a default digital asset holder, in response to the digital asset holder not being determined as registered as the default digital asset holder, render an interface on a display of the computing device, the interface configured to receive a user selection of the digital asset holder as the default digital asset holder, and, in response to the digital asset holder being determined as registered as the default digital asset holder, transmit, from the device application programming interface to the default digital asset holder, an intent request to process a blockchain transaction.

According to an aspect, a non-transitory computer-readable medium stores executable instructions that cause the at least one processor to execute operations, the operations including detecting, by a device application programming interface, a blockchain transaction request from web content, determining, in response to the blockchain transaction request, whether a digital asset holder is registered as a default digital asset holder, and, in response to the digital asset holder being determined as registered as the default digital asset holder, transmitting, from the device application programming interface to the default digital asset holder, an intent request to process a blockchain transaction.

The details of one or more implementations are set forth in the accompanying drawings and the description below. Other features will be apparent from the description and drawings, and from the claims.

DETAILED DESCRIPTION

Figure 1:
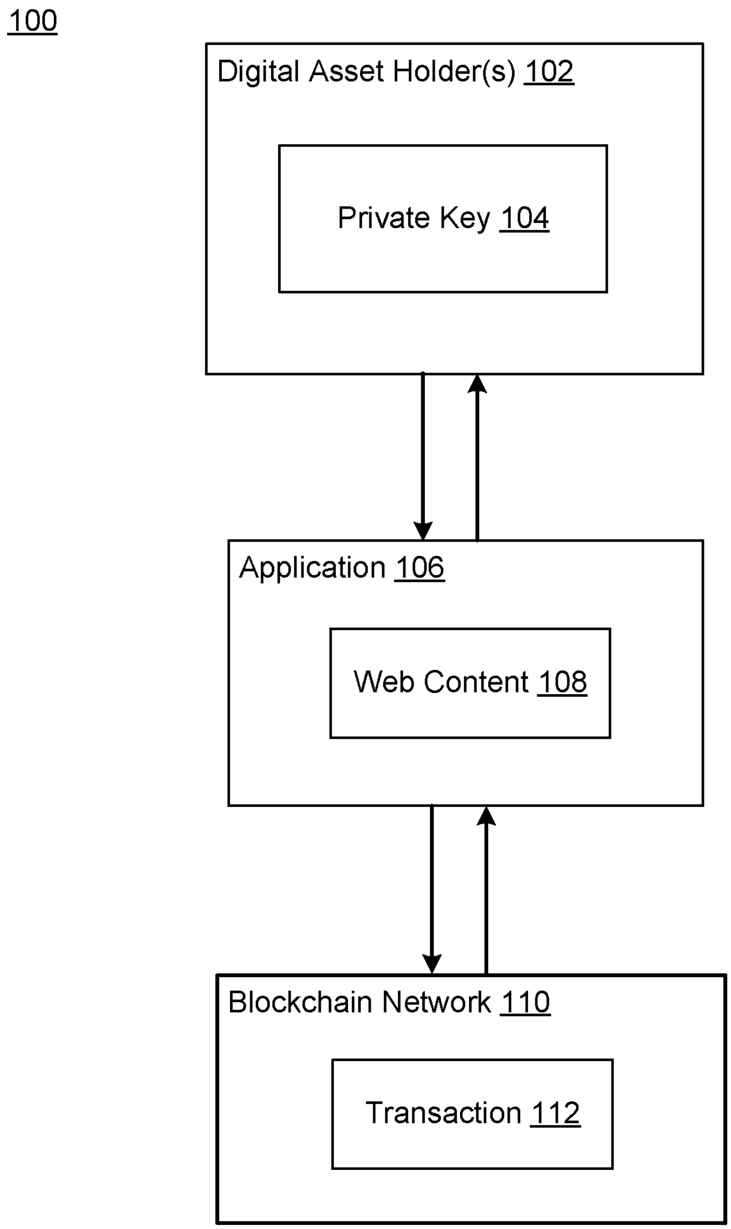
FIG. 1 illustrates a system for connecting an application with a digital asset holder to process a blockchain transaction according to an aspect.

This disclosure relates to connecting an application with a digital asset holder. The digital asset holder stores and manages a user's private key for enabling blockchain transactions to be processed on a blockchain network. In some examples, the application is a first application, and the digital asset holder is a second application. In some examples, the application is a browser application. In some examples, the application is a browser engine. In some examples, the application is a non-browser application. In some examples, the application is an operating system. In some examples, the digital asset holder may be referred to as a crypto-wallet. The digital asset holder may be an extension to the browser application, a native application, a server application, a web application, or generally any type of application that stores a user's private key for enabling blockchain transactions. In some examples, the digital asset holder is a third-party digital asset holder, e.g., an application that is not developed or managed by the first application.

On some computing devices (e.g., laptops, desktops, etc.), executing a blockchain transaction from web content is limited to the available (enabled) extensions. For example, a conventional browser application may be limited to certain blockchain processing providers that provide a web extension. In other words, under conventional methods there may be incompatibilities between a user's digital asset holder and web content. However, the techniques discussed herein provide a technical solution in which the application (e.g., the browser application) operates as an intermediary between a user's digital asset holder and web content that can create a blockchain transaction, which may enable any digital asset holder (e.g., any third-party digital asset holder) to connect to the browser application to process a blockchain transaction. Although some examples recite the use of a browser application as the first application, the embodiments may also encompass other types of applications such as non-browser based applications and/or operating systems.

On some computing devices (e.g., smartphones, tablets, etc.), extensions to a browser application may be limited or not allowed. Therefore, on such devices the user is directed from the browser to another application (e.g., a crypto-wallet based application) to process the blockchain transaction. Put another way, the configuration of the user's device may force a user to switch applications (e.g., from a browser to an installed application) to process a blockchain transaction. However, the techniques discussed herein provide a technical solution that uses the browser application as an intermediary between the web content and the digital asset holder, where the user is not directed to another application for processing the blockchain transaction, thereby keeping the user within the application that provided the web content. This technical solution has the technical effect of reducing the number of interactions a user has with the computing device to process a blockchain transaction. In some examples, the techniques discussed herein provide a technical solution in which an application developer does not have to develop code (e.g., low level instructions) to communicate with the blockchain network to process blockchain transactions, where the browser application provides the functionality to communicate with the blockchain network and to notify the digital asset holder and the website of the result.

The browser application may define one or more application programming interfaces (APIs) (e.g., natively or through a JavaScript library) that connect the blockchain network to the user's digital asset holder such that the browser application can process at least a portion of the operations to complete a transaction on the blockchain network. A user may use an application (e.g., a browser application, or a non-browser application capable of rendering web content) to view web content and institute a blockchain transaction on the blockchain network. In some examples, the web content may include one or more objects (e.g., JavaScript-exposed object(s)) for creating blockchain transactions on the blockchain network.

The browser application may define at least one first API that enables the browser application to communicate with the digital asset holder (e.g., when the web content invokes the JavaScript-exposed object) to obtain information from and/or to notify the digital asset holder of information regarding the blockchain transaction. For example, the first API(s) may be a programming interface that allows the browser application and the digital asset holder to communicate with each other. In some examples, the browser application communicates with the digital asset holder to obtain a list of digital assets associated with the digital asset holder to use for the blockchain transaction and/or communicates with the digital asset holder to receive an authenticated transaction request from the digital asset holder. For example, the browser application may communicate with the digital asset holder via the first API(s) so that the digital asset holder can retrieve the user's private key and authenticate the blockchain transaction request. The browser application receives, via the first API(s), the authenticated transaction request from the digital asset holder.

The browser application may define at least one second API that enables the browser application to communicate with the blockchain network. For example, the browser application may transmit, via the second API(s), the authenticated transaction request to the blockchain network, and the blockchain network commits the transaction to the blockchain network. After the transaction is committed to the blockchain network, the browser application receives, via the second API(s), a transaction response from the blockchain network, where the transaction response includes a transaction identifier of the transaction added to the blockchain network. In response to the transaction response, the browser application transmits, via the first API(s), a notification message to the digital asset holder, where the notification includes the transaction identifier.

This disclosure also relates to a browser application configured to obtain an identifier associated with a token (e.g., a non-fungible token (NFT)) stored on a blockchain network, retrieve digital data of the token using the identifier, and customize a user interface of the browser application with the digital data of the token. According to the techniques discussed herein, a user can use one or more tokens stored on the blockchain to customize the browser application. The techniques discussed herein may provide a technical benefit of enabling a browser application to retrieve and render digital data of tokens in one or more sections of the browser application that is separate from displaying web pages.

A user may acquire a token (e.g., an NFT) (e.g., from an online marketplace or mint a new NFT) and associate the NFT in a digital asset holder, e.g., an application (or program) that stores and manages the user's private key to authenticate transactions on the blockchain network or networks. Digital data can be codified (e.g., minted) on the blockchain network, which produces a unique token (e.g., the token) that is used to represent ownership of the digital asset. Some categories of NFTs include art, collectibles, utilities for games or applications, and early access for whitelists and NFT drops. The digital asset holder uses the private key to authenticate a blockchain transaction involving the token (e.g., transfer, sell, buy a token). In some examples, because the blockchain network is public, tokens may be accessible using one or more identifiers such as a token identifier (e.g., an NFT identifier) that identifies a location of a particular token on the blockchain network, an address (e.g., public/shared address) of the digital asset holder, or a collection identifier that identifies a collection of tokens (e.g., by a particular creator or multiple creators). Using the token identifier, the browser application can retrieve digital data (e.g., image data, video data, and/or audio data) associated with the token, which may be stored on the blockchain network (in association with the corresponding token) or on a storage device separate from the blockchain.

The browser application can be customized based on the digital data and/or information associated with the digital data. It is noted that displaying an NFT may refer to displaying digital data, associated with a token, which has been retrieved from the blockchain network or on a separate storage device. In some examples, the NFT may be displayed as a background image of a browser tab of the browser application. In some examples, an NFT may be displayed as a profile image in the user interface of the browser application.

In some examples, the browser application is connected to (or can connect to) a digital asset holder and displays one or more tokens associated with the digital asset holder as a background image of a browser tab. In some examples, the browser application can display a different token associated with the digital asset holder when a new browser tab is launched (e.g., the browser application can shuffle through the user's NFTs, randomly or in an order, every time the user launches a new browser tab). In some examples, the digital asset holder is a third-party digital asset holder, and the browser application can connect to the third-party digital asset holder using any of the techniques described in FIGS. 1 through 9. In some examples, the browser application obtains the token identifier (e.g., the NFT identifier(s), the holder's shared (or public) address, collection identifier, etc.) in response to the browser application being connected to the digital asset holder. In some examples, the digital asset holder is associated with the browser application (e.g., the browser application includes a native or built-in digital asset holder) and the browser application can access the identifier from the browser's digital asset holder. In some examples, the browser application can render a user interface object that enables a user to enter an identifier.

In some examples, the browser application may render a user interface (UI) module on a portion of the user interface of the browser application. The user interface module may display one or more tokens associated with the identifier. In some examples, the UI module may shuffle/cycle through (e.g., sequentially display, randomly display) the tokens associated with the identifier (e.g., any NFTs owned by the user). In some examples, a token identifier (including a token identifier that is a collection of NFTs) may be associated with a profile of the user, e.g., so that different user profiles used by the user are associated with a different token identifier for the wallet.

In some examples, the browser application obtains metadata about the token(s) owned by the user and/or associated with the identifier, generates a recommendation based on the metadata, and renders, in the user interface of the browser application, information that identifies the recommendation. The metadata may include information about the creator, the item name, description, property levels, statistics, when and/or where the token was created, an NFT project related to a token, etc. The browser application may include (or operate in conjunction with) a recommendation engine that can generate a recommendation. In some examples, the recommendation may identify one or more NFTs (or NFT projects) from the same creators and/or recommend NFTs (or NFT projects) of similar size, price, etc. In some examples, the recommendation includes web content or a link to web content about the recommendation.

This disclosure also relates to enabling an application (e.g., a browser application) to function as an intermediary for transactions involving different payment networks (e.g., for inter-ledger payments). Each type of digital asset (e.g., each crypto-currency) may represent a different payment network and each type of digital asset may be stored on the same blockchain network or a different blockchain network. For example, Ethereum is stored on the Ethereum blockchain, and Bitcoin is stored on the Bitcoin blockchain. In some examples, Ethereum and Bitcoin (e.g., wrapped bitcoin (WBTC)) are stored on the Ethereum blockchain. Without inter-ledger payments a receiver (seller) may offer an item specifying an amount in Ethereum but a sender (purchaser) who lacks this particular digital asset cannot complete the transaction.

Some conventional approaches provide a large, complex protocol to commit transactions across different ledgers, but these conventional approaches have not been widely adapted by computing devices (or their applications) due to their complexity. Outside of an inter-ledger process, when a receiver requests a particular type of digital asset, a user (e.g., a sender) may manually convert digital assets if the user does not currently have the type of digital asset requested by a requesting party (e.g., a receiver). This manual conversion process may cause technical problems, including taking the user out of the flow of the transaction and potentially requiring installation of yet another, or possibly two other, digital asset exchange applications, which can increase the computing resources (e.g., memory, CPU) for facilitating such transactions. Users may abandon transactions because of the extra effort. The lack of a simplified protocol may lead to lack of adoption by receivers (e.g., computing devices, applications, etc.) and/or an increase in transaction abandonment.

The techniques discussed herein provide a technical solution of using an application (e.g., the browser application) to manage coordination between digital asset holders (e.g., crypto-wallets), blockchain network(s), and digital asset exchanges (e.g., decentralized, or centralized exchanges) to solve the inter-ledger (user-to-user payment) technical problem. Further, the techniques discussed herein provide a technical solution of providing a simplified (and, in some examples, a platform-agnostic) protocol for connecting a receiver (seller) and a sender (e.g., buyer) via digital asset holders and digital asset exchange(s). Such technical solutions have the technical benefit of allowing a receiver and a sender to exchange information (blockchain transactions), regardless of the format in which the receiver provides the information and seller receives the information.

A digital asset exchange may be an application (executing remote from the sender's and/or receiver's computing devices) that can execute one or more inter-ledger conversion operations to convert one type of digital asset (e.g., Ethereum) to another type of digital asset (e.g., Bitcoin). In some examples, the digital asset exchange includes a decentralized exchange (DEX). A DEX is an application that executes on one or more blockchain networks, where the code is embodied as smart contacts on the blockchain network(s). For example, converting 100 Bitcoin to Ethereum, the DEX would take 100 Bitcoin from a user's digital asset holder on the Bitcoin ledger and put the corresponding Ethereum on the user's digital asset holder on the Ethereum ledger. Uniswap® is an example of a DEX. In some examples, a DEX converts tokens on the same blockchain network. For example, a DEX may execute as a smart contract on the Ethereum blockchain and can convert Ethereum on the Ethereum blockchain to Wrapped Bitcoin (WBTC) on the Ethereum blockchain. In other words, a blockchain network (e.g., Ethereum) may have multiple ledges (e.g., Ethereum, Wrapped Bitcoin). In some examples, a digital asset exchange includes a centralized asset exchange (e.g., Binance®) that can convert tokens on different blockchains.

The techniques discussed herein provide an application (e.g., a browser application) that defines a protocol to receive blockchain transaction information from a requesting party (e.g., a receiver) (e.g., a website, application, etc.) and communicating with one or more digital asset exchanges, which can provide technical benefits of reducing the amount of computer complexity to implement inter-ledger transactions involving different types of digital assets (e.g., different ledgers) (thereby reducing the amount of computing resources). Further, the techniques discussed herein may operate behind-the-scenes with minimal input from the sender and without interrupting the transaction flow for the sender (thereby avoiding the need to install one or more additional applications).

The application (e.g., the browser application) is configured to implement a user agent natively or through a JavaScript or HTML library to receive transaction information (e.g., type of digital asset requested by the receiver, the transaction amount, receiver's shared address) from the receiver (e.g., the receiver's website, application). For example, in response to the user (sender) selecting a particular item for purchase, the application may receive the transaction information. In one example, the blockchain transaction information may specify Ethereum as the requested type of digital asset, the transaction amount (e.g., 0.01 ETH), and the receiver's shared address that corresponds to a digital asset holder belonging to the receiver.

In response to the blockchain transaction information, the application may render an interface (e.g., a UI prompt) to ask the user to choose a type of digital asset. In some examples, the application may communicate with the user's digital asset holder to obtain an asset list, where the asset list identifies the digital assets belonging to the user (sender) and associated with the user's asset holder. In some examples, the application defines a native (or built-in) digital asset holder (e.g., a program that is included as part of or associated with the application that receives the transaction information). In some examples, the application is a browser application, and the digital asset holder is a program that is part of or associated with the browser application. In some examples, the user's digital asset holder is a third-party digital asset holder, and the application may connect to the third-party digital asset holder according to any of the techniques discussed with reference to FIGS. 1 through 9. In one example, the interface may display information that indicates that the user has Bitcoin and Dogecoin.

In some examples, the application may communicate with one or more digital asset exchanges to obtain exchange rate information and the application may display the exchange rate information in the interface. For example, the exchange rate information may provide the exchange rate for converting Bitcoin to Ethereum for the transaction amount and the exchange rate for converting Dogecoin to Ethereum for the transaction amount.

In response to receiving a selection of a particular type of digital asset (e.g., the user selects Bitcoin), the application may communicate with one or more digital asset exchanges to convert the transaction amount from one type of digital asset (held by the user) to the type requested by the receiver. In some examples, the application may transmit a conversion request to the digital asset exchange, where the conversion request causes the digital asset exchange to convert the transaction amount of a user's digital assets in the user's digital asset holder from one type of asset to the requested digital asset. Then, the application may communicate with a blockchain network to send the transaction amount (now having the type requested by the receiver) to the receiver's digital asset holder (as identified by the receiver's shared address). For example, the application may transmit a transaction to the blockchain network (having the Bitcoin ledger) to transfer the transaction amount from the user's digital asset holder to the receiver's digital asset holder. In other words, the application determines and executes, transparently to the user, a swap sequence for accomplishing the exchange of currency and effecting the transaction in the requested type of currency.

In some examples, the application may select a particular digital asset exchange among a plurality of digital asset exchanges. For example, the application may evaluate a number of digital asset exchanges and select the one that provides the best exchange rate and/or the lowest transaction fee. In some examples, the application may use multiple digital asset exchanges to execute a conversion of one type of digital asset to another type of digital asset. For example, if the sender uses a minor currency A and the receiver uses a minor currency B, the application may not be able to select a digital asset exchange that converts minor currency A to minor currency B (e.g., directly converts). However, the application may select a first digital asset exchange that converts minor currency A to a popular bridge currency (e.g., ETH) and select a second digital asset exchange that converts the bridge currency to the minor currency B. These and other features are further explained with reference to the figures.

This disclosure also relates to registering a digital asset holder as a default digital asset holder and/or using the default digital asset holder to facilitate a transaction on a blockchain network according to another aspect. For example, this disclosure may provide a technical solution of enabling a blockchain transaction to be initiated from web content or an application other than a digital asset holder. On some computing environments (e.g., a mobile environment), blockchain transactions can only be processed using a digital asset holder, e.g., a native application installed on a user's device. According to some conventional approaches, a user may have to launch and use the digital asset holder on the user's device to initiate a blockchain transaction. However, according to the techniques discussed herein, a transaction can be initiated on web content or with an application other than a digital asset holder, where, in some examples, the application can communicate with the default digital asset holder to authenticate and commit a transaction to the blockchain network.

When a user institutes a transaction, if a digital asset holder is not registered as a default digital asset holder, the operating system may cause an interface to be displayed to select a particular digital asset holder from the digital asset holders that are installed on the user's device. In some examples, when a user institutes a transaction, if a digital asset holder is not registered as a default digital asset holder and a digital asset holder is not installed on the user's device, the operating system may cause an interface to be displayed to prompt a user to install a particular digital asset holder. In some examples, a user can select a particular digital asset holder as the default digital asset holder from a setting interface (e.g., an OS setting interface).

If a digital asset holder is registered as the default digital asset holder, the application (that initiated the transaction) may transfer an intent request (via an inter-process (IPC) link) to the default digital asset holder, where the intent request causes the default digital asset holder to execute one or more actions. In response to execution of the action(s), the default asset holder may transmit an intent response (via the IPC link) to the application, where the intent response may indicate a result of the action(s). In some examples, the intent request is a request for an asset list that causes the default digital asset holder to generate the asset list and return the asset list via the intent response. In some examples, the intent request is a transaction creation request that causes the default digital asset holder to authenticate the transaction and communicate with the blockchain network to add the transaction to the blockchain network. The intent response may include the results of the transaction being added to the blockchain network.

In some examples, the operating system includes a device application programming interface (API). When a user institutes a transaction on web content, the device API may create the intent request and send the intent request (via the IPC link) to the default digital asset holder. In response to execution of the action(s) by the default digital asset holder, the device API may receive an intent response. The device API may transmit a notification to the website of the web content and/or the underlying application (that prompted the transaction), where the notification may indicate the results of the transaction. In some examples, the use of the device API may enable the technical benefit of facilitating transactions from web content on the blockchain network with minimal (or no) browser involvement. In some examples, instead of using the device API (or additional to the device API), a browser application may connect to the default digital asset holder to facilitate the processing of a transaction on a blockchain network using any of the described techniques relating to connecting a browser application with a third-party digital asset holder. These and other features are further described with reference to the following figures.

FIG. 1 illustrates a system 100 having an application 106 connected to one or more digital asset holders 102 for processing a transaction 112 on a blockchain network 110 according to an aspect. In some examples, the application 106 includes a browser application. In some examples, the application 106 includes a non-browser-based application. In some examples, the application 106 includes an operating system. In some examples, the digital asset holder 102 is referred to as a crypto-wallet. The digital asset holder 102 may be implemented as an extension to a browser application, a native application, a server application, a web application, or generally any application that stores a private key 104. For example, the digital asset holder 102 stores a private key 104 for enabling transactions 112 to be processed on the blockchain network 110. In some examples, the digital asset holder 102 is a third-party application (e.g., a third-party digital asset holder), e.g., an application that is not developed or managed by the application 106.

In some examples, the application 106 may connect with any digital asset holder 102 (e.g., any third-party digital asset holder) so that the application 106 performs at least one of the operations of processing a transaction 112 on the blockchain network 110. For example, the application 106 may connect to a digital asset holder 102 that is implemented by an extension to the browser application, a native application, a server application, and/or a web application. In some examples, the application 106 operates as an intermediary between the web content 108 for creating a transaction 112 and the digital asset holder 102. In some examples, the application 106 operates as an intermediary between the digital asset holder 102 and the blockchain network 110. The application 106 may render one or more user interface (UI) objects that enable the user to select a particular digital asset holder 102 to use for the transaction 112 and/or a particular digital asset associated with the digital asset holder 102 to use for the transaction 112. In some examples, the application 106 may render user interface objects (UI objects) that notify the user of the results of the transaction 112. UI objects are objects that are configured to be selectable by the user and to perform an action upon selection.

Since at least some of the operations of processing a transaction 112 on web content 108 are executed by the application 106, the complexity of enabling transaction 112 for web content 108 may be reduced. Furthermore, the techniques discussed herein may enable an application 106 to connect to any digital asset holder 102 (e.g., any third-party digital asset holder) in a manner that increases the speed at which transactions 112 can be added to the blockchain network 110 and/or decreases the amount of computing resources for completing a transaction 112 (e.g., may avoid switching user interfaces between multiple applications and/or may avoid the launching of another application to complete the transaction 112).

A blockchain network 110 may represent any type of distributed database that is shared among computer nodes of a computer network. In some examples, the blockchain network 110 includes a Distributed Ledger or Distributed Ledger Technology (DLT). A distributed ledger is a consensus of replicated, shared, and synchronized digital data stored across computer nodes. In some examples, the blockchain network 110 is a public leger. In some examples, the blockchain network 110 is a private ledger. In some examples, the blockchain network 110 is a combination of a public ledger and a private ledger. In some examples, the blockchain network 110 is a digitally distributed, decentralized ledger that exists across a plurality of nodes in a peer-to-peer (P2P) network, where each node is represented by one or more computing devices.

The blockchain network 110 may store digital data as a plurality of linked blocks (e.g., a chain of blocks), where one block is linked to a previous block using cryptography. In some examples, the digital data includes cryptocurrency. In some examples, the digital data includes fungible tokens. A fungible token is a representation of an asset on the blockchain network 110 that is interchangeable. In some examples, the digital data includes non-fungible tokens (e.g., NFTs). A non-fungible token is a representation of an asset on the blockchain network 110 that is not interchangeable (e.g., a unique asset).

In some examples, the blockchain network 110 may process and record a transaction 112 as part of a block in the blockchain. Each block includes data (e.g., transactional data) and a hash value that is a result of a cryptographic operation performed on the data of the block. In some examples, a block includes a nonce (e.g., a whole number) that is a randomly generated number when the block is created. In some examples, linking a new block to an existing block includes identifying the hash value of the previous block within the new block. In some examples, adding a transaction 112 to the blockchain network 110 includes adding transaction information about the transaction 112 to an already existing block of the blockchain network 110. In some examples, adding a transaction 112 to the blockchain network 110 includes creating a new block, adding transaction information about the transaction 112 to the new block, generating a hash value using one or more cryptographic operations inputted with the transaction information, and/or linking the new block to a previous block by including the previous block's hash value in the new block.

The digital asset holder 102 may be any type of program that stores and manages a private key 104 of a user, which is used by the digital asset holder 102 to authenticate a transaction 112 on the blockchain network 110. In some examples, the private key 104 includes a password (e.g., a series of characters). In some examples, the private key 104 includes one or more passphrases. In some examples, the private key 104 includes a list of dictionary words (e.g., unencrypted form of the private key 104). Without the private key 104, a transaction 112 cannot be added to the blockchain network 110. For example, if a user wishes to record a transaction involving their digital asset(s) (e.g., cryptocurrency, NFTs) stored on the blockchain network 110, the transaction 112 must be authenticated (e.g., signed by the digital asset holder 102) before being added to the blockchain network 110.

The digital asset holder 102 may be stored on a computing device associated with the user. In some examples, the private key 104 is stored in a memory device on the user's computer. In some examples, the digital asset holder 102 is stored on one or more server computers. In some examples, the digital asset holder 102 is a native application installed on an operating system of the user's computing device. In some examples, the digital asset holder 102 is a program that is part of a larger application. In some examples, the digital asset holder 102 is a native (e.g., built-in) digital asset holder that is part of a native application executable by a computing device. In some examples, the digital asset holder 102 is an extension (e.g., web extension) of a browser application. In some examples, the digital asset holder 102 is a web application that is at least partially executed by one or more server computers and accessible via a browser application on the user's computing device. In some examples, the digital asset holder 102 is a server application that executes on one or more server computers. In some examples, the digital asset holder 102 is referred to as a cloud application.

The digital asset holder 102 may be associated with a shared address (e.g., a shared/public wallet address) that represents a location of one or more digital assets associated with the user and are stored on the blockchain network 110 (or multiple blockchain networks 110). The digital asset holder 102 may not actually store the digital assets (e.g., the digital assets are stored on the blockchain network 110), but the digital asset holder 102 stores the private key 104 and the shared address of the location of the digital assets. Also, the digital asset holder 102 includes functionality that authenticates (e.g., signs) the transaction 112. In some examples, the digital asset holder 102 can authenticate the transaction by executing a smart contract and/or executing a cryptographic operation using the private key 104.

To initiate a transaction 112 from web content 108, in some conventional approaches, a digital asset holder may communicate with the blockchain network 110 to commit (e.g., add) the transaction 112 to the blockchain network 110. In some conventional approaches, only digital asset holders can complete transactions 112. However, according to the techniques discussed herein, the application 106 may operate as an intermediary between the digital asset holder 102 and the web content 108, where the application 106 performs at least a portion of the operations to complete the transaction 112 on the blockchain network 110.

Web content 108 may be displayed on a user's computing device. The web content 108 may be rendered from a browser application, a native application having a web view controller, and/or a browser tab (e.g., a custom browser tab) rendered within a native application. In some examples, the web content 108 may include one or more objects (e.g., a JavaScript-exposed object) for creating blockchain transactions on the blockchain network 110.

The application 106 may include a browser application executable by a computing device. In some examples, the browser application is a web browser (e.g., a browser engine or search engine) executable on an operating system of the computing device. The web browser may be configured to render browser tab(s) to search and display web content. In some examples, the browser application is an operating system (or part of an operating system) executable by a computing device. In some examples, the application 106 is a non-browser application, e.g., an application that does not render browser tabs.

The application 106 may include one or more interfaces that enable the application 106 and the digital asset holder 102 to communicate with each other when a transaction 112 is instituted on the web content 108. In some examples, the web content 108 is rendered by the application 106. In some examples, the web content 108 is rendered by a native application using a web view controller or a custom browser tab. If the application 106 is the browser application, the browser application may render the web content 108 (e.g., in a browser tab). In some examples, the web content 108 is rendered by a web view controller of a native application (e.g., display and control web content without leaving the native application). In some examples, the web content 108 is provided in a browser tab (e.g., a custom browser tab) within the native application. In some examples, the web content 108 is rendered by a web application (or a server or cloud-based application).

In some examples, the interface(s) define an inter-process communication protocol that enables information to be transmitted between the application 106 and the digital asset holder 102. In some examples, the interface(s) permit a browser application and a digital asset holder 102 (e.g., an extension to the browser application, a native application, a server application, etc.) to communicate with each other. In some examples, the interface(s) include application programming interface(s) (API(s)). In some examples, the API(s) include callback APIs. In some examples, the application 106 includes a library (e.g., a JavaScript library) that defines one or more APIs that are used to communicate between the application 106 and the digital asset holder 102. In some examples, the application 106 natively defines one or more APIs that are used to communicate with the application 106 and the digital asset holder 102.

In response to a request being generated by the user's interaction with the exposed object on the web content 108 for creating a transaction on the blockchain network 110, in some examples, the application 106 may receive a request (e.g., a callback) or receive multiple requests (at separate times) such as a first request and/or a second request. The receipt or detection of the first request or the second request may cause application 106 to communicate with the digital asset holder 102 to receive and/or transmit information. In some examples, the first request is a request to obtain a list of digital assets (e.g., cryptocurrencies, NFTs, etc.) associated with a particular digital asset holder 102. In some examples, the second request is a request to obtain an authenticated transaction for a particular digital asset or assets.

In response to the first request, the application 106 may communicate with the digital asset holder 102 to obtain a list of digital assets, e.g., which digital assets are owned by the user. In some examples, the application 106 may transmit a digital assets request to the digital asset holder 102, and, in response to the digital assets request, the digital asset holder 102 may obtain a list of digital assets using the shared address of the particular digital asset holder 102 (e.g., by communicating with the blockchain network 110). The application 106 may receive a digital assets response from the digital asset holder 102, where the digital assets response includes the list of digital assets.

In response to the second request, the application 106 may communicate with the digital asset holder 102 to obtain an authorized transaction request from the digital asset holder 102. In some examples, the second request relates to a transaction request for the creation of a transaction 112 on the blockchain network 110 using a particular digital asset from the list of digital assets. The transaction request may include details about the transaction such as the type of digital asset, the amount, the sender, the receiver, time information, etc. The application 106 may transmit the transaction request to the digital asset holder 102 so that the digital asset holder 102 can retrieve the private key 104 and authenticate the transaction request using the private key 104. The application 106 may receive the authenticated transaction request from the digital asset holder 102.

Then, the application 106 may communicate with the blockchain network 110 to add the transaction 112 subjected to the authenticated transaction request to the blockchain network. For example, the application 106 may define one or more interfaces to enable the application 106 to communicate with the blockchain network 110. In some examples, the application 106 may transmit the authenticated transaction request to the blockchain network 110, and the blockchain network 110 adds the transaction 112 subject to the authenticated transaction request to the blockchain network 110. The application 106 may receive a transaction response from the blockchain network 110 that indicates whether the transaction 112 has been successfully added to the blockchain network 110. In some examples, the transaction response includes a transaction identifier that uniquely identifies the transaction 112. The application 106 may transmit a notification to the digital asset holder 102 that indicates that the transaction 112 has been successfully added to the blockchain network 110. In some examples, the application 106 may transmit a notification to the website or platform that hosts the web content 108 indicating that the transaction was successful.

FIGS. 2A through 2D illustrate a system 200 having a browser application **206*a* configured to connect to one or more digital asset holders 202 to process a transaction 212*a* on a blockchain network 210. In some examples, the browser application 206*a* can connect with a single digital asset holder 202 (at a particular time) to process one or more transactions 212*a* on web content 208. In some examples, the browser application 206*a* can connect with multiple digital asset holders 202 (e.g., simultaneously or at different times) to process one or more transactions 212*a* on web content 208**.

The system 200 may be an example of the system 100 of FIG. 1 and may include any of the details discussed with reference to FIG. 1. The browser application **206*a* is configured to connect to a digital asset holder 202 that stores a private key 204 to enable transactions 212 to be added on a blockchain network 210 for digital assets associated with (or to be associated with) a user of a computing device 226. In some examples, the digital asset holder 202 is a third-party digital asset holder. A third-party digital asset holder is an application that is not owned and/or administered by the browser application 206*a*. In some examples, the browser application 206*a* can connect to any third-party digital asset holder to assist with processing transactions 212 on the blockchain network 210**.

The computing device 226 may be any type of computing device that includes one or more processors 228, one or more memory devices 230, a display 234, and an operating system 232 configured to execute (or assist with executing) one or more applications, including the browser application **206*a* and the digital asset holder 202. In some examples, the computing device 226 is a laptop computer. In some examples, the computing device 226 is a desktop computer. In some examples, the computing device 226 is a tablet computer. In some examples, the computing device 226 is a smartphone. In some examples, the computing device 226 is a wearable device. In some examples, the display 234 is the display of the computing device 226. In some examples, the display 234 may also include one or more external monitors that are connected to the computing device 226**.

The operating system 232 is a system software that manages computer hardware, software resources, and provides common services for computing programs. In some examples, the operating system 232 is an operating system designed for a larger display 234 such as a laptop or desktop (e.g., sometimes referred to as a desktop operating system). In some examples, the operating system 232 is an operating system for a smaller display 234 such as a tablet or a smartphone (e.g., sometimes referred to as a mobile operating system).

The processor(s) 228 may be formed in a substrate configured to execute one or more machine executable instructions or pieces of software, firmware, or a combination thereof. The processor(s) 228 can be semiconductor-based—that is, the processors can include semiconductor material that can perform digital logic. The memory device (s) 230 may include a main memory that stores information in a format that can be read and/or executed by the processor (s) 228. The memory device(s) 230 may store the operating system 232, the digital asset holder 202, and the browser application **206*a* that, when executed by the processors 228**, perform certain operations discussed herein.

Although a browser application **206*a* is depicted as operating as an intermediary between the web content 208 and the digital asset holder 202, it is noted that, in some examples, the application may be an operating system or a non-browser application, e.g., an application that does not render a browser tab for rendering and/or searching content on the Internet. The browser application 206***a* may be a web browser (e.g., a browser engine or search engine) configured to access information on the Internet. In some examples, the browser application 206*a* is a separate application from the operating system 232, where the browser application 206*a* is installable on (and executable by) the operating system 232. In some examples, the browser application 206*a* is the operating system 232 (or included as part of the operating system 232). The browser application 206*a* may launch one or more browser tabs in the context of one or more browser windows on a display 234 of the computing device 226. In some examples, the browser application 206*a* may launch one or more browser tabs without reference to a browser window.

The browser application 206*a* may connect to a digital asset holder 202 to process a transaction 212*a* on web content 208, where the digital asset holder 202 is configured to store a user's private key 204 for enabling transactions 212 on the blockchain network 210. The transaction 212*a* may be referred to as a blockchain transaction that records digital information on a blockchain network 210. The transaction 212*a* may involve the acquisition of an item (e.g., a good, a service, and/or a digital right) with digital data (e.g., digital assets) of the user that are stored on the blockchain network 210. In some examples, the web content 208 may allow the user to acquire an item using crypto-currency and/or NFTs that are owned by the user and stored on the blockchain network 210. For example, an application or a website may allow a user to purchase content using digital assets such as cryptocurrency or NFTs that are stored on the blockchain network 210.

The web content 208 may include information from the world wide web. In some examples, the web content 208 includes a web page or a collection of web pages (e.g., a web page is a hypertext document on the Internet). The web content 208 may include one or more objects 236 that allows the creation of a transaction 212*a* on the blockchain network 210. In some examples, the object 236 is a blockchain computer object. In some examples, the object 236 is a JavaScript exposed object. In some examples, the object 236 is an API exposed object. If the blockchain network 210 is Ethereum, the object 236 is an Ethereum object (e.g., window.etherum) to create transactions on the Ethereum blockchains. In some examples, the object 236 is specific to the type of blockchain network. In some examples, the web content 208 may include a first object (e.g., object 236) for creating transactions on a first blockchain network and a second object (e.g., object 236) for creating transactions on a second blockchain network, where the second blockchain network is different from the first blockchain network. In some examples, the first and second objects, when selected (e.g., invoked, initiated) refer to different callbacks or requests related to a particular transaction 212*a*.

When the web content 208 is rendered on the display 234, the object 236 is not implemented (or realized), but, as further discussed below, the browser application 206*a* is configured to implement the object 236 to communicate with the blockchain network 210 (e.g., through the use of API(s) 240). In some examples, the object 236 that is embedded into the web content 208, which, when selected (e.g., invoked, initiated, etc.), causes a blockchain process to initiate.

Web content 208 can be rendered on a display 234 of a computing device 226 according one or more different ways. The web content 208 may be displayed in a user interface of the browser application 206*a*. For example, a user may use the browser application 206*a* to render the web content 208 in a browser tab. The web content 208 may be displayed in a user interface of a non-browser application (e.g., a mobile app installed on a smartphone). For example, a user may be using a native application installed on the computing device 226, and the web content 208 may be displayed from the native application using a web view controller and/or a browser tab. The web view controller and/or the browser tab may be associated with the browser application 206*a*. In some examples, the web content 208 may be displayed in a user interface of a web application executable at least in part by the browser application 206*a*.

The browser application 206*a* may connect with any digital asset holder 202 (e.g., any third-party digital asset holder) for a transaction 212*a* that is initiated from the web content 208 so that the browser application 206*a* performs at least one of the operations to enable the transaction 212*a* to be added to the blockchain network 210. In some examples, the browser application 206*a* operates as an intermediary between the web content 208 for creating the transaction 212 and the digital asset holder 202. In some examples, the browser application 206*a* operates as an intermediary between the digital asset holder 202 and the blockchain network 210.

The digital asset holder 202 may be any type of program that stores and manages a private key 204 of a user, which is used by the digital asset holder 202 to authenticate the transaction 212 before the transaction 212 is added to the blockchain network 210. In some examples, the private key 204 includes a password (e.g., a series of characters). In some examples, the private key 204 includes one or more passphrases. In some examples, the private key 204 includes a list of dictionary words (e.g., unencrypted form of the private key 204). Without the private key 204, the transaction 212*a* cannot be added to the blockchain network 210. For example, if a user wishes to record the transaction 212*a* involving their digital assets (e.g., cryptocurrency, NFTs) stored on the blockchain network 210, the transaction 212*a* must be authenticated (e.g., signed by) the digital asset holder 202 before being added to the blockchain network 210. The digital asset holder 202 may be stored on the computing device 226 (e.g., within a memory device 230). In some examples, the digital asset holder 202 is stored on one or more server computers 216 and the digital asset holder 202 may be accessible over a network 250 by the computing device 226.

Figure 2A:
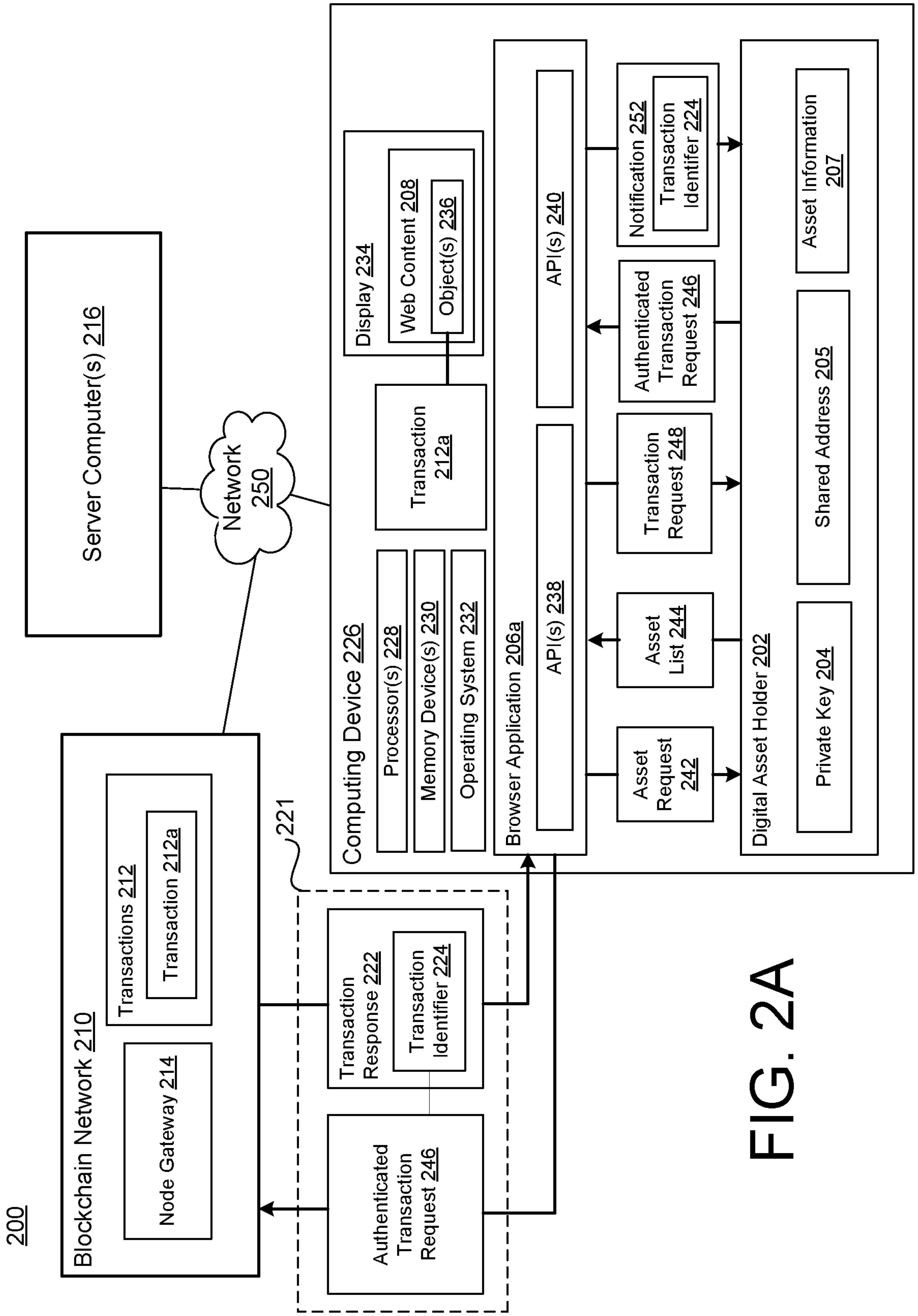
FIG. 2A illustrates a system for connecting a browser application with a digital asset holder that manages a private key for enabling transactions on a blockchain network according to an aspect.
Figure 2B:
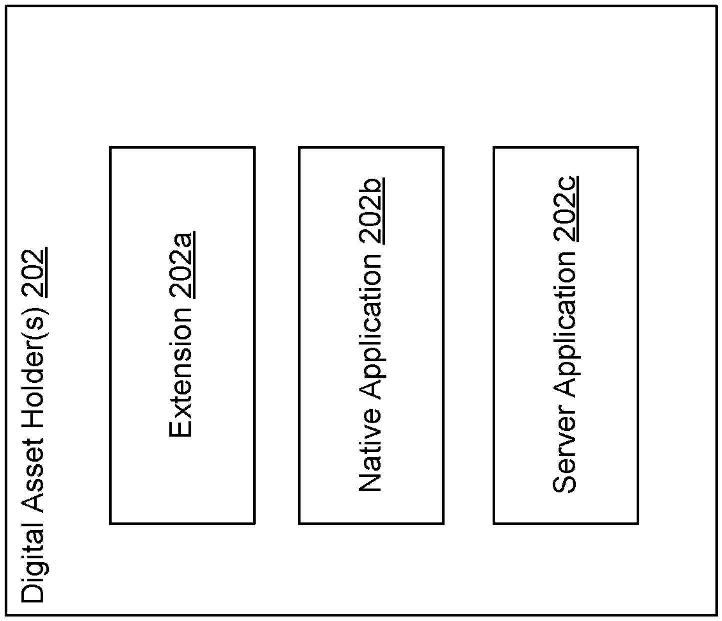
FIG. 2B illustrates examples of a digital asset holder for enabling transactions on the blockchain network according to an aspect.

In some examples, as shown in FIG. 2B, the digital asset holder 202 is an extension 202*a* of the browser application 206*a*. For example, the digital asset holder 202 (e.g., the digital asset holder) may be implemented by the extension 202*a*, and the browser application 206*a* may connect to the extension 202*a* to facilitate the processing of the transaction 212*a* on web content 208. In some examples, the web content 208 is rendered by the browser application 206*a*. In some examples, the extension 202*a* is referred to as a web extension or a browser extension. The extension 202*a* (if enabled) adds a feature or function to the browser application 206*a*. In some examples, an extension 202*a* may be HTML, CSS, and/or JavaScript based. In some examples, the extension 202*a* is a third-party extension that is not owned by the browser application 206*a* (e.g., the extension 202*a* is developed by an entity that is separate from the entity that developed the browser application 206*a*).

In some examples, the digital asset holder 202 is a native application **202*b*. For example, the digital asset holder 202 may be implemented by the native application 202*b*, and the browser application 206*a* may connect to the native application 202*b* to facilitate the processing of the transaction 212*a* on web content 208. In some examples, the web content 208 is rendered by a web view controller of the native application 202*b*. In some examples, the web content 208 is rendered within a browser tab. In some examples, the web content 208** is rendered within a custom browser tab.

A custom browser tab is a browser tab (associated with the browser application **206*a*) but rendered within the context of a native application (e.g., native application 202*b*). For example, if a native application incorporates a custom browser tab, when a link to web content 208 is selected, the web content 208 is rendered in a custom browser tab within the native application (e.g., a separate browser tab is not rendered on top of the native app's UI). The custom browser tab may include one or more selectable items that are associated with actions of the browser application 206*a*** (e.g., navigation controls) and one or more selectable items that are associated with actions of the underlying native application (e.g., share a message on a messaging platform).

In some examples, the custom browser tab includes customized display attributes of the user interface of the custom browser tab (e.g., setting a color for the background of a navigation panel and/or toolbar). For example, the navigation panel (e.g., having the forward and/or back navigation controls) and the items for the toolbar are typically standard across browser tabs that are rendered for a non-custom browser tab. However, an application developer may change one or more aspects of the navigation panel and/or toolbar to customize the tab to correspond to the underlying native application.

In some examples, a native application **202*b* is a non-browser application. The native application 202*b* may display web content 208 via a web view controller or a browser tab. A native application 202*b* is a software program that is developed for use on a particular platform or device, or for a particular operating system. In some examples, a native application 202*b* is installed on the operating system 232 of the computing device 226**.

In some examples, the native application **202*b* is a native mobile application configured to execute on a mobile operating system of the computing device 226 such as a smartphone or a tablet. In some examples, the native mobile applications may include an Android application, a mobile iOS application, and/or a mobile Windows application. In some examples, the native application 202*b* is an application configured to execute on a desktop operating system of the computing device 226 such as a laptop computer or a desktop computer. In some examples, native application 202*b* may include a Linux-based application (e.g., a Linux application in a virtualized environment). In some examples, the native application 202*b* is a software program that is developed for multiple platforms or devices. In some examples, the native application 202*b*** is a software program developed for use on a mobile platform and/or configured to execute on a desktop or laptop computer.

In some examples, the digital asset holder 202 is a server application **202*c*. For example, the digital asset holder 202 may be implemented by the server application 202*c*, and the browser application 206*a* may connect to the server application 202*c* to facilitate the processing of the transaction 212*a* on web content 208. In some examples, the web content 208 is rendered by the browser application 206*a*. In some examples, a server application 202*c* is an application that executes on one or more server computers (e.g., server computer(s) 216). In some examples, the server application 202*c* is referred to as a cloud application. In some examples, the server application 202*c* is a web application. In some examples, a server application 202*c* may be an application program that is stored on a remote server (e.g., server computer(s) 216) and delivered over the network 250 through the browser application 206*a* (e.g., a browser tab). In some examples, the server application 202*c* includes a progressive web application, which can be stored (at least in part) on the computing device 226** and used offline.

Regardless of the underlying implementation of the digital asset holder 202, the digital asset holder 202 stores and manages a private key 204, and the digital asset holder 202 is associated with a shared address 205 (e.g., a shared/public wallet address). The shared address 205 may represent a location of one or more digital assets associated with the user and are stored on the blockchain network 210. In some examples, the digital asset holder 202 stores asset information 207 about the digital assets such as a list of digital assets (e.g., a list of which crypto-currencies and NFTs are associated with the user), and information about each digital asset (e.g., description of the NFT, the amount, type of crypto-currency, etc.). The digital asset holder 202 may not actually store the digital assets (e.g., the digital assets are stored on the blockchain network 210), but the digital asset holder 202 stores the private key 204 and the shared address 205 of the location of the digital assets. Also, the digital asset holder 202 includes functionality that authenticates (e.g., signs) the transaction 212. In some examples, the digital asset holder 202 can authenticate the transaction by executing a smart contract and/or executing a cryptographic operation using the private key 204.

The browser application **206*a* may define one or more APIs 238 that enable the browser application 206*a* to communicate with the digital asset holder 202 (e.g., when the web content 208 invokes the object 236) to obtain information from and/or to notify the digital asset holder 202 of information regarding the transaction 212*a*. The API(s) 238 may be a programming interface that allows the browser application 206*a* and the digital asset holder 202** to communicate with each other.

The browser application **206*a* may define one or more APIs 240 that enable the browser application 206*a* to communicate with the blockchain network 210. For example, the API(s) 240 may be a programming interface that allows the browser application 206*a* and the blockchain network 210 to communicate with each other, e.g., facilitate the adding of the transaction 212*a* on the blockchain network 210 and receiving a notification that the transaction 212*a*** has successfully been added.

Figure 2C:
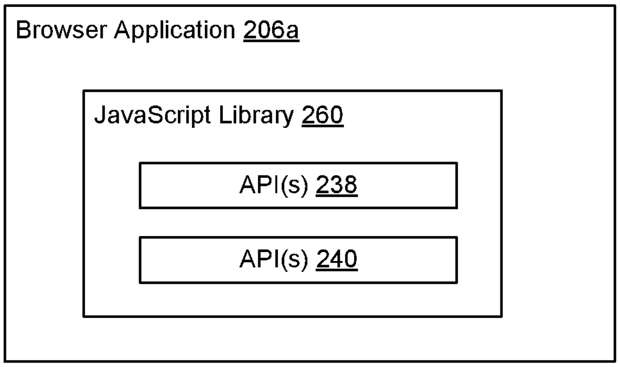
FIG. 2C illustrates an example of application programming interfaces at a browser application according to an aspect.
Figure 2D:
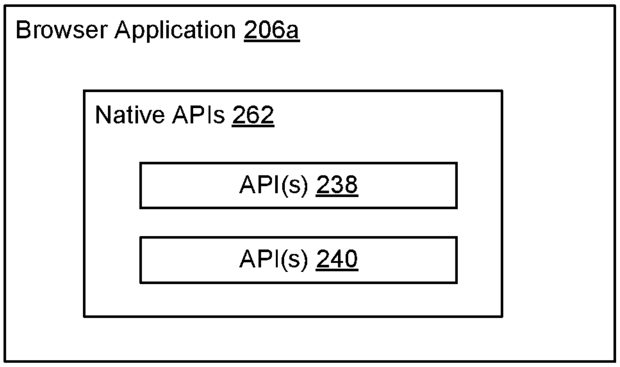
FIG. 2D illustrates an example of application programming interfaces at a browser application according to another aspect.

In some examples, as shown in FIG. 2C, the browser application **206*a* includes a JavaScript library 260 configured to implement the API(s) 238 and the API(s) 240. In some examples, as shown in FIG. 2D, the browser application 206*a* defines native APIs 262, where the native APIs 262 includes the API(s) 238 and the API(s) 240**.

Referring back to FIG. 2A, the browser application **206*a* may detect whether the web content 208 has selected (or initialized or invoked) the object 236. In some examples, a user selecting a particular UI item on the web content 208 may cause the web content 208 to select the object 236. In some examples, the object 236 relates to a transaction request to obtain a list of assets (e.g., query accounts). In some examples, in response to the web content 208 selecting the object 236, the browser application 206*a* may transmit, via the API(s) 238, an asset request 242 to the digital asset holder 202. The asset request 242 may be a request for a list of assets associated with the digital asset holder 202. Then, the browser application 206***a* may receive, via the API(s) 238, an asset list 244 that identifies the digital assets associated with digital asset holder 202. The asset list 244 may identify one or more types of crypto-currencies, and, in some examples, identifies an amount of a respective crypto-currency. In some examples, the browser application 206*a* may render a UI object that provides the asset list 244.

In some examples, the object 236 relates to the creation of a transaction 212*a* using digital data stored on the blockchain network 210 (e.g., send transaction). In response to the web content 208 selecting the object 236, the browser application 206*a* may transmit, via the API(s) 238, a transaction request 248 to the digital asset holder 202. The transaction request 248 may include details about the transaction 212*a* to be created on the blockchain network 210 such as the sender (e.g., the shared address 205), the receiver (e.g., the shared address of the receiver), the amount, the type of digital asset, etc. In some examples, the transaction request 248 that is sent to (or received by) the digital asset holder 202 is referred to as a request to authenticate the transaction 212*a* (e.g., authentication request). In response to the transaction request 248, the digital asset holder 202 may authenticate the transaction request 248 using the private key 204. For example, the digital asset holder 202 may execute a smart contract or a cryptographic operation using the private key 204 to authenticate (or sign) the transaction request 248. In return, the browser application 206*a* may receive, via the API(s) 238, an authenticated transaction request 246.

The browser application 206*a* may transmit, via the API(s) 240, the authenticated transaction request 246 to a node gateway 214 of the blockchain network 210, and the blockchain network 210 adds the transaction 212*a* to the blockchain network 210. In some examples, a node gateway 214 is a network node that connects two networks with different transmission protocols. The node gateway 214 may operate as an entry and exit point for information transmitted to/from the blockchain network 210. In some examples, the node gateway 214 may execute one or more operations on the authenticated transaction request 246. In some examples, the authenticated transaction request 246 includes authentication information indicating that the transaction is authenticated (e.g., signed). The node gateway 214 may determine whether the authentication is valid (e.g., not tampered with). In some examples, the node gateway 214 may determine that the authenticated transaction request 246 includes a plurality of elements such as source address, target address, type of digital asset, amount, etc.

After the transaction 212*a* is committed to the blockchain network 210, the browser application 206*a* receives, via the API(s) 240, a transaction response 222 from the blockchain network 210, where the transaction response 222 includes a transaction identifier 224 of the transaction 212*a* added to the blockchain network 210. In some examples, the authenticated transaction request 246 and the transaction response 222 are communicated between the browser application 206*a* and the blockchain network 210 using JavaScript object notation (JSON) messages 221. In response to the transaction response 222, the browser application 206*a* transmits, via the API(s) 238, a notification 252 to the digital asset holder 202, where the notification 252 includes the transaction identifier 224.

The server computer 216 may be computing devices that take the form of a number of different devices, for example a standard server, a group of such servers, or a rack server system. In some examples, the server computer(s) 216 may be a single system sharing components such as processors and memories. In some examples, the server computer(s) 216 may be multiple systems that do not share processors and memories. The network 250 may include the Internet and/or other types of data networks, such as a local area network (LAN), a wide area network (WAN), a cellular network, satellite network, or other types of data networks. The network 250 may also include any number of computing devices (e.g., computer, servers, routers, network switches, etc.) that are configured to receive and/or transmit data within network 250. Network 250 may further include any number of hardwired and/or wireless connections.

The server computer(s) 216 may include one or more processors formed in a substrate, an operating system (not shown) and one or more memory devices. The memory devices may represent any kind of (or multiple kinds of) memory (e.g., RAM, flash, cache, disk, tape, etc.). In some examples (not shown), the memory devices may include external storage, e.g., memory physically remote from but accessible by the server computer(s) 216. The server computer(s) 216 may include one or more modules or engines representing specially programmed software.

Figure 3:
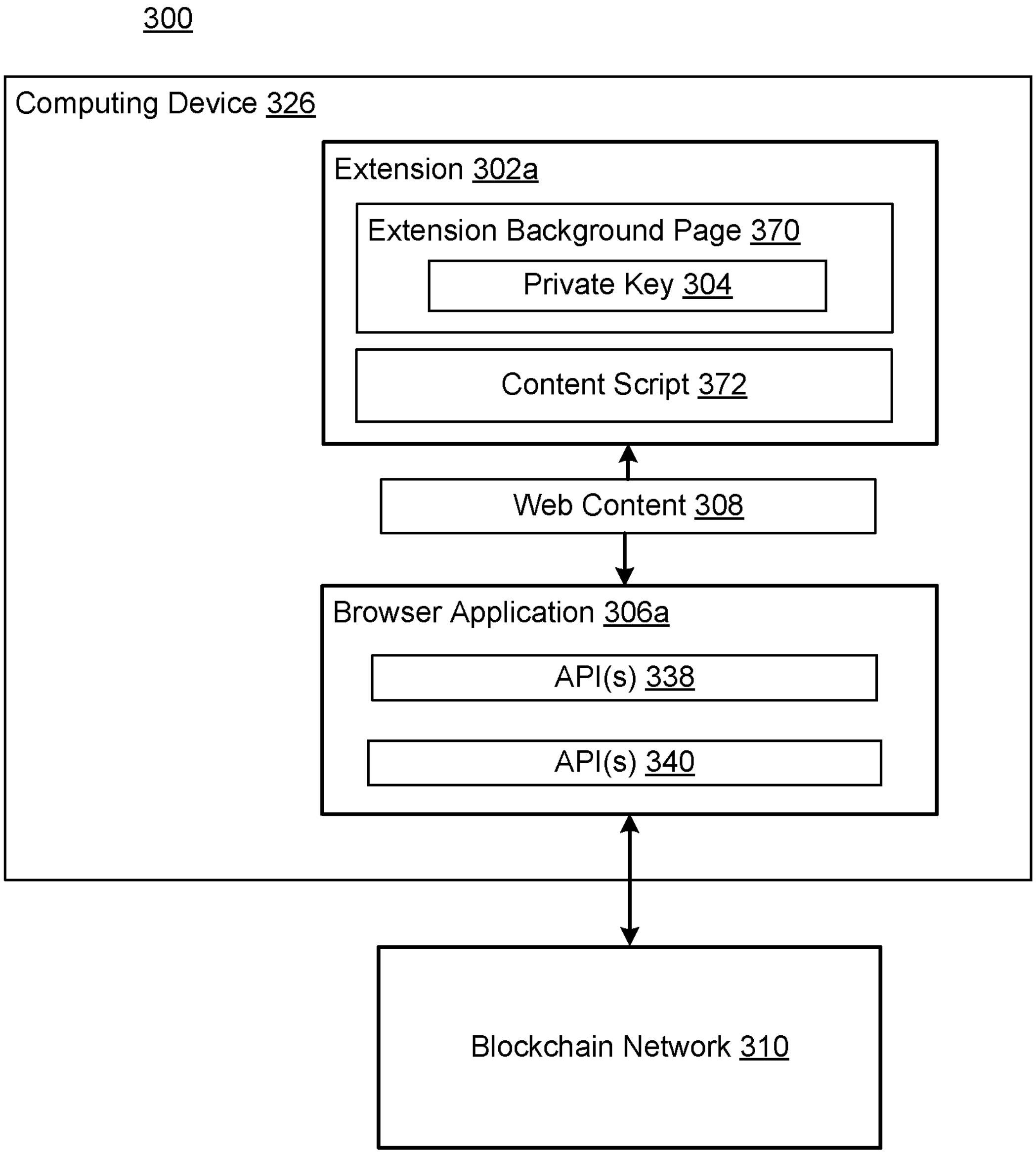
FIG. 3 illustrates an example of connecting a browser application to an extension to process a blockchain transaction according to an aspect.

FIG. 3 illustrates a system 300 having a browser application 306*a* connected to an extension 302*a* of the browser application 306*a* to process a blockchain transaction on web content 308. In some examples, the web content 308 is rendered by the browser application 306*a*. The system 300 may be an example of the system 100 of FIG. 1 and/or the system 200 of FIGS. 2A through 2D and may include any of the details discussed with reference to those figures.

The browser application 306*a* is executable by a computing device 326. In some examples, the browser application 306*a* is a web browser (e.g., a browser engine or a search engine) that is installed on an operating system of the computing device 326. In some examples, the browser application 306*a* is an operating system (or forms part of an operating system) of the computing device 326. In some examples, the computing device 326 is a computer that operates in a non-mobile environment (e.g., a laptop computer, a desktop computer, etc.). The browser application 306*a* may connect any third-party digital asset holder, which is represented as the extension 302*a*. The extension 302*a* is a web extension to the browser application 306*a*. In some examples, the extension 302*a* is not owned or developed by the browser application 306*a* (e.g., a third-party digital asset holder). The extension 302*a* (if enabled) adds a feature or function to the browser application 306*a*. In some examples, an extension 302*a* may be HTML, CSS, and/or JavaScript based. As shown in FIG. 3, the browser application 306*a* may define one or more API(s) 338 to enable communication between the browser application 306*a* and the extension 302*a*. The browser application 306*a* may define one or more API(s) 340 that enable communication between the browser application 306*a* and the blockchain network 310.

The extension 302*a* may include an extension background page 370 that stores a private key 304 that is used to authenticate transactions to be added to the blockchain network 310. In some examples, the extension background page 370 is an HTML page. In some examples, the extension background page 370 is a container (e.g., an HTML-based container). The extension background page 370 includes a background script, e.g., instructions that manage one or more computer tasks associated with the added/enabled web functionality (e.g., retrieving the private key 304 and authenticating the blockchain transaction using the private key 304).

The extension 302*a* may inject a content script 372 into the extension 302*a*. In some examples, the content script 372 is a computer file. In some examples, the content script 372 is a computer file that executes in the context of a web page (as opposed to the background script of the extension background page 370, which is part of the extension 302*a*). The content script 372 defines one or more callback APIs to allow the extension 302*a* to communicate with the browser application 306*a*.

The browser application 306*a* defines one or more APIs 338 that enable the browser application 206*a* to communicate with the extension 302*a* (e.g., when the web content 308 invokes an object to create a transaction on the blockchain network 310) to obtain information from and/or to notify the extension 302*a* of information regarding the blockchain transaction. The API(s) 338 may be a programming interface that allows the browser application 306*a* and the extension 302*a* to communicate with each other.

The browser application 306*a* may define one or more APIs 340 that enable the browser application 306*a* to communicate with the blockchain network 310. For example, the API(s) 340 may be a programming interface that allows the browser application 306*a* and the blockchain network 310 to communicate with each other, e.g., facilitate the adding of the blockchain transaction on the blockchain network 310 and receiving a notification that the blockchain transaction has successfully been added. In some examples, the browser application 306*a* includes a JavaScript library configured to implement the API(s) 338 and the API(s) 340. In some examples, the browser application 306*a* defines native APIs, where the native APIs include the API(s) 338 and the API(s) 340.

The browser application 306*a* may detect whether the web content 308 has selected (or initialized or invoked) an object for processing a blockchain transaction. In some examples, a user selecting a particular UI item on the web content 308 may cause the web content to select the object. In some examples, the object relates to a transaction request to obtain a list of assets (e.g., query accounts). In some examples, in response to the web content 308 selecting the object, the browser application 306*a* may transmit, via the API(s) 338, an asset request to the extension 302*a*, and then receive, via the API(s) 338, an asset list that identifies the digital assets associated with the extension 302*a*. In some examples, in response to receipt of the asset request, the extension background page 370 obtains asset information (e.g., the asset information 207 of FIGS. 2A through 2D) regarding user's digital assets that are stored on the blockchain network 310. The asset list may identify one or more types of crypto-currencies, and, in some examples, identifies an amount of a respective crypto-currency. In some examples, the browser application 306*a* may render a UI object that provides the asset list.

In some examples, the object relates to the creation of a blockchain transaction using digital data stored on the blockchain network 310 (e.g., send transaction). In response to the web content 308 selecting an object for creating a blockchain transaction, the browser application 306*a* may transmit, via the API(s) 338, a transaction request to the extension 302*a*.

The transaction request may include details about the blockchain transaction to be created on the blockchain network 310 such as the sender, the receiver, the amount, the type of digital asset, etc. In response to the transaction request, the extension background page 370 may authenticate the transaction request using the private key 304. For example, the extension background page 370 may execute a smart contract or a cryptographic operation using the private key 304 to authenticate (or sign) the transaction request. In return, the browser application 306*a* may receive, via the API(s) 338, an authenticated transaction request.

The browser application 306*a* may transmit, via the API(s) 340, the authenticated transaction request to a node gateway of the blockchain network 310, and the blockchain network 310 adds the blockchain transaction to the blockchain network 310. After the blockchain transaction is committed to the blockchain network 310, the browser application 306*a* receives, via the API(s) 340, a transaction response from the blockchain network 310, where the transaction response includes a transaction identifier of the blockchain transaction added to the blockchain network 310. In some examples, the authenticated transaction request and the transaction response are communicated between the browser application 306*a* and the blockchain network 310 using JSON messages. In response to the transaction response, the browser application 306*a* transmits, via the API(s) 338, a notification to the extension 302*a*, where the notification includes the transaction identifier. The extension background page 370 may update the user's asset information with the newly added blockchain transaction. In some examples, the browser application 306*a* also transmits a notification (e.g., via APIs 338) to the website of the web content, where the notification indicates that the blockchain transaction has been successfully added to the blockchain network 310.

Figure 4:
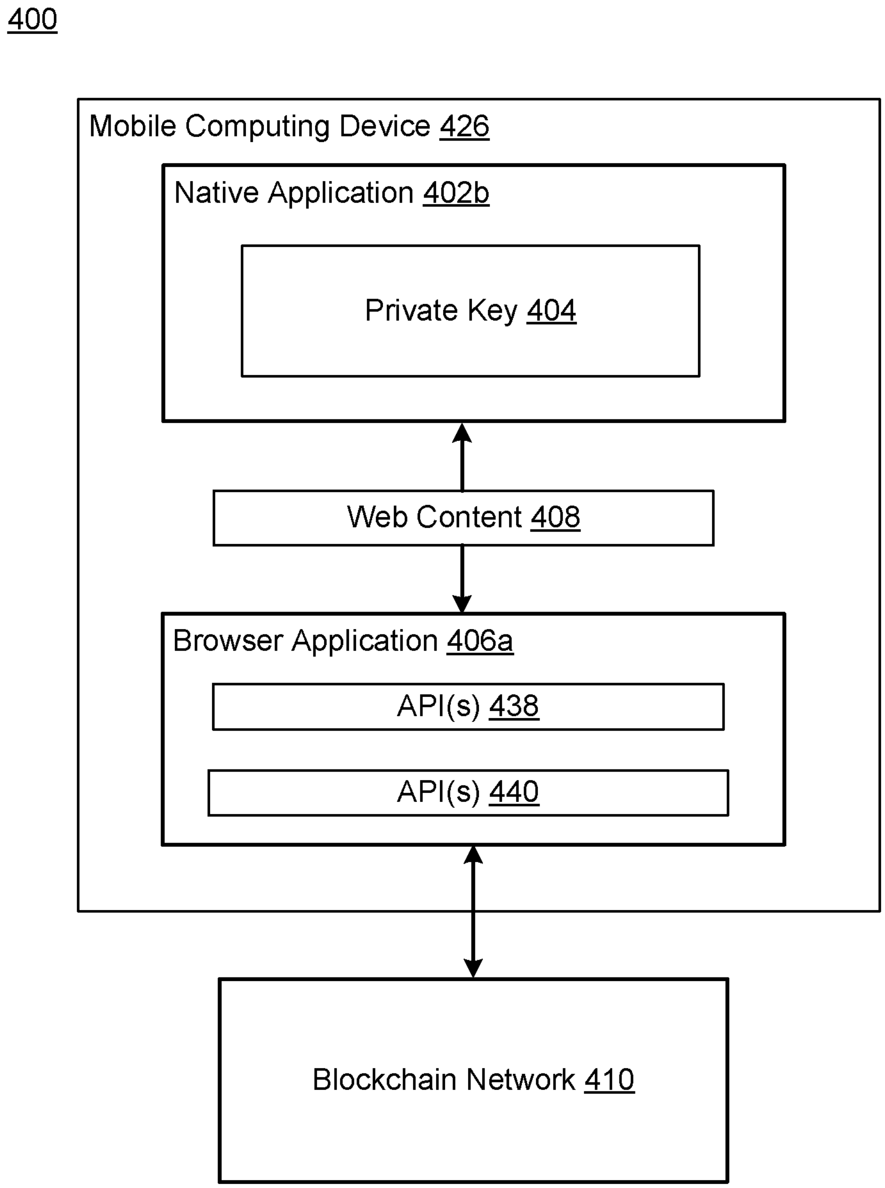
FIG. 4 illustrates an example of connecting a browser application to a native application to process a blockchain transaction according to an aspect.

FIG. 4 illustrates a system 400 having a browser application 406*a* connected to a native application 402*b* to process a blockchain transaction on web content 408. In some examples, the web content 408 is rendered by a web view controller of the native application 402*b*. In some examples, the web content 408 is rendered by the browser application 406*a*. The system 400 may be an example of the system 100 of FIG. 1 and/or the system 200 of FIGS. 2A through 2D and may include any of the details discussed with reference to those figures.

The browser application 406*a* is executable by a mobile computing device 426. In some examples, the mobile computing device 426 includes a smartphone. In some examples, the mobile computing device 426 includes a tablet. In some examples, the browser application 406*a* is a web browser (e.g., a browser engine or a search engine) that is installed on a mobile operating system of the computing device 326. The browser application 406*a* may connect any third-party digital asset holder, which is represented as the native application 402*b*.

The native application 402*b* is a native mobile application configured to execute on a mobile operating system of the mobile computing device 426. In some examples, the native application 402*b* may include an Android application, a mobile iOS application, and/or a mobile Windows application. The native application 402*b* may be referred to as a crypt-wallet. The native application 402*b* may store a private key 404, which is used to authenticate blockchain transactions on a blockchain network 410. In some examples, the native application 402*b* may render web content using a web view controller or a browser tab.

The browser application 406*a* defines one or more APIs 438 that enable the browser application 406*a* to communicate with the native application 402*b* (e.g., when the web content 408 invokes an object to create a transaction on the blockchain network 410) to obtain information from and/or to notify the native application 402*b* of information regarding the blockchain transaction. The API(s) 438 may be a programming interface that allows the browser application 406*a* and the native application 402*b* to communicate with each other.

The browser application 406*a* may define one or more APIs 440 that enable the browser application 406*a* to communicate with the blockchain network 410. For example, the API(s) 440 may be a programming interface that allows the browser application 406*a* and the blockchain network 410 to communicate with each other, e.g., facilitate the adding of the blockchain transaction on the blockchain network 410 and receiving a notification that the blockchain transaction has successfully been added. In some examples, the browser application 406*a* includes a JavaScript library configured to implement the API(s) 438 and the API(s) 440. In some examples, the browser application 406*a* defines native APIs, where the native APIs include the API(s) 438 and the API(s) 440.

The browser application 406*a* may detect whether the web content 408 has selected (or initialized or invoked) an object for processing a blockchain transaction. In some examples, a user selecting a particular UI item on the web content 408 may cause the web content 408 to select the object. In some examples, the object relates to a transaction request to obtain a list of assets (e.g., query accounts). In some examples, in response to the web content 408 selecting the object, the browser application 406*a* may transmit, via the API(s) 438, an asset request to the native application 402*b*, and then receive, via the API(s) 438, an asset list that identifies the digital assets associated with the native application 402*b*. In some examples, in response to receipt of the asset request, the native application 402*b* obtains asset information (e.g., the asset information 207 of FIGS. 2A through 2D) regarding user's digital assets that are stored on the blockchain network 410. The asset list may identify one or more types of crypto-currencies, and, in some examples, identifies an amount of a respective crypto-currency. In some examples, the browser application 406*a* may render a UI object that provides the asset list.

In some examples, the object relates to the creation of a blockchain transaction using digital data stored on the blockchain network 410 (e.g., send transaction). In response to the web content 408 selecting an object for creating a blockchain transaction, the browser application 406*a* may transmit, via the API(s) 438, a transaction request to the native application 402*b*. The transaction request may include details about the blockchain transaction to be created on the blockchain network 410 such as the sender, the receiver, the amount, the type of digital asset, etc. In response to the transaction request, the native application 402*b* may authenticate the transaction request using the private key 404. For example, the native application 402*b* may execute a smart contract or a cryptographic operation using the private key 404 to authenticate (or sign) the transaction request. In return, the browser application 406*a* may receive, via the API(s) 438, an authenticated transaction request.

The browser application 406*a* may transmit, via the API(s) 440, the authenticated transaction request to a node gateway of the blockchain network 410, and the blockchain network 410 adds the blockchain transaction to the blockchain network 410. After the blockchain transaction is committed to the blockchain network 410, the browser application 406*a* receives, via the API(s) 440, a transaction response from the blockchain network 410, where the transaction response includes a transaction identifier of the blockchain transaction added to the blockchain network 410. In some examples, the authenticated transaction request and the transaction response are communicated between the browser application 406*a* and the blockchain network 410 using JSON messages. In response to the transaction response, the browser application 406*a* transmits, via the API(s) 438, a notification to the native application 402*b*, where the notification includes the transaction identifier. The native application 402*b* may update the user's asset information with the newly added blockchain transaction. In some examples, the browser application 406*a* also transmits a notification (e.g., via APIs 438) to the website of the web content 408, where the notification indicates that the blockchain transaction has been successfully added to the blockchain network 410.

Figure 5:
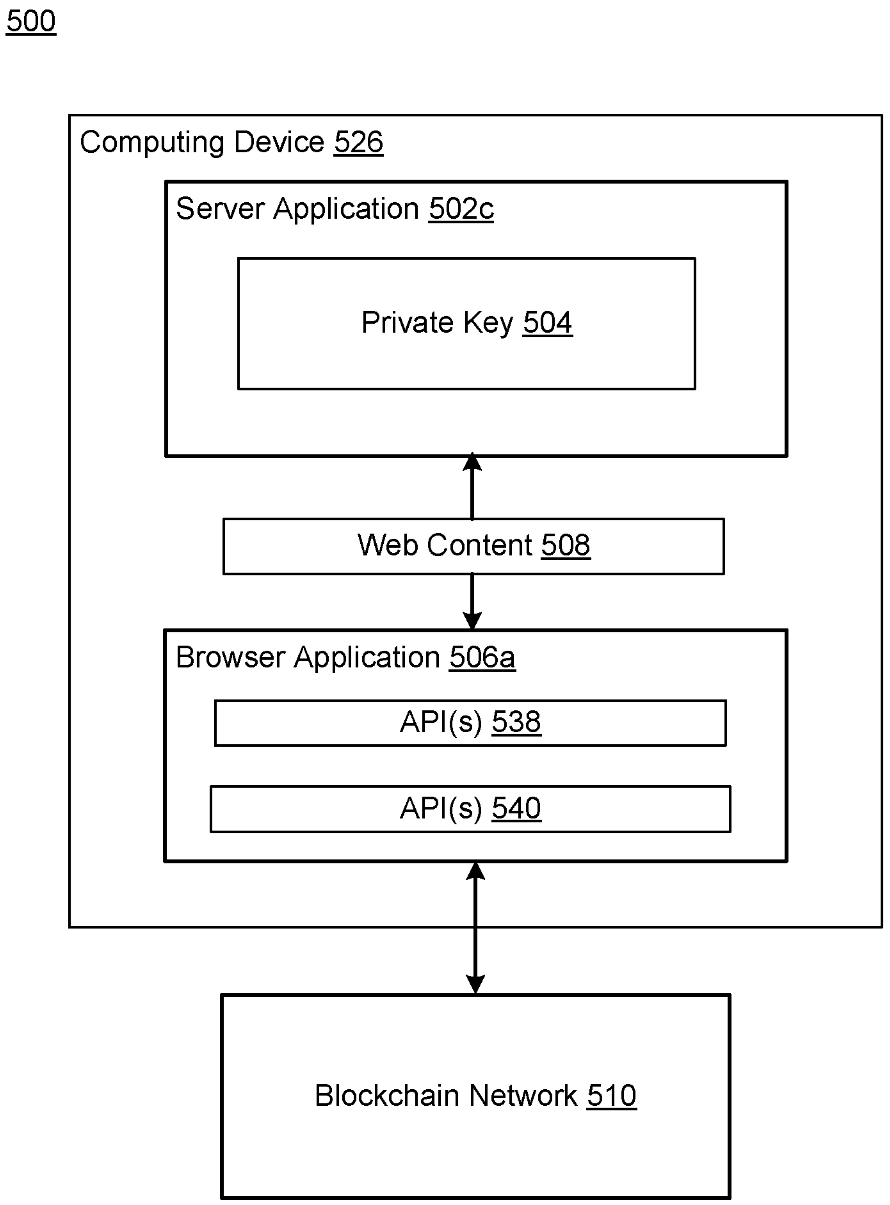
FIG. 5 illustrates an example of connecting a browser application to a server application to process a blockchain transaction according to an aspect.

FIG. 5 illustrates a system 500 having a browser application 506*a* connected to a server application 502*c* to process a blockchain transaction on web content 508. In some examples, the web content 508 is rendered by the browser application 506*a*. The system 500 may be an example of the system 100 of FIG. 1 and/or the system 200 of FIGS. 2A through 2D and may include any of the details discussed with reference to those figures.

The browser application 506*a* is executable by a computing device 526. In some examples, the computing device 526 includes a laptop computer. In some examples, the computing device 526 includes a desktop computer. However, the computing device 526 may be any type of computing device such as a smartphone, tablet, or a wearable device. The browser application 506*a* may connect any third-party digital asset holder, which is represented as the server application 502*c*. The server application 502*c* may be an application executing on one or more server computers. In some examples, the server application 502*c* is a cloud application. In some examples, the server application 502*c* is a web application. A server application 502*c* may be an application program that is stored on a remote server (e.g., server computer(s) 216 of FIGS. 2A through 2D) and delivered over a network through the browser application 506*a* (e.g., a browser tab). In some examples, the server application 502*c* is a progressive web application, which can be stored (at least in part) on the computing device 526 and used offline.

The browser application 506*a* defines one or more APIs 538 that enable the browser application 506*a* to communicate with the server application 502*c* (e.g., when the web content 508 invokes an object to create a transaction on the blockchain network 510) to obtain information from and/or to notify the server application 502*c* of information regarding the blockchain transaction. The API(s) 538 may be a programming interface that allows the browser application 506*a* and the server application 502*c* to communicate with each other.

The browser application 506*a* may define one or more APIs 540 that enable the browser application 506*a* to communicate with the blockchain network 510. For example, the API(s) 540 may be a programming interface that allows the browser application 506*a* and the blockchain network 510 to communicate with each other, e.g., facilitate the adding of the blockchain transaction on the blockchain network 510 and receiving a notification that the blockchain transaction has successfully been added. In some examples, the browser application 506*a* includes a JavaScript library configured to implement the API(s) 538 and the API(s) 540. In some examples, the browser application 506*a* defines native APIs, where the native APIs include the API(s) 538 and the API(s) 540.

The browser application 506*a* may detect whether the web content 508 has selected (or initialized or invoked) an object for processing a blockchain transaction. In some examples, a user selecting a particular UI item on the web content 508 may cause the web content 508 to select the object. In some examples, the object relates to a transaction request to obtain a list of assets (e.g., query accounts). In some examples, in response to the web content 508 selecting the object, the browser application 506*a* may transmit, via the API(s) 538, an asset request to the server application 502*c*, and then receive, via the API(s) 538, an asset list that identifies the digital assets associated with the server application 502*c*. In some examples, in response to receipt of the asset request, the server application 502*c* obtains asset information (e.g., the asset information 207 of FIGS. 2A through 2D) regarding user's digital assets that are stored on the blockchain network 510. The asset list may identify one or more types of crypto-currencies, and, in some examples, identifies an amount of a respective crypto-currency. In some examples, the browser application 506*a* may render a UI object that provides the asset list.

In some examples, the object relates to the creation of a blockchain transaction using digital data stored on the blockchain network 510 (e.g., send transaction). In response to the web content 508 selecting an object for creating a blockchain transaction, the browser application 506*a* may transmit, via the API(s) 538, a transaction request to the server application 502*c*. The transaction request may include details about the blockchain transaction to be created on the blockchain network 510 such as the sender, the receiver, the amount, the type of digital asset, etc. In response to the transaction request, the server application 502*c* may authenticate the transaction request using the private key 504. For example, the server application 502*c* may execute a smart contract or a cryptographic operation using the private key 504 to authenticate (or sign) the transaction request. In return, the browser application 506*a* may receive, via the API(s) 538, an authenticated transaction request.

The browser application 506*a* may transmit, via the API(s) 540, the authenticated transaction request to a node gateway of the blockchain network 510, and the blockchain network 510 adds the blockchain transaction to the blockchain network 510. After the blockchain transaction is committed to the blockchain network 510, the browser application 506*a* receives, via the API(s) 540, a transaction response from the blockchain network 510, where the transaction response includes a transaction identifier of the blockchain transaction added to the blockchain network 510. In some examples, the authenticated transaction request and the transaction response are communicated between the browser application 506*a* and the blockchain network 510 using JSON messages. In response to the transaction response, the browser application 506*a* transmits, via the API(s) 538, a notification to the server application 502*c*, where the notification includes the transaction identifier. The server application 502*c* may update the user's asset information with the newly added blockchain transaction. In some examples, the browser application 506*a* also transmits a notification (e.g., via APIs 538) to the website of the web content 508, where the notification indicates that the blockchain transaction has been successfully added to the blockchain network 510.

Figure 6:
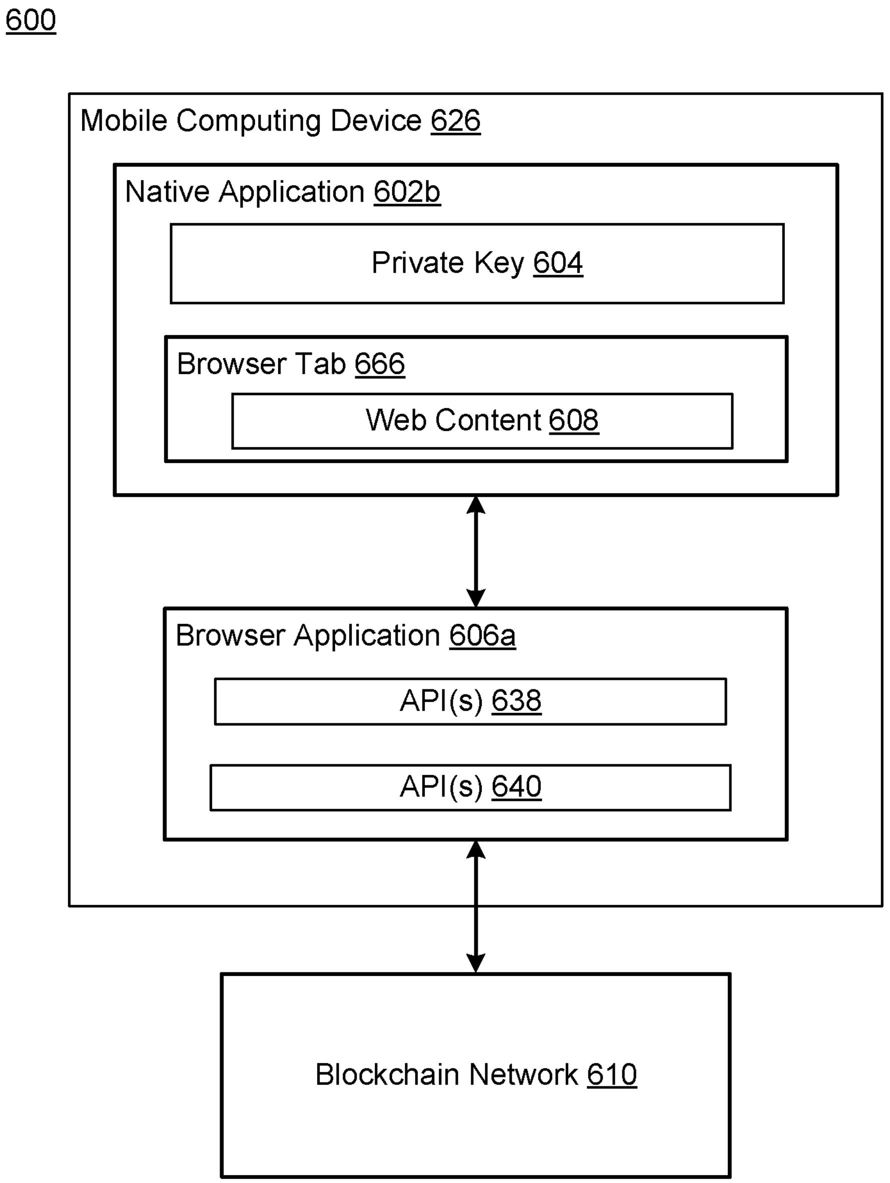
FIG. 6 illustrates an example of connecting a browser application to a native application with a custom browser tab to process a blockchain transaction according to an aspect.

FIG. 6 illustrates a system 600 having a browser application 506*a* connected to a native application 602*b* to process a blockchain transaction on web content 608 rendered by a browser tab 666. In some examples, the browser tab 666 is a custom browser tab displayed by the native application 602*b*. The system 600 may be an example of the system 100 of FIG. 1 and/or the system 200 of FIGS. 2A through 2D and may include any of the details discussed with reference to those figures.

A custom browser tab is a browser tab, associated with the browser application 606*a*, but rendered within the context of a native application 602*b*. For example, the native application 602*b* may display application content within a UI of the native application 602*b*, where the application content may include a link to web content 608. When the link to web content 608 is selected, the web content 608 may be rendered in a browser tab 666 (e.g., a custom browser tab) within the native application 602*b*. In contrast, with respect to non-custom tabs, when a link to web content 608 is selected, a separate browser tab is rendered on top of the native application's UI.

The browser application 606*a* is executable by a mobile computing device 626. In some examples, the mobile computing device 626 includes a smartphone. In some examples, the mobile computing device 626 includes a tablet. In some examples, the browser application 606*a* is a web browser (e.g., a browser engine or a search engine) that is installed on a mobile operating system of the mobile computing device 626.

The browser tab 666 may include one or more selectable items that are associated with actions of the browser application 606*a* and one or more selectable items that are associated with actions of the underlying native application 602*b*. For example, if the native application 602*b* is a social media application, a link to an article may be displayed within a message shown on the user's timeline. If the user selects the link to the article, a browser tab 666 is displayed within the context of the social media application, where the browser tab 666 displays the article. The browser tab 666 may include selectable items (e.g., controls on a navigation bar and/or toolbar) that are associated with actions of the browser application 606*a*. However, the browser tab 666 may include one or more selectable items (e.g., customized activity buttons or controls) that are associated with actions taken with the social media application (e.g., share the article on the platform). Although the above example uses a social media application, the underlying native application 602*b* may encompass a wide variety of applications, including video sharing applications (among other types of applications).

In some examples, the browser tab 666 includes customized display attributes of the UI of the browser tab 666 (e.g., setting a color (e.g., tint) for the background of a navigation panel and/or toolbar section). For example, the navigation panel (e.g., having the forward and/or back navigation controls) and the items for the toolbar are typically standard across browser tabs that are rendered for a non-custom browser tab. However, an application developer may change one or more aspects of the navigation panel and/or toolbar to customize the tab to correspond to the underlying native application 602*b*.

In some examples, the native application 602*b* includes or is associated with a digital asset holder, e.g., stores and manages a private key 604 to authenticate (e.g., sign) blockchain transactions. In some examples, the native application 602*b* includes a built-in (e.g., native) digital asset holder. In other words, the native application 602*b* may include a sub-program that manages the private key 604 and can authenticate blockchain transactions using the private key 604. In some examples, the browser tab 666 may include an object (e.g., object 236) that enables a blockchain transaction to be created. In some examples, the browser tab 666 itself exposes the object to enable the creation of the blockchain transaction.

The browser application 606*a* defines one or more APIs 638 that enable the browser application 606*a* to communicate with the native application 602*b* (e.g., when the browser tab 666 invokes the object to create a transaction on the blockchain network 610) to obtain information from and/or to notify the native application 602*b* of information regarding the blockchain transaction. The API(s) 638 may be a programming interface that allows the browser application 606*a* and the native application 602*b* to communicate with each other.

The browser application 606*a* may define one or more APIs 640 that enable the browser application 606*a* to communicate with the blockchain network 610. For example, the API(s) 640 may be a programming interface that allows the browser application 406*a* and the blockchain network 610 to communicate with each other, e.g., facilitate the adding of the blockchain transaction on the blockchain network 610 and receiving a notification that the blockchain transaction has successfully been added. In some examples, the browser application 606*a* includes a JavaScript library configured to implement the API(s) 638 and the API(s) 640. In some examples, the browser application 606*a* defines native APIs, where the native APIs include the API(s) 638 and the API(s) 640.

The browser application 606*a* may detect whether the browser tab 666 (e.g., the custom browser tab) has selected (or initialized or invoked) an object for processing a blockchain transaction. In some examples, a user selecting a particular UI item on the browser tab 666 may cause the browser tab 666 to select the object. In some examples, the object relates to a transaction request to obtain a list of assets (e.g., query accounts). In some examples, in response to the browser tab 666 selecting the object, the browser application 606*a* may transmit, via the API(s) 638, an asset request to the native application 602*b*, and then receive, via the API(s) 638, an asset list that identifies the digital assets associated with the native application 602*b*. In some examples, in response to receipt of the asset request, the native application 602*b* obtains asset information (e.g., the asset information 207 of FIGS. 2A through 2D) regarding user's digital assets that are stored on the blockchain network 610. The asset list may identify one or more types of crypto-currencies, and, in some examples, identifies an amount of a respective crypto-currency. In some examples, the browser application 606*a* may render a UI object that provides the asset list.

In some examples, the object relates to the creation of a blockchain transaction using digital data stored on the blockchain network 610 (e.g., send transaction). In response to the browser tab 666 selecting an object for creating a blockchain transaction, the browser application 606*a* may transmit, via the API(s) 638, a transaction request to the native application 602*b*. The transaction request may include details about the blockchain transaction to be created on the blockchain network 610 such as the sender, the receiver, the amount, the type of digital asset, etc. In response to the transaction request, the native application 602*b* may authenticate the transaction request using the private key 604. For example, the native application 602*b* may execute a smart contract or a cryptographic operation using the private key 404 to authenticate (or sign) the transaction request. In return, the browser application 606*a* may receive, via the API(s) 638, an authenticated transaction request.

The browser application 606*a* may transmit, via the API(s) 640, the authenticated transaction request to a node gateway of the blockchain network 610, and the blockchain network 610 adds the blockchain transaction to the blockchain network 610. After the blockchain transaction is committed to the blockchain network 610, the browser application 606*a* receives, via the API(s) 640, a transaction response from the blockchain network 610, where the transaction response includes a transaction identifier of the blockchain transaction added to the blockchain network 610. In some examples, the authenticated transaction request and the transaction response are communicated between the browser application 606*a* and the blockchain network 610 using JSON messages. In response to the transaction response, the browser application 606*a* transmits, via the API(s) 638, a notification to the native application 602*b*, where the notification includes the transaction identifier. The native application 602*b* may update the user's asset information with the newly added blockchain transaction. In some examples, the browser application 606*a* also transmits a notification (e.g., via APIs 638) to the website of the web content 608, where the notification indicates that the blockchain transaction has been successfully added to the blockchain network 610.

FIGS. 7A through 7D illustrate example user interfaces of connecting a browser application to an application that includes a private key for enabling blockchain transactions according to various aspects. The user interfaces of FIGS. 7A through 7D may be displayed according to any of the systems discussed with reference to the previous figures.

Figure 7A:
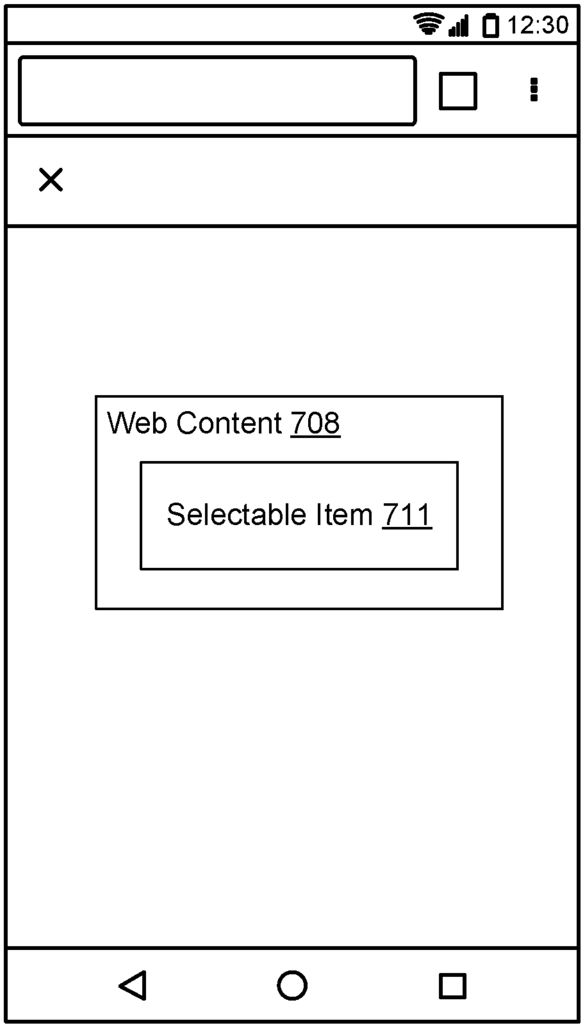
FIGS. 7A through 7D illustrate example user interfaces for processing a blockchain transaction using a browser application according to various aspects.

Referring to FIG. 7A, web content 708 may be displayed on a computing device. The web content 708 may be displayed from an application executing on the computing device. In some examples, the web content 708 may be displayed via a browser application. In some examples, the web content 708 is displayed via a browser tab. In some examples, the web content 708 is displayed via a native application. In some examples, the web content 708 includes a user-selectable item 711 to initiate a transaction on a blockchain network.

Figure 7B:
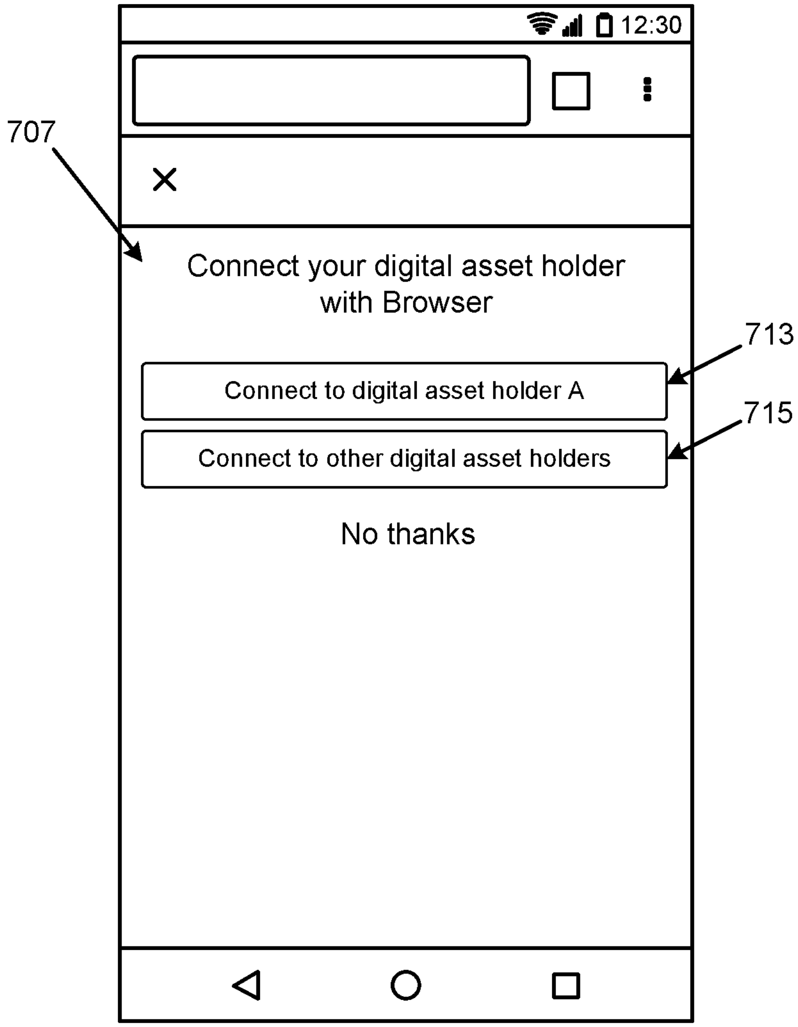

In response to the selection of the user-selectable item 711, referring to FIG. 7B, an application (e.g., a browser application or non-browser application) may render a UI object 707 that allows a user to connect a particular digital asset holder with a browser application. In some examples, the browser application may detect that the web content 708 selects (e.g., invokes, initializes, etc.) an object to create a blockchain transaction, e.g., such as when the user selects the user-selectable item 711 of FIG. 7A. In some examples, the browser application renders the UI object 707. The UI object 707 may identify one or more digital asset holders to select. In some examples, the UI object 707 may display a connection control 713 to permit the browser application to connect with a particular digital asset holder (e.g., digital asset holder A). In some examples, the UI object 707 may display a connection control 715 to select other digital asset holder(s) that are not identified on the UI object 707. For instance, selection of the connection control 715 may render an additional UI object to select other digital asset holder(s).

Figure 7C:
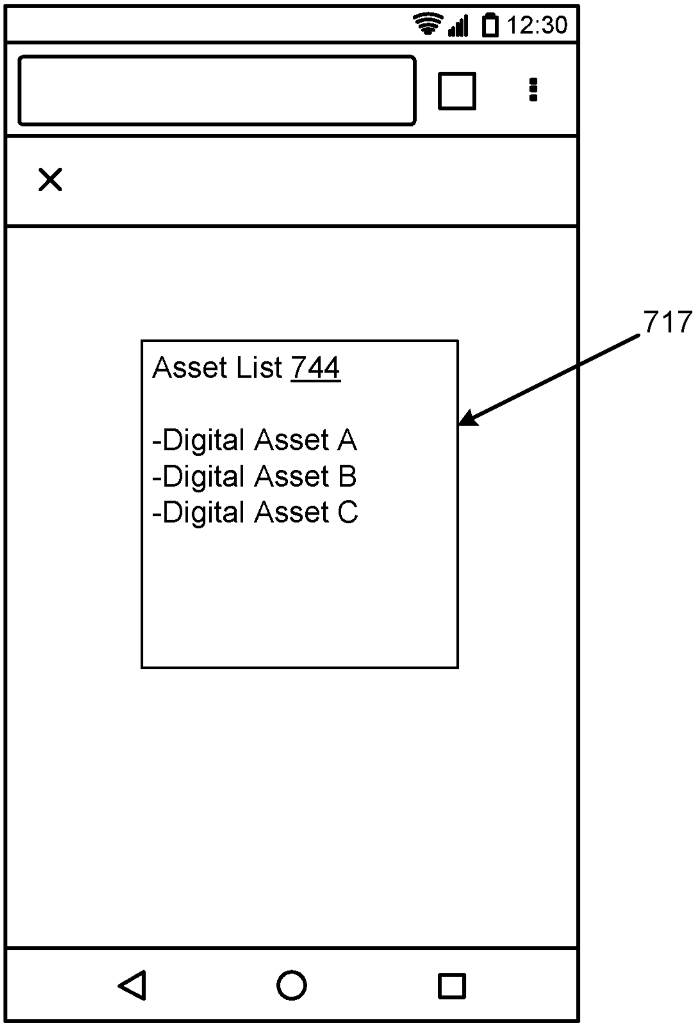
Figure 7D:
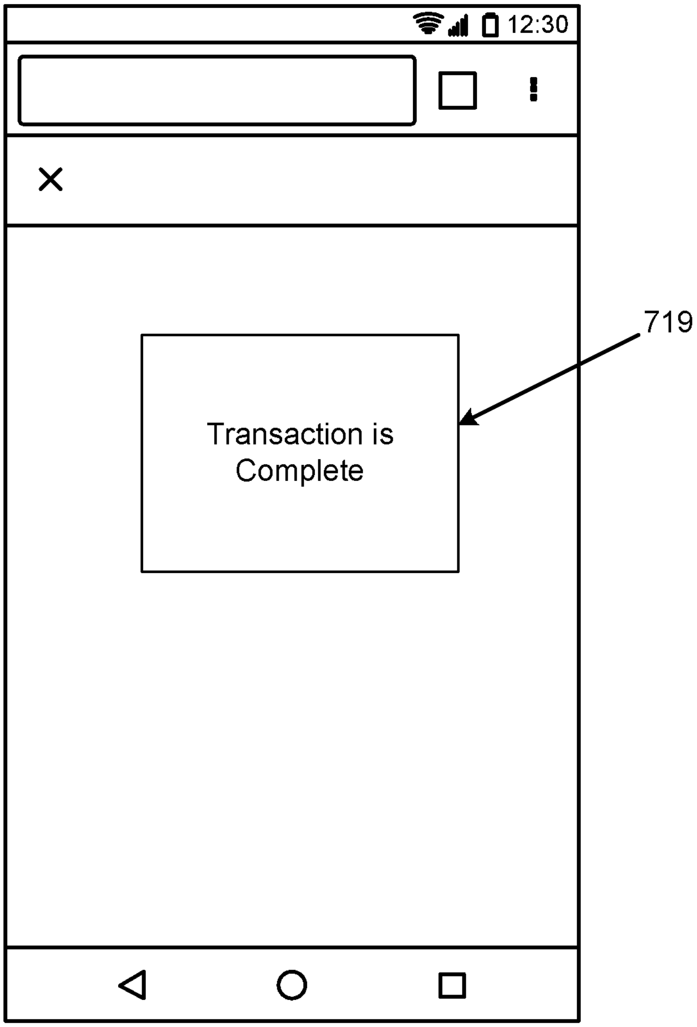

In response to selection of the connection control 713, referring to FIG. 7C, the browser application may render a UI object 717 that displays an asset list 744 associated with the selected digital asset holder. In some examples, the asset list 744 may identify the user's digital assets (e.g., digital asset A, digital asset B, digital asset C, etc.), associated with the selected digital asset holder, that are stored on the blockchain network. For example, the asset list 744 may identify types of crypto-currencies that are managed by the selected digital asset holder.

For example, the browser application may transmit, via first API(s), an asset request to the digital asset holder, and then receive, via the first API(s), an asset list that identifies the digital assets associated with the selected digital asset holder. In some examples, in response to receipt of the asset request, the digital asset holder obtains asset information (e.g., the asset information 207 of FIGS. 2A through 2D) regarding user's digital assets that are stored on the blockchain network. The asset list 744 may identify one or more types of crypto-currencies, and, in some examples, identifies an amount of a respective crypto-currency. In some examples, the browser application may render a UI object 717 that provides the asset list 744.

In some examples, in response to the selection of a particular digital asset (e.g., digital asset A), the browser application may proceed to process the blockchain transaction so that it is committed to the blockchain network. For example, the browser application may transmit, via the first API(s), a transaction request to the digital asset holder. The transaction request may include details about the blockchain transaction to be created on the blockchain network such as the sender, the receiver, the amount, the type of digital asset, etc. In response to the transaction request, the digital asset holder may authenticate the transaction request using the private key. For example, the digital asset holder may execute a smart contract or a cryptographic operation using the private key to authenticate (or sign) the transaction request. In return, the browser application may receive, via the first API(s), an authenticated transaction request.

The browser application may transmit, via the second API(s), the authenticated transaction request to a node gateway of the blockchain network, and the blockchain network adds the blockchain transaction to the blockchain network. After the blockchain transaction is committed to the blockchain network, the browser application receives, via the second API(s), a transaction response from the blockchain network, where the transaction response includes a transaction identifier of the blockchain transaction added to the blockchain network. In response to the transaction response, the browser application transmits, via the first API(s), a notification to the digital asset holder, where the notification includes the transaction identifier. The crypt-wallet may update the user's asset information with the newly added blockchain transaction. In some examples, the browser application also transmits a notification to the website of the web content, where the notification indicates that the blockchain transaction has been successfully added to the blockchain network. In some examples, referring to FIG. 7D, the browser application renders a UI object 719 indicating that the transaction is complete.

FIGS. 8A through 8F illustrate example user interfaces of connecting a browser application to an application that includes a private key for enabling blockchain transactions according to various aspects. In some examples, the user interfaces of FIGS. 8A through 8F relate to processing a crypto-payment for a subscription access right. The user interfaces of FIGS. 8A through 8F may be displayed according to any of the systems discussed with reference to the previous figures.

In some examples, the digital asset holder is implemented by a server application. For example, a server application may manage access to online content (e.g., web content) via a subscription. In some examples, the server application may include a digital asset holder that identifies one or more tokens (e.g., creator tokens) that are stored on the blockchain network. In some examples, subscription access rights (e.g., digital rights) may be granted to a particular user in exchange for one or more tokens. In some examples, the tokens are NFTs.

Figure 8A:
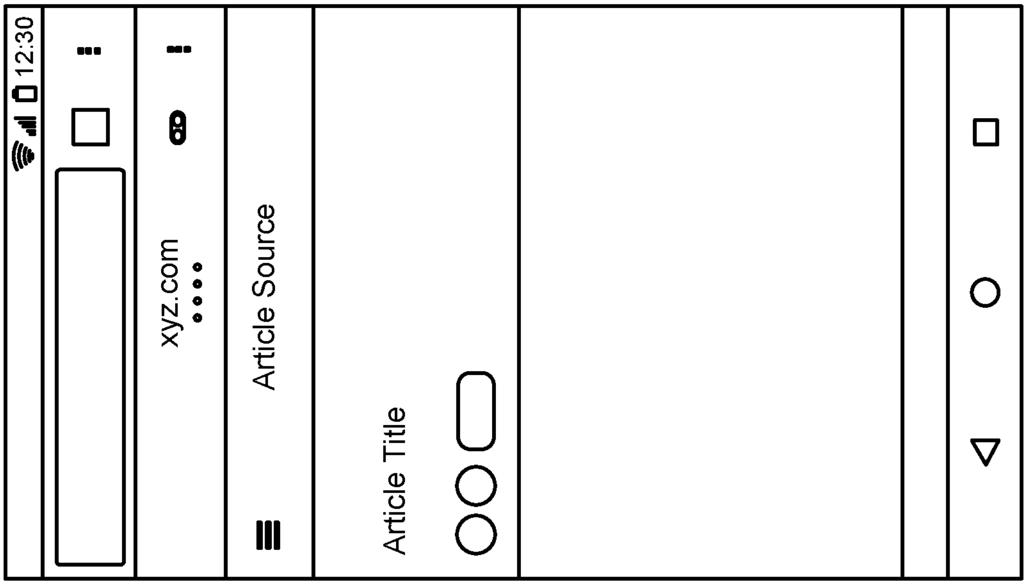
FIGS. 8A through 8F illustrate example user interfaces for processing a blockchain transaction using a browser application according to various aspects.
Figure 8B:
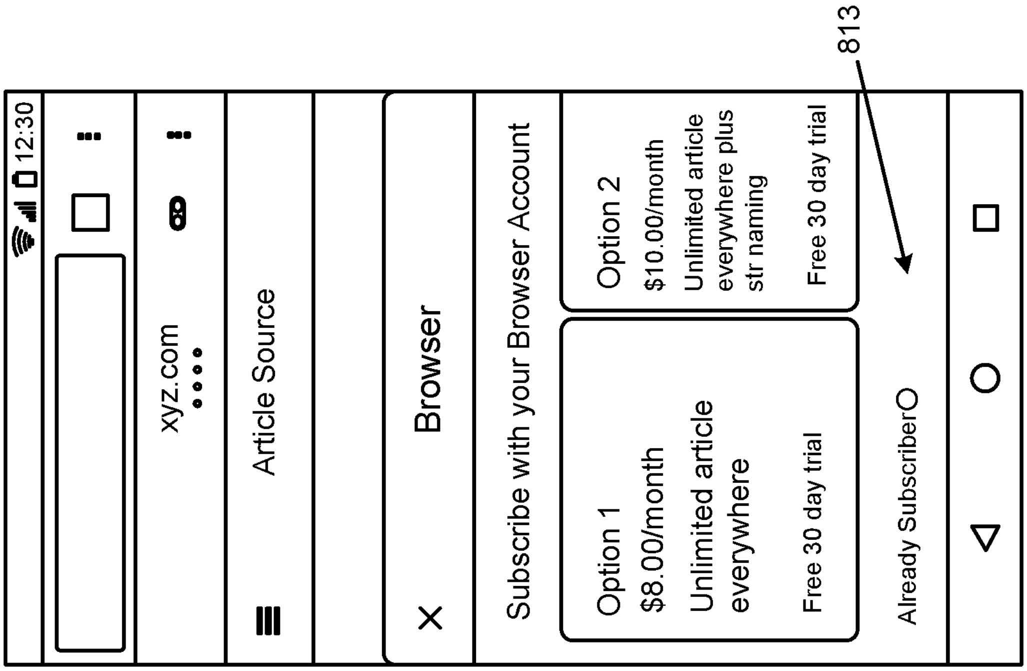
Figure 8C:
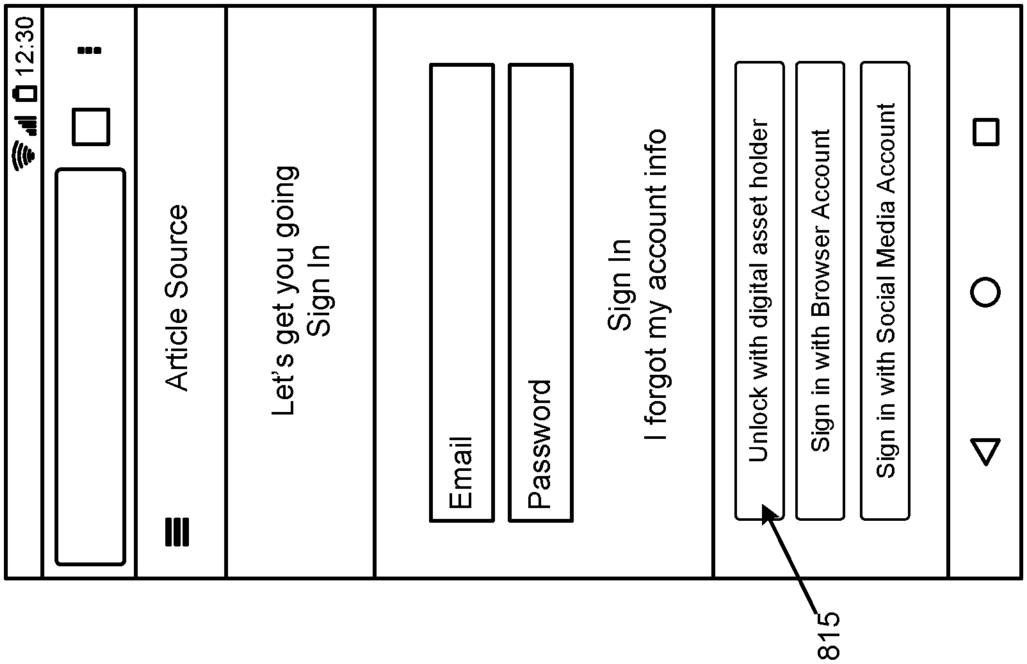
Figure 8D:
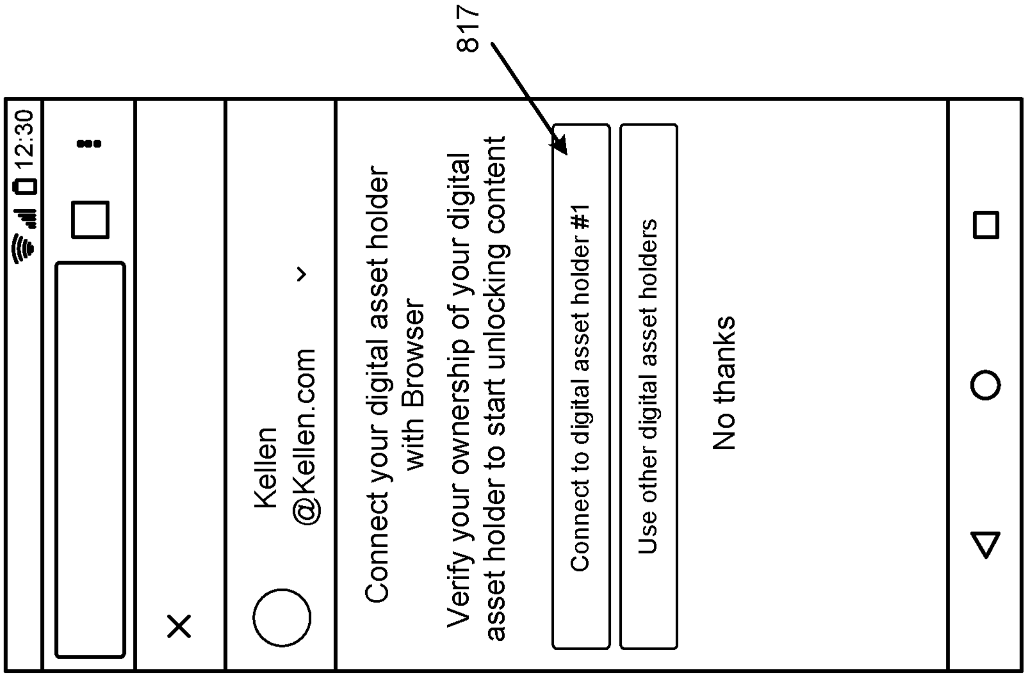
Figure 8E:
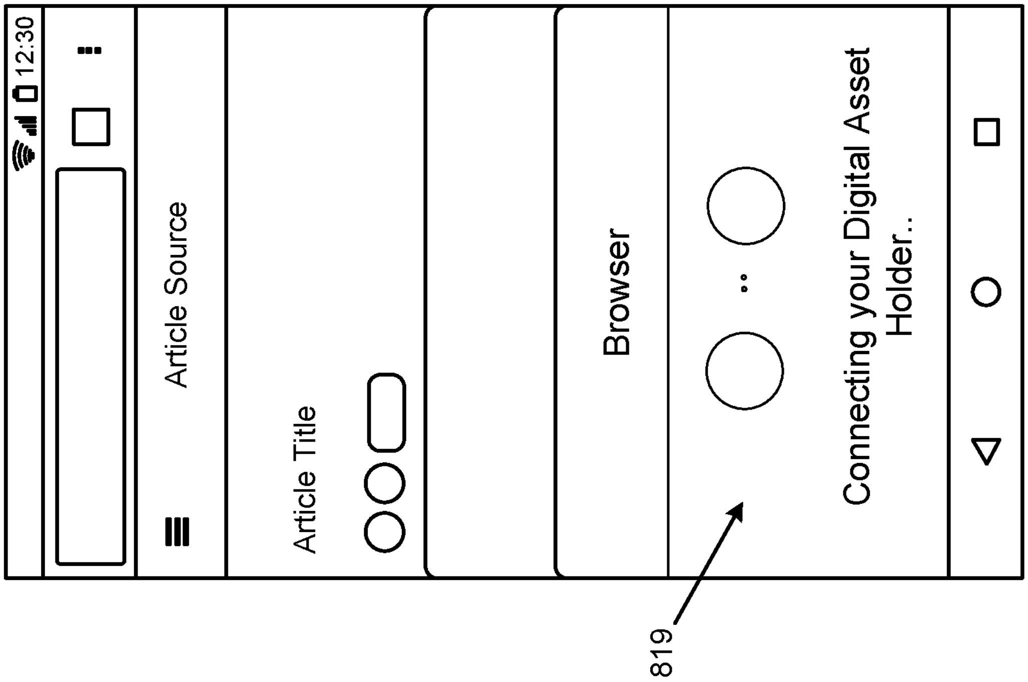
Figure 8F:
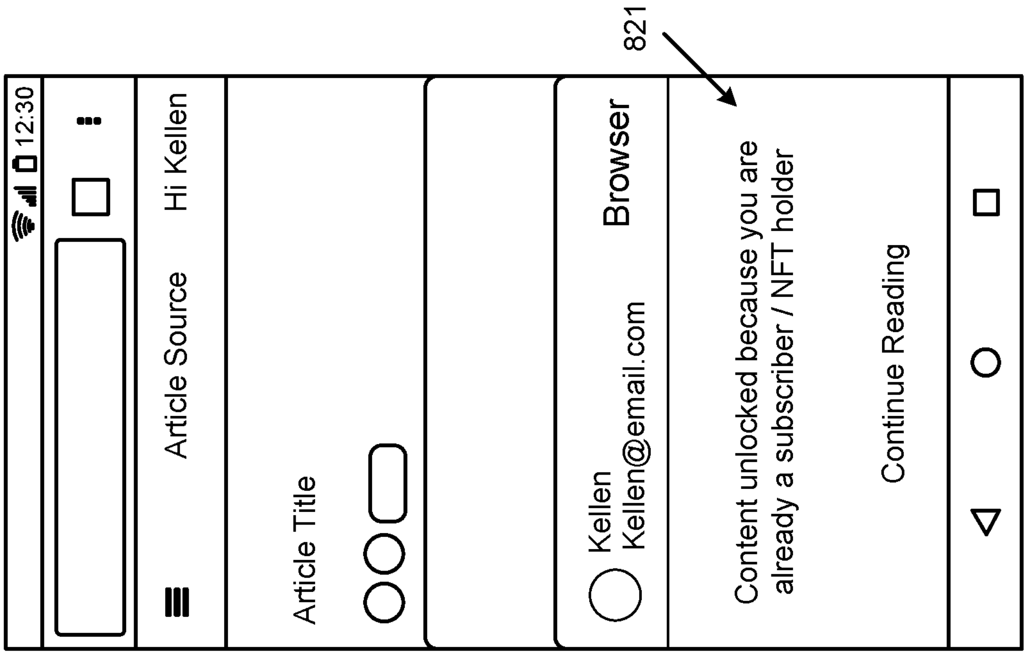

Referring to FIG. 8A, a portion of web content (e.g., an article from a website (xyz.com) is displayed. In some examples, a browser application may render a portion of the web content (e.g., when a user selects the link to the article). Upon further selection of the article, referring to FIG. 8B, the browser application may render a UI object that permits the user to subscribe using the browser account (e.g., option 1, option 2) and/or may provide a selectable item 813 to obtain access to the details of the article because the user is already a subscriber. In response to the selection of the selectable item 813, referring to FIG. 8C, the browser application may render a UI object to authenticate the subscription access using one or more accounts (e.g., browser account(s), social media account(s), etc.). The UI object may also provide a selectable item 815 to obtain access to the article using a digital asset holder. In response to selection of the selectable item 815, referring to FIG. 8D, the browser application may render a UI object that allows the browser application to connect with a particular digital asset holder. The UI object of FIG. 8D may include a selectable item 817 that enables the user to select a particular digital asset holder (e.g., digital asset holder #1).

In response to selection of the selectable item 817, the browser application may connect to the selected digital asset holder to use a token (e.g., NFT) to obtain access to the web content (e.g., the Article). In some examples, the browser application may render a UI object 819 to inform the user that the browser application is connecting to the digital asset holder while the transaction is added to the blockchain network.

In some examples, in response to selection of the selectable item 817, the browser application sends, via one or more first APIs, a transaction request (e.g., the transaction request 248 of FIGS. 2A through 2D) to a server computer that executes the server application. The server application receives the transaction request, retrieves the user's private key, and authenticates the transaction request. The browser application receives, via the first API(s), an authenticated transaction request (e.g., the authenticated transaction request 246 of FIGS. 2A through 2D) from the server computer. Then, the browser application communicates with the blockchain network, via one or more second APIs, to transmit the authenticated transaction request and to receive a transaction response (e.g., the transaction response 222 of FIGS. 2A through 2D). The browser application sends, via the first APIs, a notification (e.g., the notification 252 of FIGS. 2A through 2D) to the server application. In some examples, referring to FIG. 8F, the browser application renders a UI object 821 that identifies that the content is unlocked based on the token payment.

Figure 9:
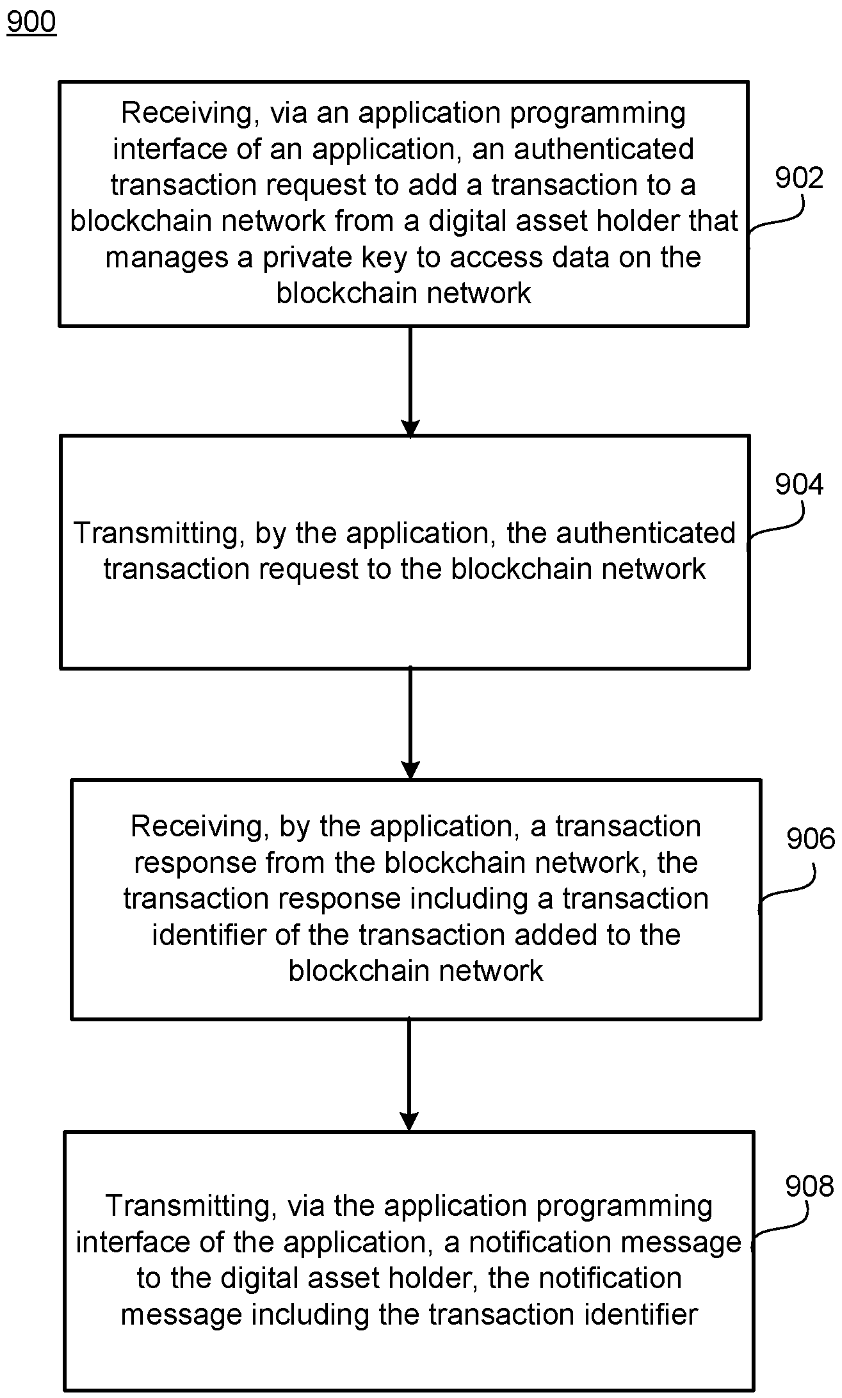
FIG. 9 illustrates a flowchart depicting example operations of connecting an application with a digital asset holder to process a blockchain transaction according to an aspect.

FIG. 9 is a flowchart 900 depicting example operations of connecting an application with a digital asset holder to process a blockchain transaction according to an aspect. In some examples, the application includes a browser application. In some examples, the application includes a non-browser-based application. In some examples, the digital asset holder includes an extension to the browser application. In some examples, the digital asset holder includes a native application. In some examples, the digital asset holder includes a server application.

Although the flowchart 900 is explained with respect to the system 100 of FIG. 1, the flowchart 900 may be applicable to any of the embodiments discussed herein. Although the flowchart 900 of FIG. 9 illustrates the operations in sequential order, it will be appreciated that this is merely an example, and that additional or alternative operations may be included. Further, operations of FIG. 9 and related operations may be executed in a different order than that shown, or in a parallel or overlapping fashion.

Operation 902 includes receiving, via an application programming interface of an application 106, an authenticated transaction request to add a transaction 112 to a blockchain network 110 from a digital asset holder 102 that manages a private key to access data on the blockchain network. In some examples, the application is a browser application. In some examples, the digital asset holder 102 is an extension to the browser application. In some examples, the digital asset holder 102 is a native application. In some examples, the digital asset holder 102 is a server application. In some examples, the application 106 and the digital asset holder 102 communicate with each other via at least one first application programming interface.

Operation 904 includes transmitting, by the application 106, the authenticated transaction request to the blockchain network 110. In some examples, the authenticated transaction request is transmitted to the blockchain network 110 via at least one second application programming interface that defines an interface between the application 106 and the blockchain network 110. The application 106 and the blockchain network 110 may communicate with each other via JSON messages. Operation 906 includes receiving, by the application 106, a transaction response from the blockchain network 110, the transaction response including a transaction identifier of the transaction 112 added to the blockchain network 110. For example, the application 106 may receive the results of the transaction being added to the blockchain network 110. Operation 908 includes transmitting, via the application programming interface of the application 106, a notification message to the digital asset holder 102, the notification message including the transaction identifier. In some examples, a notification message is transmitted to the website that provided the web content (e.g., which received the transferred digital asset).

In some examples, the operations include rendering web content having a user-selectable item to institute the transaction on the blockchain network. In some examples, the operations include, in response to the user-selectable item being selected, transmitting a request to authenticate the transaction using the private key (e.g., an authentication request). In some examples, the request to authenticate the transaction is the transaction request 248 of FIGS. 2A through 2D. The operations may include receiving the authenticated transaction request in response to the request to authenticate the transaction using the private key. In some examples, the operations include, in response to the selectable item being selected, transmitting an asset request to the digital asset holder and receiving an asset list from the digital asset holder, where the asset list may identify one or more digital assets stored on the blockchain network. In some examples, the operations include obtaining the first application programming interface and the second application programming interface from a storage device associated with the application.

According to some aspects, the method (e.g., the operations) may include one or more of the following features (or any combination thereof). The method includes rendering, by the application, web content having a user-selectable item to institute the transaction on the blockchain network, and in response to receiving a selection of the user-selectable item, transmitting a request to authenticate the transaction, to the digital asset holder. The method may include rendering, by the application, web content having a user-selectable item to institute the transaction on the blockchain network, in response to receiving a selection of the user-selectable item, transmitting an asset request to the digital asset holder, and receiving an asset list from the digital asset holder, the asset list identifying one or more digital assets stored on the blockchain network. The method may include rendering, by the application, a user-selectable item to connect to the digital asset holder that manages the private key to access the data on the blockchain network. The application programming interface is a first application programming interface, where the authenticated transaction request is transmitted to the blockchain network via a second application programming interface, the second application programming interface configured to enable communication between the application and the blockchain network. The method may include obtaining the first application programming interface and the second application programming interface from a storage device associated with the application. The method may include transmitting a JavaScript object notation message to a node gateway of the blockchain network, the JavaScript object notation message including the authenticated transaction request. The application may include a browser application. The digital asset holder may include an extension to the browser application. The digital asset holder may include a native application. The digital asset holder may include a server application.

According to an aspect, an apparatus includes at least one processor, and a non-transitory computer-readable medium storing executable instructions that when executed by the at least one processor cause the at least one processor to receive, via an application programming interface of a browser application, an authenticated transaction request to add a transaction to a blockchain network from a digital asset holder that manages a private key to access data on the blockchain network, transmit, by the browser application, the authenticated transaction request to the blockchain network, receive, by the browser application, a transaction response from the blockchain network, the transaction response including a transaction identifier of the transaction added to the blockchain network, and transmit, via the application programming interface of the browser application, a notification message to the digital asset holder, the notification message including the transaction identifier.

According to some aspects, the apparatus may include one or more of the following features (or any combination thereof). The executable instructions include instructions that when executed by the at least one processor cause the at least one processor to render, by the browser application, web content having a user-selectable item to institute the transaction on the blockchain network, and in response to receiving a selection of the user-selectable item, transmit a request to authenticate the transaction, to the digital asset holder, wherein the digital asset holder is configured to authenticate the transaction using the private key. The executable instructions include instructions that when executed by the at least one processor cause the at least one processor to render, by the browser application, a user-selectable item to connect to the digital asset holder that manages the private key to access the data on the blockchain network. The application programming interface is a first application programming interface, where the authenticated transaction request is transmitted to the blockchain network via a second application programming interface configured to enable communication between the browser application and the blockchain network, where the executable instructions include instructions that when executed by the at least one processor cause the at least one processor to obtain the first application programming interface and the second application programming interface from a storage device associated with the browser application.

According to an aspect, a non-transitory computer-readable medium storing executable instructions that when executed by at least one processor cause the at least one processor to execute operations, the operations including rendering web content having a user-selectable item to institute a transaction on a blockchain network, in response to receiving a selection of the user-selectable item, receiving, by a browser application, an authenticated transaction request to add the transaction to the blockchain network from a digital asset holder that manages a private key to access data on the blockchain network, transmitting, by the browser application, the authenticated transaction request to the blockchain network, receiving, by the browser application, a transaction response from the blockchain network, the transaction response including a transaction identifier of the transaction added to the blockchain network, and transmitting, by the browser application, a notification message to the digital asset holder, the notification message including the transaction identifier.

According to some aspects, the operations may include one or more of the following features (or any combination thereof). The operations may include transmitting, by the browser application, an asset request to the digital asset holder, receiving, by the browser application, an asset list from the digital asset holder, the asset list identifying a plurality of digital assets stored on the blockchain network, displaying a user interface object that includes the plurality of digital assets, and in response to selection of one of the plurality of digital assets, transmitting a request to the digital asset holder to authenticate the transaction. The operations may include rendering, by the browser application, a user-selectable item to connect to the digital asset holder that manages the private key to access the data on the blockchain network. The operations may include communicating between the browser application and the digital asset holder via a first application programming interface and communicating between the browser application and the blockchain network via a second application programming interface. The operations may include obtaining the first application programming interface and the second application programming interface from a storage device associated with the browser application.

Figure 10A:
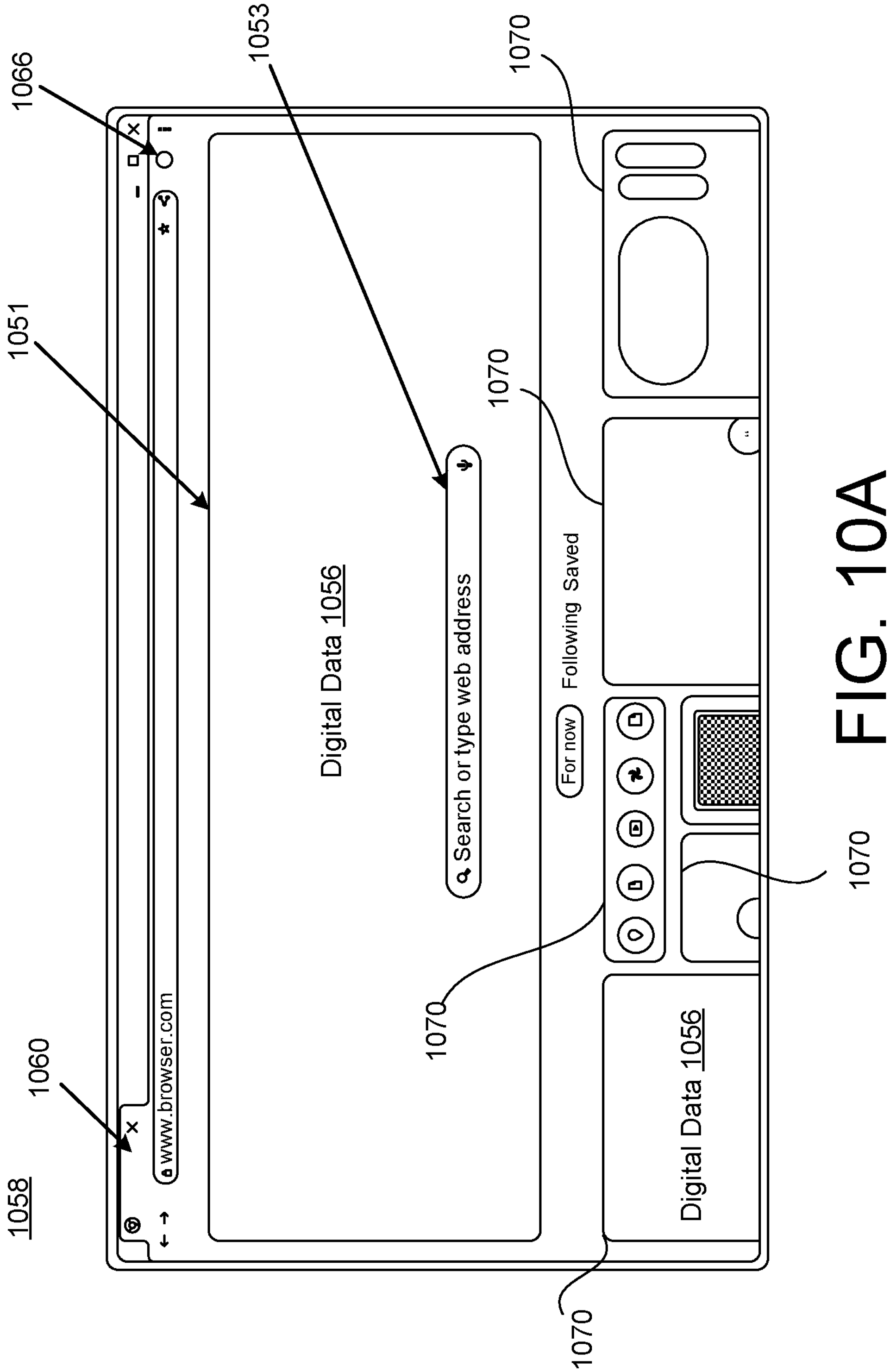
FIG. 10A illustrates a customized user interface of a browser application using digital data of a token stored on a blockchain network according to an aspect.
Figure 10B:
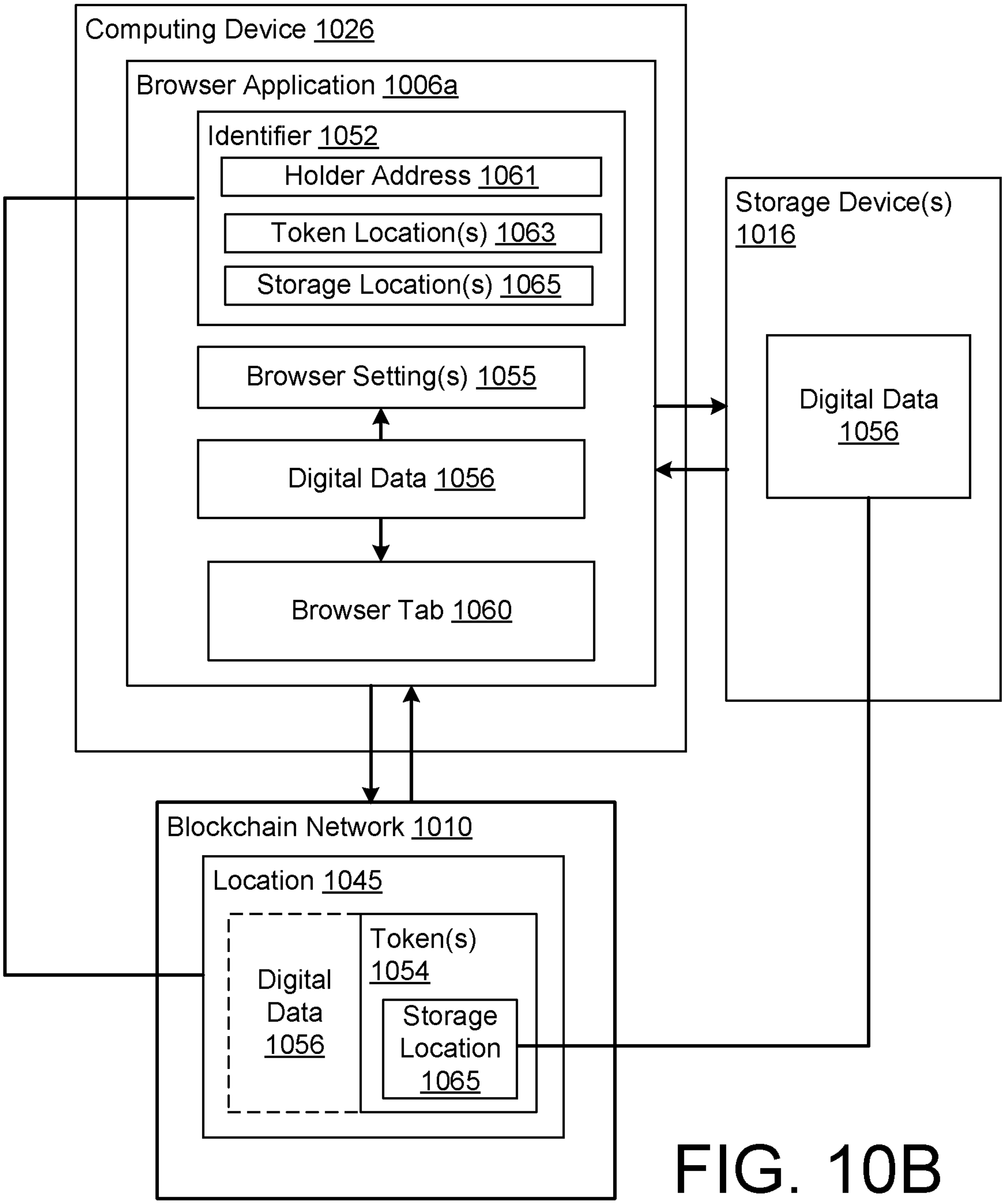
FIG. 10B illustrates a system for customizing a user interface of a browser application using digital data of a token stored on a blockchain network according to an aspect.

FIGS. 10A and 10B illustrate a system 1000 for customizing a user interface 1058 of a browser application 1006*a* using digital data 1056 of a token 1054 stored on a blockchain network 1010 according to an aspect. The system 1000 may be an example of the systems discussed with reference to FIGS. 1 through 9 and may include any of the details discussed herein. In some examples, a user may use the browser application 1006*a* to customize one or more aspects of a browser tab 1060 using the digital data 1056. In some examples, the system 1000 may customize (e.g., change) a browser setting of the browser application 1006*a* based on one or more tokens 1054 stored on a blockchain network 1010 and associated with the user. In some examples, connecting a digital rights holder to the browser application 1006*a* may cause one or more browser settings of the browser application 1006*a* to be adjusted.

A computing device 1026 executes the browser application 1006*a*. The computing device 1026 may be any type of computing device that includes one or more processors (e.g., the processor(s) 228 of FIGS. 2A through 2D), one or more memory devices (e.g., the memory device(s) 230 of FIGS. 2A through 2D), a display (e.g., the display 234 of FIGS. 2A through 2D), and an operating system (e.g., the operating system 232 of FIGS. 2A through 2D) configured to execute (or assist with executing) one or more applications, including the browser application 1006*a*. In some examples, the computing device 1026 is a laptop computer. In some examples, the computing device 1026 is a desktop computer. In some examples, the computing device 1026 is a tablet computer. In some examples, the computing device 1026 is a smartphone. In some examples, the computing device 1026 is a wearable device.

The browser application 1006*a* may be a web browser configured to access information on the Internet. In some examples, the browser application 1006*a* is a separate application from the operating system of the computing device 1026, where the browser application 1006*a* is installable on (and executable by) the operating system. In some examples, the browser application 1006*a* is the device's operating system (or included as part of the device's operating system). The browser application 1006*a* may launch one or more browser tabs in the context of one or more browser windows on a display of the computing device 1026. In some examples, the browser application 1006*a* may launch one or more browser tabs without reference to a browser window.

The token 1054 may include a non-fungible token (NFT). The token 1054 may be a record (e.g., a document with a hash value) that is stored on the blockchain network 1010. In some examples, the token 1054 stored on the blockchain network 1010 includes information about the token 1054. The token may include the file name, caption, the token's current owner, and/or its transaction activity history. In some examples, the token 1054 includes the digital data 1056. In some examples, the token 1054 does not include the digital data 1056. In some examples, the token 1054 includes a storage location 1065 that identifies the location of the digital data 1056. In some examples, the storage location 1065 is a web resource (e.g., a uniform resource locator (URL)) that points to the location of the digital data 1056. In some examples, the storage location 1065 includes a hash value to a file system or another blockchain transaction. The digital data 1056 may represent the underlying image, audio, and/or video data (e.g., JPEG, GIF, MP4 file, etc.) that is uniquely identified by the token 1054. Some categories of tokens 1054 include art, collectibles, utilities for games or applications, and early access for whitelists and drops.

A user may acquire a token 1054 (e.g., from an online marketplace or mint a new token 1054), and "store" the token 1054 in a digital asset holder, e.g., an application (or program) that stores and manages the user's private key to authenticate transactions on the blockchain network 1010. In some examples, a digital asset holder may refer to a crypto-wallet. Examples of a digital asset holder have been described with reference to FIGS. 1 through 9 (e.g., the digital asset holder 102, the digital asset holder 202, the extension 302*a*, the native application 402*b*, the server application 502*c*, etc.), and the digital asset holder may include any of the details discussed with reference to those figures.

Digital data 1056 can be codified (e.g., minted) on the blockchain network 1010, which produces a unique token (e.g., token 1054) that is used to represent ownership of the digital asset. Some categories of tokens 1054 (e.g., NFTs) include art, collectibles, utilities for games or applications, and early access for whitelists and drops. The digital asset holder uses the private key to authenticate a blockchain transaction involving the token 1054 (e.g., transfer, sell, buy a token 1054). In some examples, since the blockchain network 1010 is public, a token 1054 may be accessible using an identifier 1052, such as a token location 1063 (e.g., an NFT identifier) that identifies a location of a particular token 1054 on the blockchain network 1010 and/or a holder address 1061 (e.g., public address, wallet address) of the digital asset holder. In some examples, the identifier 1052 includes the storage location 1065 that points to the location of the digital data 1056 of the token 1054. In some examples, a particular token 1054 (or a plurality of tokens 1054) can be identified by a collection identifier that identifies a collection of tokens 1054 (e.g., by a particular creator or multiple creators).

Referring to FIG. 10A, the digital data 1056 may be displayed as a background image of the browser tab 1060 of the browser application 1006*a*. For example, a user may adjust a browser setting 1055 to change one or more display aspects of the browser application 1006*a* and/or the browser tab 1060. In some examples, the browser setting 1055 may enable the user to select a particular token 1054, one or more tokens 1054 associated with the user's digital asset holder, one or more tokens 1054 associated with a certain collection, such that the digital data 1056 of a token 1054 is displayed as the background image of the browser tab 1060.

The browser tab 1060 may render a new tab page in response to a user opening a new browser tab. The user opening a new browser tab can be interpreted by the browser application 1006*a* as a request to render the browser tab. The new tab page may be customized with the digital data 1056 of one or more tokens 1054 stored on the blockchain network 1010. For example, the digital data 1056 of a token 1054 may be displayed as the background image of the new tab page. In some examples, a portion of a user interface 1058 of the browser tab 1060 may have the digital data 1056 as the background image. In some examples, the browser tab 1060 includes a portion 1051 having a search entry field 1053 to search for web content on the Internet. In some examples, the portion 1051 includes the digital data 1056 of the token 1054 in which the search entry field 1053 is in the foreground and the digital data 1056 is in the background. In some examples, every time the user launches a new browser tab 1060, the browser tab 1060 displays digital data 1056 of a different token 1054.

The browser application 1006*a* may include or may be connected to a user's digital asset holder, where the user's digital asset holder identifies one or more tokens 1054. The browser tab 1060 may display, as the background image, the digital data 1056 of a token 1054 identified by the user's digital asset holder. In some examples, every time the user launches a new browser tab 1060, a different token 1054 is selected for use as the background image (e.g., shuffle through the user's NFTs "stored" in the user's digital asset holder).

In some examples, the digital data 1056 of a token 1054 is displayed as a profile image 1066 in the browser tab 1060. A user may have an account associated with the browser application 1006*a*, and the user may select a particular image to be used as the profile image 1066. The profile image 1066 is displayed in an area of the browser tab 1060. A user may adjust a browser setting 1055 to identify a particular token 1054 to be used as the profile image 1066. The account associated with the browser application 1006*a* may be associated with other services such as an email application, video conferencing application, storage application. The profile image 1066 having the digital data 1056 of a token 1054 may also be displayed when identifying the account on those other services.

In some examples, the new tab page, rendered by the browser tab 1060 includes one or more UI modules 1070. The UI modules 1070 may be a variety of UI objects displayed on the new tab page, which can include controls or links to application, web content, or application content from a particular application. In some examples, a UI module 1070 may provide content from an underlying web application. For example, a weather module may provide information about the weather, a video sharing module may provide selection of videos, a social media module may provide information from the user's timeline, etc. In some examples, at least one of UI modules 1070 is configured to display digital data 1056 of one or more tokens 1054. In some examples, the UI module 1070 is configured to shuffle through (e.g., sequentially, or randomly display) the user's NFTs (e.g., the NFTs identified in the user's digital asset holder, associated with a particular digital asset holder, or part of a collection of NFTs, etc.). For example, if a user's digital asset holder identifies a first token and a second token, the UI module 1070 may display digital data 1056 of the first token for a first predetermined period of time and display digital data 1056 of the second token for a second predetermined period of time. In some examples, the UI module 1070 may display the digital data 1056 for multiple tokens 1054 at the same time.

In some examples, the browser application 1006*a* can customize a color scheme of a user interface 1058 of the browser application 1006*a* based on a color scheme associated with the digital data 1056 of a token 1054. For example, a user may be able to select a particular token 1054 from a list of tokens 1054, e.g., associated with the identifier 1052 (like the user's digital asset holder). The browser application 1006*a* may change a color scheme (or tint) of one or more portions of a browser tab 1060 to correspond to a color scheme of the selected token 1054. The portion(s) of the browser tab 1060 may include a navigation panel (e.g., having browser navigation controls such as forward or back), a toolbar having controls for actions of the browser application 1106*a* (or controls of a native application), a menu, menu items, and/or an address bar that identifies a URL of a website. In some examples, the browser application 1006*a* may customize a theme (e.g., border and/or background) of the user interface 1058 to correspond to a theme (e.g., color scheme) associated with the digital data 1056 of a token 1054.

The browser application 1006*a* may obtain an identifier 1052 that is associated with a token 1054 stored on the blockchain network 1010. In some examples, the identifier 1052 identifies a location of one or more tokens 1054 and/or digital data 1056 of one or more tokens 1054 on the blockchain network 1010 and/or storage device(s) 1016. In some examples, the identifier 1052 includes one or more addresses on the blockchain network 1010. In some examples, the identifier 1052 includes one or more web resources (e.g., URLs). In some examples, the identifier 1052 includes a hash value. In some examples, the browser application 1006*a* stores the identifier 1052 and the browser application 1006*a* retrieves the identifier 1052 from a memory device. In some examples, the browser application 1006*a* may obtain the identifier 1052 in response to the browser application 1006*a* connecting to a digital asset holder. In some examples, the digital asset holder is a third-party digital asset holder, and the browser application 1006*a* can connect to the third-party digital asset holder using any of the techniques described in FIGS. 1 through 9. In some examples, the browser application 1006*a* includes a digital asset holder (e.g., a native or built-in digital asset holder) and the browser application 1006*a* may obtain the identifier 1052 from the digital asset holder. In some examples, the browser tab 1060 may render a UI object that enables the user to enter an identifier 1052. In some examples, the browser application 1006*a* may obtain the identifier 1052 from web content and/or application content displayed on the computing device 1026. In some examples, the browser application 1006*a* may obtain the identifier 1052 in response to a user selection.

In some examples, the identifier 1052 includes a holder address 1061. The holder address 1061 may be the shared (or public) address associated with the digital asset holder. In some examples, the holder address 1061 may be referred to as a wallet address. In some examples, the public address identifies a location 1045 on the blockchain network 1010 that stores tokens 1054 associated with the digital asset holder. In some examples, the identifier 1052 includes a token location 1063 that identifies a location of a particular token 1054 on the blockchain network 1010. In some examples, the identifier 1052 includes a storage location 1065 that identifies a location of the digital data 1056 of the token 1054. In some examples, the storage location 1065 includes a resource locator. In some examples, the storage location 1065 includes a uniform resource locator (URL). In some examples, the storage location 1065 is a hash value.

The digital data 1056 of the token 1054 may be stored in a location that is separate from the token 1054 on the blockchain network 1010. In some examples, the digital data 1056 is stored on one or more storage device(s) 1016. The token 1054 on the blockchain network 1010 may store the storage location 1065 that points to the location of the digital data 1056 on the storage device(s) 1016. In some examples, the storage device(s) 1016 include server computer(s). In some examples, the storage device(s) 1016 includes a file system. In some examples, the storage device(s) 1016 include another blockchain network. In some examples, the token 1054 stores the digital data 1056.

The browser application 1006*a* may use the holder address 1061, the token location 1063, and/or the storage location 1065 to obtain the digital data 1056. In some examples, the browser application 1006*a* can use the holder address 1061 to query the blockchain network 1010 to identify whether the digital asset holder is associated with any tokens 1054. The holder address 1061 may be the address of the user's digital asset holder. In some examples, the holder address 1061 may be an address of a digital asset holder for an entity other than the user. The holder address 1061 may point to a location 1045 that stores the tokens 1054 of the digital asset holder. If the digital data 1056 is stored in a token 1054, the browser application 1006*a* may retrieve the digital data 1056 from blockchain network 1010. If the digital data 1056 is stored in the storage device(s) 1016, the browser application 1006*a* may retrieve the storage location 1065 from any tokens 1054 associated with the digital asset holder. The browser application 1006*a* may use the storage location 1065 (e.g., URL, hash value) to retrieve the digital data 1056 from the storage device(s) 1016.

In some examples, the browser application 1006*a* can use the token location 1063 to query the blockchain network 1010 to obtain the digital data 1056. The token location 1063 may represent an address of a particular token 1054 stored on the blockchain network 1010. If the digital data 1056 is stored in the token 1054, the browser application 1006*a* can retrieve the digital data 1056 from the blockchain network 1010. If the digital data 1056 is stored on the storage device(s) 1016, the browser application 1006*a* can query the blockchain network 1010 to retrieve the storage location 1065 and use the storage location 1065 to retrieve the digital data 1056.

In some examples, the browser application 1006*a* can use the storage location 1065 to retrieve the digital data 1056. For example, the storage location 1065 may be an address or locator that points to the location of the digital data 1056 on the storage device(s) 1016, and the browser application 1006*a* can use the storage location 1065 to retrieve the digital data 1056.

Figure 11:
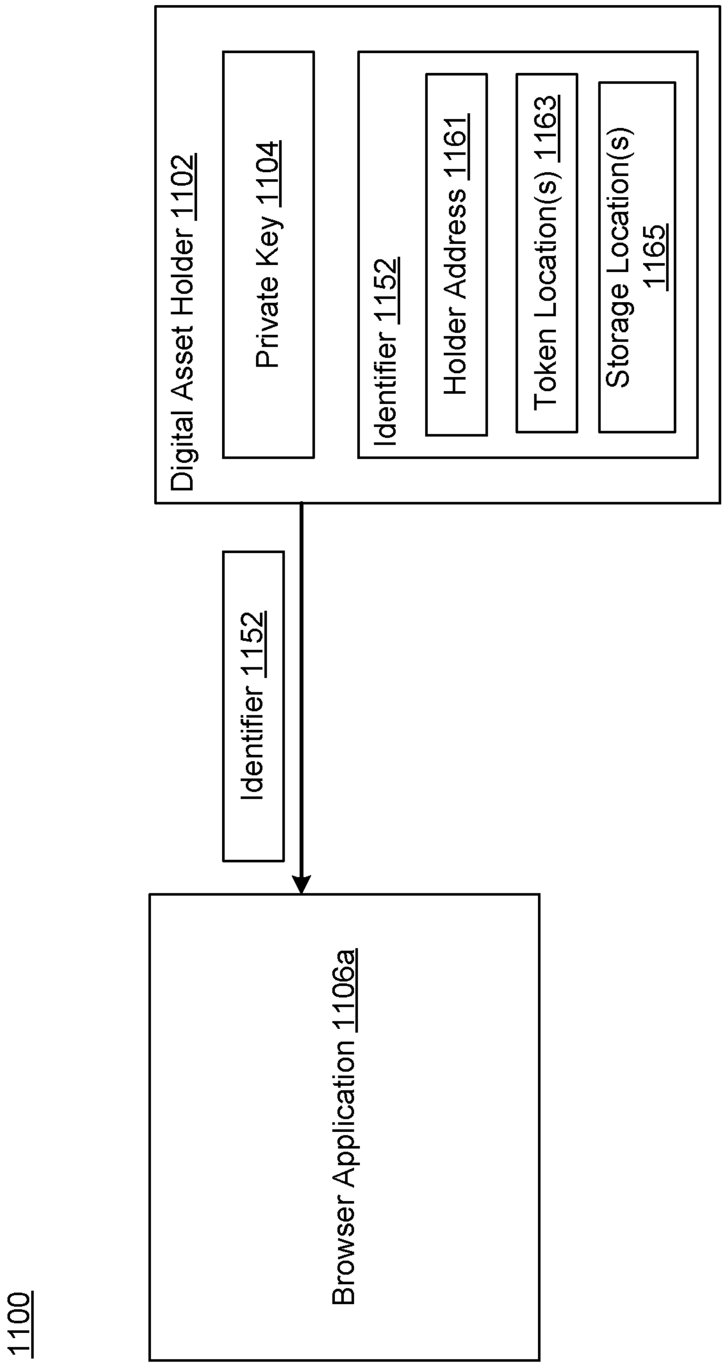
FIG. 11 illustrates an example of a system having a browser application connected to a digital asset holder according to an aspect.

FIG. 11 illustrates an example of a system 1100 having a browser application 1106*a* connected to a digital asset holder 1102 according to an aspect. The system 1100 may be an example of the system 1000 of FIGS. 10A and 10B and/or any of the systems discussed with reference to FIGS. 1 through 9 and may include any of the details discussed with reference to those figures. In some examples, the browser application 1106*a* can connect to a digital asset holder 1102, where one or more aspects of a browser tab (e.g., the browser tab 1060 of FIGS. 10A and 10B) of the browser application 1106*a* are customized from the tokens (e.g., the tokens 1054 of FIGS. 10A and 10B) associated with the digital asset holder 1102. In some examples, the digital asset holder 1102 is a third-party digital asset holder, and the browser application 1106*a* can connect to the digital asset holder 1102 according to any of the techniques described with reference to FIGS. 1 through 9.

The digital asset holder 1102 includes a private key 1104 that is used by the digital asset holder 1102 to authenticate transactions on the blockchain network. Examples of a digital asset holder 1102 have been described with reference to FIGS. 1 through 9 (e.g., the digital asset holder 102, the digital asset holder 202, the extension 302*a*, the native application 402*b*, the server application 502*c*, etc.), and the digital asset holder 1102 may include any of the details discussed with reference to those figures.

In some examples, in response to the browser application 1106*a* connecting to the digital asset holder 1102, the browser application 1106*a* may obtain an identifier 1152 from the digital asset holder 1102. In some examples, the browser application 1106*a* may receive the identifier 1152 via one or more application programming interfaces (e.g., APIs 238 of FIGS. 2A through 2D) that enable the browser application 1106*a* and the digital asset holder 1102 to communicate. In some examples, the identifier 1152 may include a holder address 1161 (e.g., the shared/public address of the digital asset holder 1102). In some examples, the identifier 1152 may include one or more token locations 1163 for tokens associated with the digital asset holder 1102. In some examples, the identifier 1152 may include one or more storage locations 1165 that specify a location of digital data of a respective token. In some examples, the digital asset holder 1102 stores the holder address 1161, any token locations 1163 for tokens associated with the digital asset holder 1102, and/or the storage locations 1165 for any tokens associated with the digital asset holder 1102. In some examples, the digital asset holder 1102 does not store the storage locations 1165.

In some examples, the browser application 1106*a* may receive the identifier 1152 from the digital asset holder 1102 and use the identifier 1152 to retrieve digital data of a respective token identified by the digital asset holder 1102. In some examples, the digital data is displayed in a browser tab as a background image in response to a new browser tab being opened. The user opening a new browser tab can be interpreted by the browser application 1106*a* as a request to render the browser tab. In some examples, the digital data is displayed in a browser tab as a profile image. In some examples, the browser application 1106*a* may switch to a different token (when another browser tab is opened) if the digital asset holder 1102 is associated with multiple tokens. In some examples, the user can set a browser setting (e.g., the browser setting 1055 of FIGS. 10A and 10B) to select a particular token from the digital asset holder 1102. In some examples, the browser application can render a UI object on the device's display that displays the digital data for each token associated with the digital asset holder 1102 and permits the user to select one of the tokens to use as the background image and/or the profile image.

In some examples, the user can set a browser setting to shuffle through the tokens to use as the background image (and/or the picture image). For example, the digital asset holder 1102 may identify a first token, a second token, and a third token. In some examples, when a first browser tab is launched, the first browser tab may display digital data of the first token as the background image. When a second browser tab is launched, the second browser tab may display digital data of the second token as the background image. When a third browser tab is launched, the third browser tab may display digital data of the third token as the background image.

In some examples, when a fourth browser tab is launched, the fourth browser tab may display the digital data of the first token as the background image, and the shuffling continues. In some examples, the browser application 1106*a* may randomly select one of the tokens to use as the background image. In some examples, if the user acquires new tokens in the digital asset holder 1102 (e.g., creates or purchases new ones), the browser application 1106*a* can automatically add the digital data of the new tokens within the sequence of tokens that are displayed as the background image of the browser tab. With respect to the profile image, in some examples, the browser application 1106*a* may automatically switch to a different token after a predetermined period of time (e.g., automatically switches a profile image after 10 days, 20 days, etc.).

Figure 12:
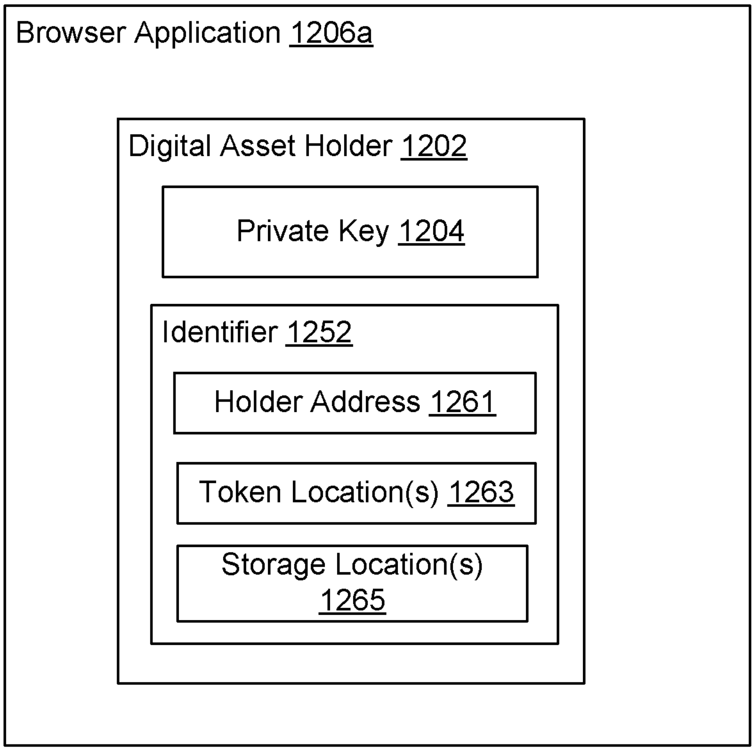
FIG. 12 illustrates an example of a browser application having a digital asset holder.

FIG. 12 illustrates an example of a browser application 1206*a* having a digital asset holder 1202. In some examples, the digital asset holder 1202 is a program that is managed or developed by the entity that developed the browser application 1206*a*. Examples of a digital asset holder 1202 have been described with reference to FIGS. 1 through 9 (e.g., the digital asset holder 102, the digital asset holder 202, the extension 302*a*, the native application 402*b*, the server application 502*c*, etc.), and the digital asset holder 1202 may include any of the details discussed with reference to those figures. In some examples, the digital asset holder 1202 is a native or built-in digital asset holder 1202. The digital asset holder 1202 includes a private key 1204 that is used to authenticate transactions on the blockchain network. The browser application 1206*a* may operate in any of the systems discussed with reference to FIGS. 1 through 11 and may include any of the details discussed with reference to those figures.

The browser application 1206*a* can access the digital asset holder 1202, where one or more aspects of a browser tab (e.g., the browser tab 1060 of FIGS. 10A and 10B) of the browser application 1206*a* are customized from the tokens (e.g., the tokens 1054 of FIGS. 10A and 10B) associated with the digital asset holder 1202. In some examples, the browser application 1206*a* may not have to establish a connection (e.g., API connection) to the digital asset holder 1202 because the digital asset holder 1202 is included as part of the browser application 1206*a*. In some examples, the browser application 1206*a* may retrieve a portion of all of the information from the digital asset holder 1202. In some examples, the browser application 1206*a* may obtain the identifier 1252 from the digital asset holder 1202. In some examples, the identifier 1252 is stored in a memory device associated with the browser application 1206*a*. In some examples, the identifier 1252 may include a holder address 1261 (e.g., the shared/public address of the digital asset holder 1202). In some examples, the identifier 1252 may include one or more token locations 1263 for tokens associated with the digital asset holder 1202. In some examples, the identifier 1252 may include one or more storage locations 1265 that specify a location of digital data of a respective token.

In some examples, the browser application 1206*a* may obtain the identifier 1252 from the digital asset holder 1202 and use the identifier 1252 to retrieve digital data of a respective token identified by the digital asset holder 1202. In some examples, the digital data is displayed in a browser tab as a background image in response to a new browser tab being opened. The user opening a new browser tab can be interpreted by the browser application 1206*a* as a request to render the browser tab. In some examples, the digital data is displayed in a browser tab as a profile image. In some examples, the browser application 1206*a* may switch to a different token (when another browser tab is opened) if the digital asset holder 1202 is associated with multiple tokens. In some examples, the user can set a browser setting (e.g., the browser setting 1055 of FIGS. 10A and 10B) to select a particular token from the digital asset holder 1202. In some examples, the browser application can render a UI object that displays the digital data for each token associated with the digital asset holder 1202 and permits the user to select one of the tokens to use as the background image and/or the profile image.

In some examples, the user can set a browser setting to shuffle through the tokens to use as the background image (and/or the picture image). For example, the digital asset holder 1202 may identify a first token, a second token, and a third token. In some examples, when a first browser tab is launched, the first browser tab may display digital data of the first token as the background image. When a second browser tab is launched, the second browser tab may display digital data of the second token as the background image. When a third browser tab is launched, the third browser tab may display digital data of the third token as the background image. In some examples, when a fourth browser tab is launched, the fourth browser tab may display the digital data of the first token as the background image. In some examples, the browser application 1206*a* may randomly select one of the tokens to use as the background image. With respect to the profile image, in some examples, the browser application 1206*a* may automatically switch to a different token after a predetermined period of time (e.g., automatically switches a profile image after 10 days, 20 days, etc.).

Figure 13:
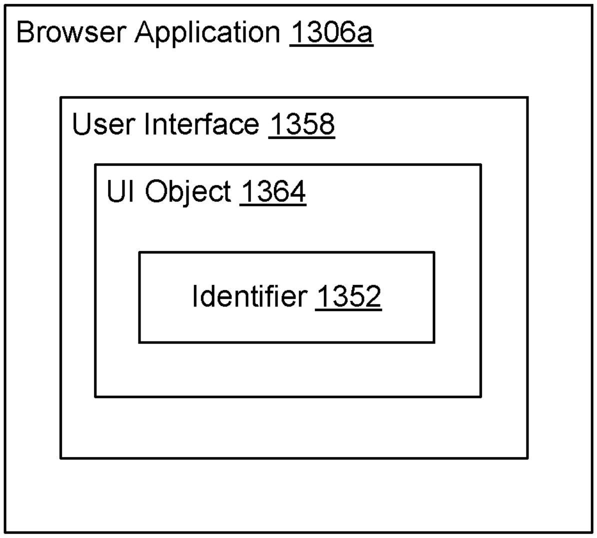
FIG. 13 illustrates an example of browser application according to another aspect.

FIG. 13 illustrates an example of browser application 1306*a* according to another aspect. The browser application 1306*a* may render a UI object 1364 in a user interface 1358 of the browser application 1306*a*, where the UI object 1364 enables the user to enter an identifier 1352. In some examples, the identifier 1352 includes a holder address (e.g., the public address of the digital asset holder). For example, a user may enter a shared (e.g., publicly available) address of a digital asset holder. In some examples, the digital asset holder is owned by the user of the browser application 1306*a*. In some examples, the shared address relates to a digital asset holder for a non-user (e.g., a shared address for someone else). In some examples, the identifier 1352 may include a token location for a token stored on the blockchain network. In some examples, the user may enter token locations for tokens owned by the user. In some examples, the user may enter any token location (e.g., for tokens not owned by the user). In some examples, the identifier 1352 includes a storage location that specifies a location of digital data of a respective token. In some examples, the user may enter storage locations for tokens owned by the user. In some examples, the user may enter any storage locations (e.g., for tokens not owned by the user). In some examples, the identifier 1352 includes a collection identifier that identifies the location of tokens and/or digital data of tokens associated with a particular collection of a creator, multiple creators, and/or part of an NFT project.

Figure 14:
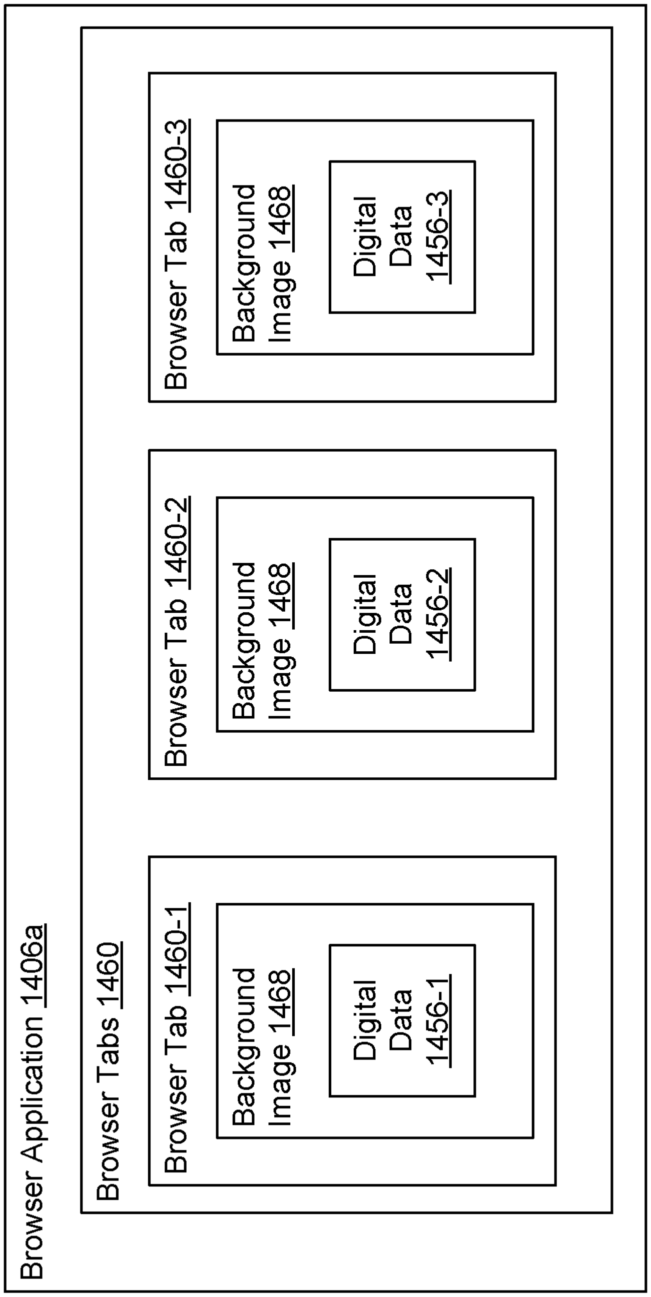
FIG. 14 illustrates an example of a browser application configured to customize browser tabs using tokens from a blockchain network according to an aspect.

FIG. 14 illustrates an example of a browser application 1406*a* configured to customize browser tabs 1460 using tokens from a blockchain network according to an aspect. For example, the browser application 1406*a* may select a different token for use as a background image 1468 when a new browser tab 1460 is opened. The user opening a new browser tab can be interpreted by the browser application 1406*a* as a request to render the browser tab 1460. For example, at a first time, the browser application 1406*a* may render a browser tab 1460-1, where digital data 1456-1 of a first token is displayed as a background image 1468 of the browser tab 1460-1. At a second time, the browser application 1406*a* may render a browser tab 1460-2, where digital data 1456-2 of a second token is displayed as a background image 1468 of the browser tab 1460-2. At a third time, the browser application 1406*a* may render a browser tab 1460-3, where digital data 1456-3 of a third token is displayed as a background image 1468 of the browser tab 1460-3.

Figure 15:
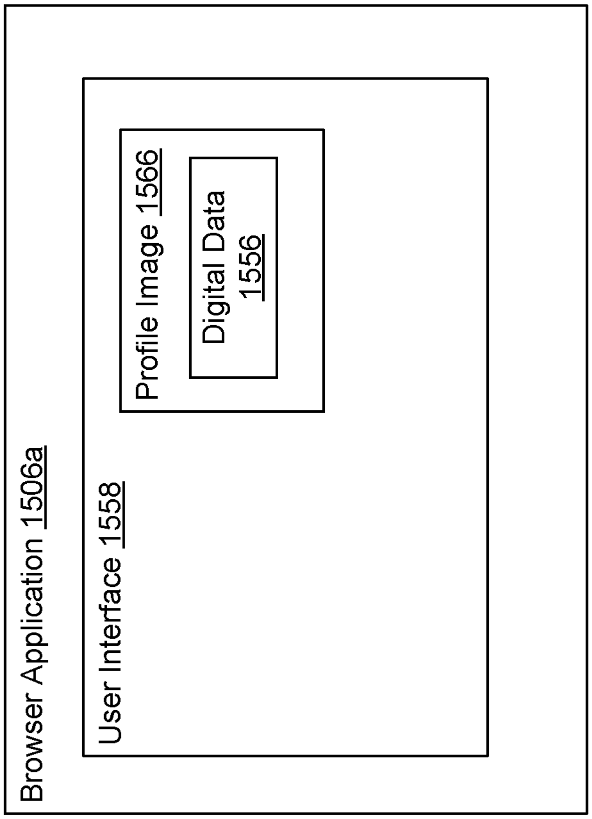
FIG. 15 illustrates an example of a browser application configured to customize a user interface using tokens from a blockchain network according to an aspect.

FIG. 15 illustrates an example of a browser application 1506*a* configured to customize a user interface 1558 (e.g., a browser tab) using tokens from a blockchain network according to an aspect. The browser application 1506*a* may render digital data 1556 of a token as a profile image 1566 that is displayed on the user interface 1558 of the browser application 1506*a*. A user may adjust a browser setting (e.g., the browser setting 1055 of FIGS. 10A and 10B) to identify a particular token to be used as the profile image 1066. The account associated with the browser application 1506*a* may be associated with other services such as an email application, video conferencing application, storage application. The profile image 1566 having the digital data 1556 of a token may also be displayed when identifying the account on those other services.

Figure 16:
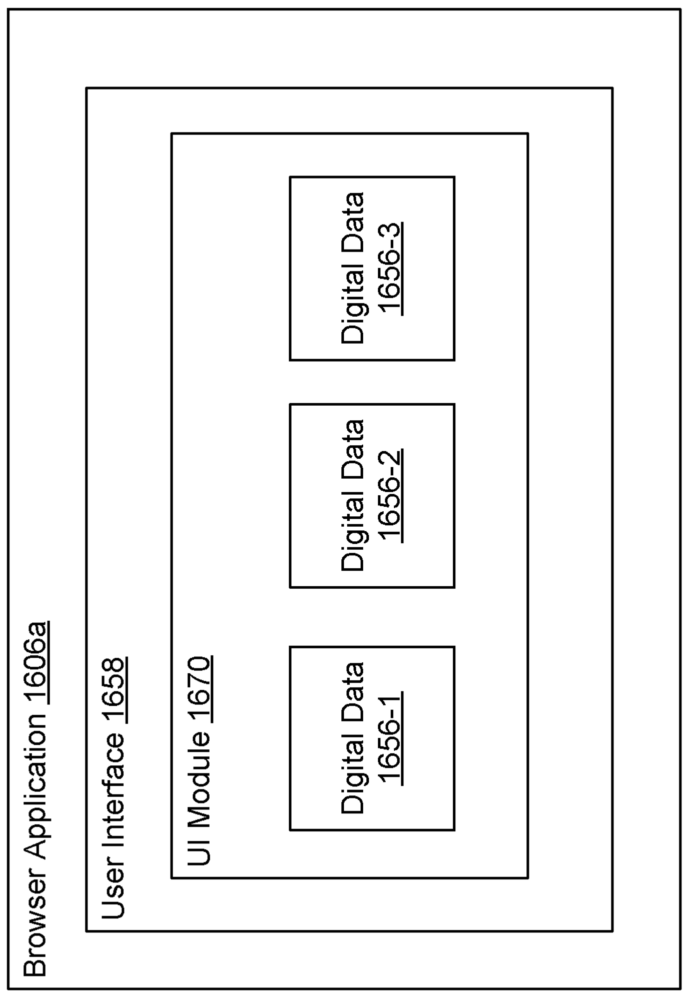
FIG. 16 illustrates an example of a browser application configured to customize a user interface using tokens from a blockchain network according to an aspect.

FIG. 16 illustrates an example of a browser application 1606*a* configured to customize a user interface 1658 using tokens from a blockchain network according to an aspect. In some examples, the user interface 1658 displays a UI module 1670. In some examples, a browser tab displays the UI module 1670. In some examples, the browser tab renders a new browser page, and the new browser page includes the UI module 1670. In some examples, the new browser page also includes an entry field for entering terms to search on the Internet. In some examples, the UI module 1670 is a computer object that is rendered on the user interface 1658, where the computer object may include input control(s), information container(s), an/or container(s). The UI module 1670 may display digital data of one or more tokens. The parameters on how and/or when the tokens are displayed may be customizable by the user via one or more browser settings.

In some examples, the UI module 1670 is configured to shuffle through (e.g., sequentially display) the user's tokens, e.g., from any digital asset holders connected to (or part of) of the browser applications 1606*a*. In some examples, the browser application 1606*a* can receive an identifier (e.g., a holder address, token locations, storage locations, collector identifiers) and then display the digital data from those tokens associated with that identifier in the UI module 1670. In some examples, a user may adjust a browser setting (e.g., the browser setting 1055 of FIGS. 10A and 10B) to add a first UI module that relates to the tokens associated with a first digital asset holder or a first collection identifier, and the first UI module may display the digital data of each token (e.g., sequentially or at the same time). In some examples, a user may adjust a browser setting (e.g., the browser setting 1055 of FIGS. 10A and 10B) to add a second UI module that relates to the tokens associated with a second digital asset holder or a second collection identifier, and the second UI module may display the digital data of each token (e.g., sequentially or at the same time).

In some examples, if a user's digital asset holder identifies a first token, a second token, and a third token, the UI module 1670 may display digital data 1656-1 of the first token for a first predetermined period of time (e.g., five seconds, 30 seconds, one minute, etc.), display digital data 1656-2 of the second token for a second predetermined period of time, and display digital data 1656-3 of the third token for a third predetermined period of time. In some examples, the duration of display of a particular token can be adjustable by the user via a browser setting. In some examples, the UI module 1070 may display the digital data 1656-1, the digital data 1656-2, and the digital data 1656-3 at the same time in the UI module 1670.

Figure 17:
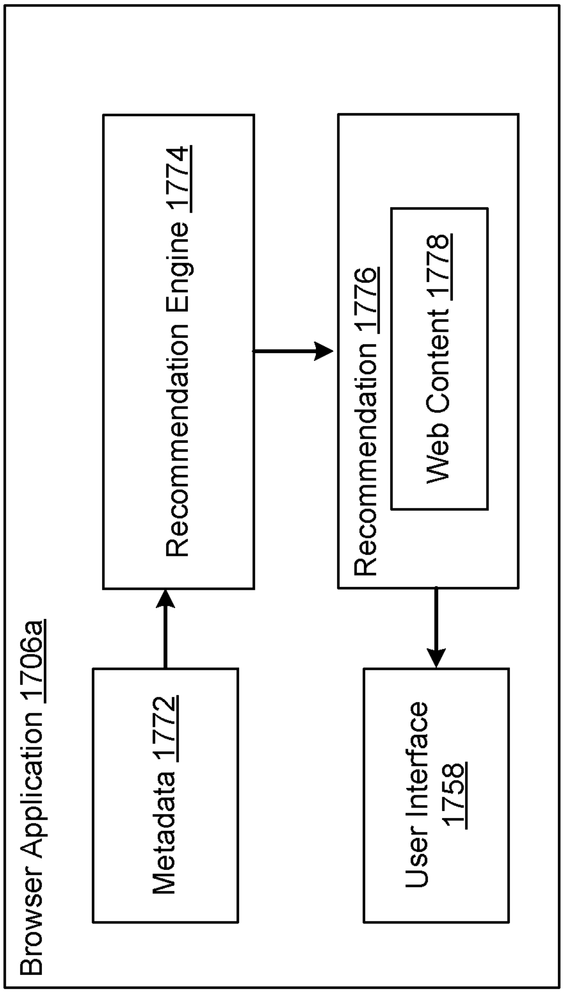
FIG. 17 illustrates a browser application configured to customize a user interface using tokens from a blockchain network according to an aspect.

FIG. 17 illustrates a browser application 1706*a* configured to customize a user interface 1758 using tokens from a blockchain network according to an aspect. In some examples, the browser application 1706*a* includes (or communicates with) a recommendation engine 1774. The recommendation engine 1774 is configured to use metadata 1772 associated with one or more tokens to generate a recommendation 1776 for the user. In some examples, the recommendation engine 1774 executes on one or more server computers and the browser application 1706*a* communicates with the recommendation engine 1774 over a network to receive the recommendation 1776. In some examples, the recommendation engine 1774 is part of the browser application 1706*a* that executes on the user's device (e.g., computing device 1026 of FIGS. 10A and 10B).

The recommendation engine 1774 may obtain metadata 1772 about one or more tokens stored on a blockchain network. In some examples, the user is provided with one or more controls to enable (or disable) the recommendation engine 1774 to obtain metadata 1772 about tokens stored on the blockchain network. In some examples, the recommendation engine 1774 obtains metadata 1772 about the tokens that are identified by digital asset holder(s) connected to (or part of) of the browser application 1706*a*.

The metadata 1772 may include information about the token(s). In some examples, the metadata 1772 includes information about the creator, the item name, description, property levels, statistics, when and/or where the token was created, and/or an NFT project related to the token, etc. In some examples, the metadata 1772 is stored on the blockchain network (e.g., blockchain network 1010 of FIGS. 10A and 10B). The recommendation engine 1774 may query the blockchain network to obtain the metadata 1772. In some examples, the metadata 1772 is stored on storage device(s)

(e.g., server, file system, another blockchain network) (e.g., storage device(s) 1016). The recommendation engine 1774 may query the storage device(s) to obtain the metadata 1772. In some examples, the metadata 1772 is included as part of the digital data (e.g., the digital data 1056 of FIGS. 10A and 10B). In some examples, the metadata 1772 is not included as part of the digital data. In some examples, the metadata 1772 is stored in two or more locations or systems having different communication protocols (e.g., a blockchain network, a server, a file system, and/or another blockchain network), and the recommendation engine 1774 may obtain a portion of the metadata 1772 from one location and a portion of the metadata 1772 from another location.

The recommendation engine 1774 generates a recommendation 1776 based on the metadata 1772, and renders, in the user interface 1758 of the browser application 1706*a*, information that identifies the recommendation 1776. In some examples, the recommendation 1776 includes web content or a link to web content about the recommendation 1776. In some examples, the recommendation 1776 includes content that is identified as similar (or topically related) to the metadata 1772. In some examples, the recommendation 1776 may identify one or more tokens (e.g., NFTs) and/or NFT projects from the same creators and/or recommend NFTs and/or NFT projects of similar size, price, etc.

In some examples, the recommendation engine 1774 includes one or more predictive models that can predict a similarity value between one or more tokens whose digital data is rendered by the browser application 1706*a* and web content that is indexed and searchable by a search engine of the browser application 1706*a*. In some examples, the predictive model(s) include neural network(s). If the similarity value is equal to or greater than a threshold value, the recommendation engine 1774 may identify that web content 1778 as a recommendation 1776. In some examples, the recommendation 1776 may be displayed in a browser tab of the browser application 1706*a*. In some examples, the recommendation 1776 may be displayed in a UI module (e.g., the UI module 1070 of FIGS. 10A and 10B) on a new tab page rendered by the browser tab.

Figure 18:
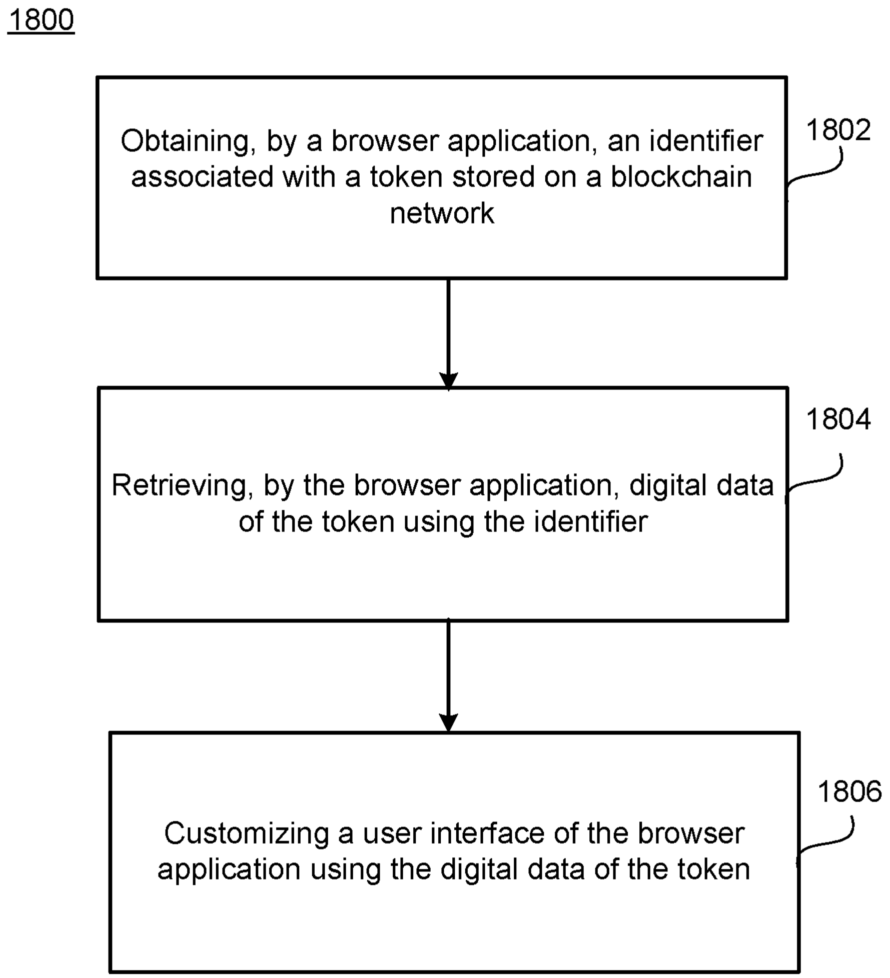
FIG. 18 is a flowchart depicting example operations of customizing a browser tab using blockchain data according to an aspect.

FIG. 18 is a flowchart 1800 depicting example operations of customizing a browser tab using blockchain data according to an aspect. Although the flowchart 1800 is explained with respect to the system 1000 of FIGS. 10A and 10B, the flowchart 1800 may be applicable to any of the embodiments discussed herein. Although the flowchart 1800 of FIG. 18 illustrates the operations in sequential order, it will be appreciated that this is merely an example, and that additional or alternative operations may be included. Further, operations of FIG. 18 and related operations may be executed in a different order than that shown, or in a parallel or overlapping fashion.

Operation 1802 includes obtaining, by a browser application 1006*a*, an identifier 1052 associated with a token 1054 stored on a blockchain network 1010. In some examples, the browser application 1006*a* obtains the identifier 1052 from a digital asset holder (e.g., the digital asset holder 1102 of FIG. 11, the digital asset holder 1202 of FIG. 12). In some examples, the browser application 1006*a* is configured to connect to the digital asset holder using the techniques described in FIGS. 1 through 9. In some examples, the browser application 1006*a* obtains the identifier 1052 when the browser application 1006*a* is connected to the digital asset holder. In some examples, the browser application 1006*a* obtains the identifier 1052 from the user via a UI object rendered by the browser application 1006*a*. In some examples, the browser application 1006*a* obtains the identifier 1052 from web content rendered by the browser application 1006*a* (or selected from the web content rendered by the browser application 1006*a*). In some examples, the identifier 1052 includes a holder address 1061, token location(s) 1063, storage location(s) 1065, and/or a collection identifier that identifies a collection of tokens stored on the blockchain network 1010.

Operation 1804 includes retrieving, by the browser application 1006*a*, digital data 1056 of the token 1054 using the identifier 1052. The browser application 1006*a* may use the holder address 1061, the token location 1063, and/or the storage location 1065 to obtain the digital data 1056. In some examples, the browser application 1006*a* can use the holder address 1061 to query the blockchain network 1010 to identify whether the digital asset holder is associated with any tokens 1054. The holder address 1061 may be the address of the user's digital asset holder. In some examples, the holder address 1061 may be an address of a digital asset holder for an entity other than the user. The holder address 1061 may point to a location 1045 that stores the tokens 1054 of the digital asset holder. If the digital data 1056 is stored in a token 1054, the browser application 1006*a* may retrieve the digital data 1056 from blockchain network 1010. If the digital data 1056 is stored in the storage device(s) 1016, the browser application 1006*a* may retrieve the storage location 1065 from any tokens 1054 associated with the digital asset holder. The browser application 1006*a* may use the storage location 1065 (e.g., URL, hash value) to retrieve the digital data 1056 from the storage device(s) 1016.

In some examples, the browser application 1006*a* can use the token location 1063 to query the blockchain network 1010 to obtain the digital data 1056. The token location 1063 may represent an address of a particular token 1054 stored on the blockchain network 1010. If the digital data 1056 is stored in the token 1054, the browser application 1006*a* can retrieve the digital data 1056 from the blockchain network 1010. If the digital data 1056 is stored on the storage device(s) 1016, the browser application 1006*a* can query the blockchain network 1010 to retrieve the storage location 1065 and use the storage location 1065 to retrieve the digital data 1056.

In some examples, the browser application 1006*a* can use the storage location 1065 to retrieve the digital data 1056. For example, the storage location 1065 may be an address or locator that points to the location of the digital data 1056 on the storage device(s) 1016, and the browser application 1006*a* can use the storage location 1065 to retrieve the digital data 1056.

Operation 1806 includes customizing a user interface 1058 of the browser application 1006*a* using the digital data 1056 of the token 1054. In some examples, operation 1806 includes updating a browser setting 1055 of the browser application 1006*a* such that a display aspect of the user interface 1058 of the browser application 1006*a* is changed. In some examples, operation 1806 includes rendering the digital data 1056 of the token 1054 as a background image in the user interface 1058 of the browser application 1006*a*. In some examples, operation 1806 includes rendering the digital data 1056 as a profile image 1066 of a user in the user interface 1058 of the browser application 1006*a*. In some examples, referring to FIG. 17, the operations include obtaining metadata 1772 about the token, generating a recommendation 1776 based on the metadata 1772, and rendering, in the user interface of the browser application 1706*a*, information that identifies the recommendation 1776. In some examples, referring to FIGS. 10A and 10B, the operations include identifying a plurality of tokens 1054 stored on the blockchain network 1010 based on the identifier 1052, and rendering, in the user interface 1058 of the browser application 1006*a*, a UI module 1070 that displays digital data 1056 associated with each of the plurality of tokens 1054 for a predetermined period of time.

According to some aspects, the method (e.g., the operations) may include one or more of the following features (or any combination thereof). Customizing the user interface of the browser application includes updating a browser setting of the browser application such that a display aspect of the user interface of the browser application is changed. Customizing the user interface of the browser application includes rendering the digital data of the token as a background image in the user interface of the browser application. Customizing the user interface of the browser application includes rendering the digital data as a profile image of a user in the user interface of the browser application. The token is a first token and the digital data is first digital data, the method includes receiving a request to render a first browser tab of the browser application, rendering the first browser tab with a background image that includes the first digital data associated with the first token, receiving a request to render a second browser tab of the browser application, and rendering the second browser tab with a background image that includes second digital data associated with a second token. The method may include obtaining metadata about the token, generating a recommendation based on the metadata, and rendering, in the user interface of the browser application, information that identifies the recommendation. The method may include identifying a plurality of tokens stored on the blockchain network based on the identifier, and rendering, in the user interface of the browser application, a user interface module that displays digital data associated with a token of the plurality of tokens for a predetermined period of time. The identifier includes a shared address of a digital asset holder. The method may include receiving the identifier from a digital asset holder that stores a private key for authenticating a transaction on the blockchain network. The identifier is received via an application programming interface of the browser application. The method may include rendering a user interface object for receiving the identifier.

According to an aspect, an apparatus includes at least one processor, and a non-transitory computer-readable medium storing executable instructions that when executed by the at least one processor cause the at least one processor to connect a browser application to a digital asset holder storing a private key for enabling a transaction on a blockchain network, the digital asset holder identifying a token stored on the blockchain network, retrieve, by the browser application, digital data of the token, and customize a user interface of the browser application using the digital data of the token.

According to some aspects, the apparatus may include one or more features (or any combination thereof). The executable instructions include instructions that when executed by the at least one processor cause the at least one processor to update a browser setting of the browser application such that a display aspect of the user interface of the browser application is changed. The executable instructions include instructions that when executed by the at least one processor cause the at least one processor to render the digital data of the token as a background image in the user interface of the browser application. The executable instructions include instructions that when executed by the at least one processor cause the at least one processor to render the digital data as a profile image of a user in the user interface of the browser application. The token is a first token and the digital data is first digital data, the digital asset holder identifying a second token stored on the blockchain network, where the executable instructions include instructions that when executed by the at least one processor cause the at least one processor to receive a request to render a first browser tab of the browser application, render the first browser tab with a background image that includes the first digital data associated with the first token, receive a request to render a second browser tab of the browser application, and render the second browser tab with a background image that includes second digital data associated with the second token. The executable instructions include instructions that when executed by the at least one processor cause the at least one processor to obtain metadata about the token, generate a recommendation based on the metadata, the recommendation including web content, and render, in the user interface of the browser application, information that identifies the web content. The token is a first token, the digital asset holder identifies a second token, where the executable instructions include instructions that when executed by the at least one processor cause the at least one processor to render, in the user interface of the browser application, a user interface module that displays digital data associated with the first token for a first predetermined period of time and displays digital data associated with the second token for a second predetermined period of time. The digital asset holder is a third-party digital asset holder.

According to an aspect, a non-transitory computer-readable medium storing executable instructions that when executed by at least one processor cause the at least one processor to execute operations, where the operations include obtaining, by a browser application, an identifier associated with a token stored on a blockchain network, retrieving, by the browser application, digital data of the token using the identifier, and customizing a user interface of the browser application using the digital data of the token.

According to some aspects, the operations may include one or more of the following features (or any combination thereof). The operations may include updating a browser setting of the browser application such that a display aspect of the user interface of the browser application is changed. The operations may include rendering the digital data of the token as a background image in the user interface of the browser application. The operations may include rendering the digital data as a profile image of a user in the user interface of the browser application. The token is a first token and the digital data is first digital data, where the operations further include receiving a request to render a first browser tab of the browser application, rendering the first browser tab with a background image that includes the first digital data associated with the first token, receiving a request to render a second browser tab of the browser application, and rendering the second browser tab with a background image that includes second digital data associated with a second token. The operations may include obtaining metadata about the token, generating a recommendation based on the metadata, and rendering, in the user interface of the browser application, information that identifies the recommendation. The operations may include identifying a plurality of tokens stored on the blockchain network based on the identifier, and rendering, in the user interface of the browser application, a user interface module that displays digital data associated with a token of the plurality of tokens for a predetermined period of time. The identifier includes a shared address of a digital asset holder. The operations may include receiving the identifier from a digital asset holder that stores a private key for authenticating a transaction on the blockchain network. The digital asset holder includes an extension to the browser application, a native application, or a server application. The operations may include rendering a user interface object for receiving the identifier.

FIGS. 19A through 19D illustrate a system 1900 for managing inter-ledger transactions involving one or more blockchain networks 1910 according to an aspect. In some examples, the system 1900 includes a single blockchain network 1910. In some examples, the system 1900 includes two or more blockchain networks 1910. The system 1900 may enable inter-ledger transfer of digital assets from a user 1901 to a requesting party 1990. An inter-ledger transfer may refer to the transfer of digital assets from one type of ledger (e.g., Ethereum) to another type of ledger (e.g., Bitcoin), which may be on the same blockchain network 1910 or different blockchain networks 1910. The system 1900 includes a user agent 1980, executable by a computing device 1926, configured to function as an intermediary for inter-edger transactions involving one or more blockchain networks 1910 (e.g., either blockchain network 1910-1 or blockchain network 1910-2, or blockchain network 1910-1 and blockchain network 1910-2). The system 1900 may be an example of the systems described with reference to FIGS. 1 through 18 and may include any of the details discussed with reference to those figures.

Figure 19A:
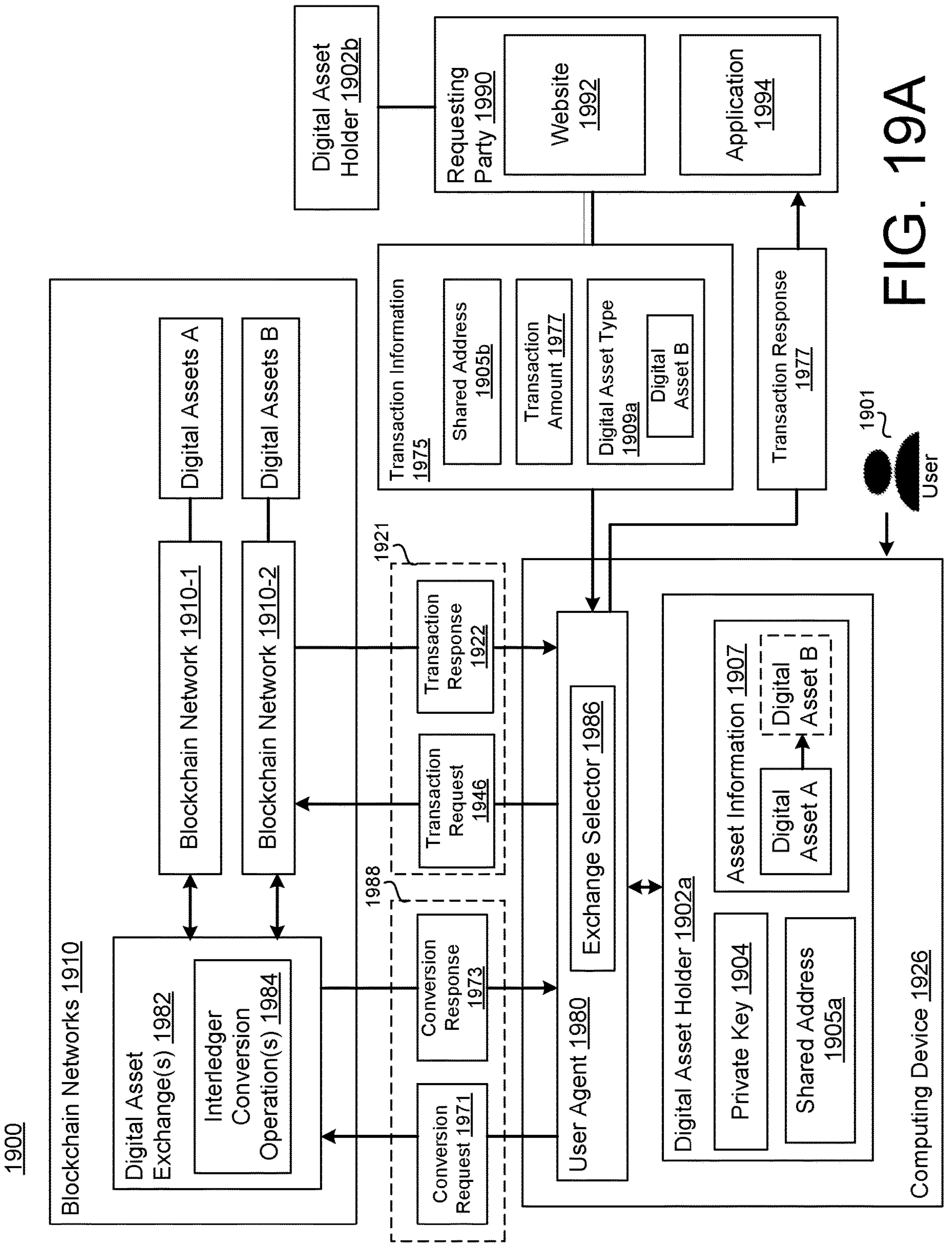
FIG. 19A illustrates a system for managing inter-ledger transactions involving one or more blockchain networks according to an aspect.
Figure 19B:
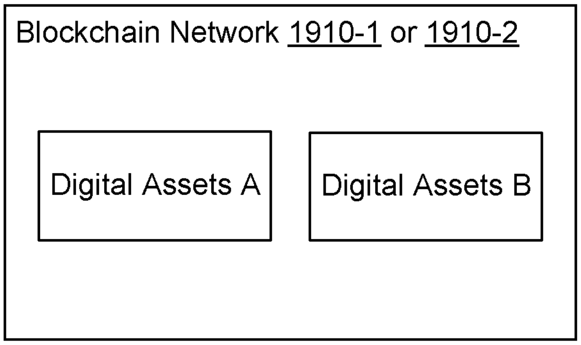
FIG. 19B illustrates an example of a blockchain network according to an aspect.

Each type of digital asset may represent a different payment network and each type of digital asset may be stored on the same blockchain network 1910 or different blockchain networks 1910. The digital assets may include fungible tokens (e.g., crypto-currency) stored on the blockchain networks 1910. The blockchain network 1910-1 and the blockchain network 1910-2 may represent different blockchain networks. The blockchain network 1910-1 may store tokens from one or more public ledgers. The blockchain network 1910-2 may store tokens from one or more public ledgers. As shown in FIG. 19A, digital assets A may be stored on the blockchain network 1910-1 and digital assets B may be stored on the blockchain network 1910-2. In some examples, as shown in FIG. 19B, the digital assets A and the digital assets B are both stored in different ledgers on the blockchain network 1910-1 or the digital assets A and the digital assets B are stored in different ledgers on the blockchain network 1910-2. In some examples, digital assets A may represent one type of fungible token (e.g., Ethereum), and digital assets B may represent another type of fungible tokens (e.g., Bitcoin). Although Ethereum and Bitcoin are used as examples of different types of digital assets for ease of explanation, the digital assets may represent any type of digital asset that can be stored on blockchain networks 1910 as fungible tokens.

The computing device 1926 may be any type of computing device that includes one or more processors (e.g., the processor(s) 228 of FIGS. 2A through 2D), one or more memory devices (e.g., the memory device(s) 230 of FIGS. 2A through 2D), a display 1934, and an operating system (e.g., the operating system 232 of FIGS. 2A through 2D) configured to execute (or assist with executing) one or more applications. In some examples, the computing device 1926 is a laptop computer. In some examples, the computing device 1926 is a desktop computer. In some examples, the computing device 1926 is a tablet computer. In some examples, the computing device 1926 is a smartphone. In some examples, the computing device 1926 is a wearable device.

The user agent 1980 may be stored (and executed) on the computing device 1926, which is associated with a user 1901. In some examples, the user agent 1980 is a part of (or integrated into) a browser application. In some examples, a browser application may be configured to execute any (or a portion) of the operations explained with reference to the user agent 1980. The browser application may be a web browser configured to access information on the Internet. In some examples, the browser application is a separate application from the operating system of the computing device 1926, where the browser application is installable on (and executable by) the operating system. In some examples, the browser application is the device's operating system (or included as part of the device's operating system). The browser application may launch one or more browser tabs in the context of one or more browser windows on a display of the computing device 1926. In some examples, the browser application may launch one or more browser tabs without reference to a browser window. In some examples, the user agent 1980 is a web application or extension to the browser application. In some examples, the user agent 1980 is a part of (or integrated into) a non-browser application such as a native application that is installed on the device's operating system. In some examples, the user agent 1980 is a part of (or integrated into) the operating system of the computing device 1926.

The user agent 1980 may enable an inter-ledger transaction for transferring digital assets from the user 1901 to the requesting party 1990 in a manner that can reduce the amount of computer complexity to implement inter-ledger transactions involving different ledgers on one or more blockchain networks 1910 (thereby reducing the amount of computing resources). For example, to enable the inter-ledger transaction, the user agent 1980 may define one or more operations and/or protocols for communicating with the requesting party 1990, a digital asset holder 1902*a* associated the user 1901, one or more digital asset exchanges 1982, and one or more blockchain networks 1910. Further, some (or all) of the operations of the user agent 1980 may operate in one or more background operations with minimal input from the user 1901 and without interrupting the transaction flow for the user 1901 sender (thereby avoiding the need to install one or more additional applications).

The user agent 1980 may receive transaction information 1975 for completing a blockchain transaction with a requesting party 1990. The requesting party 1990 may include or be associated with a website 1992 and/or an application 1994. In some examples, the website 1992 and/or the application 1994 includes executable code that enables communication with the user agent 1980.

In some examples, the user agent 1980 may receive the transaction information 1975 from the website 1992 (e.g., a web server that hosts the website 1992). For example, the user 1901 may use an application (e.g., a browser application, a native application) to render web content, where the web content includes a website 1992. In some examples, the website 1992 may include a user-selectable element to acquire an item. In some examples, in response to receiving a selection of the user-selectable element, the user agent 1980 is configured to receive the transaction information 1975. In some examples, the user agent 1980 receives the transaction information 1975 via an application programming interface (API) that enables the user agent 1980 and the website 1992 to communicate with each other. If the user agent 1980 is incorporated into a browser application, the browser application, and the website 1992 may communicate with each other via one or more APIs that are defined at the browser application and/or the website 1992. If the user agent 1980 is incorporated into an operating system of the computing device 1926, the operating system and the website 1992 may communicate with each other via one or APIs that are defined at the operating system and/or the website 1992.

In some examples, the user agent 1980 may receive the transaction information 1975 from the application 1994. In some examples, the application 1994 is an application that executes on the computing device 1926. The application 1994 may display content that includes a user-selectable item to acquire an item, and, in response to receiving a selection of the user-selectable item, the user agent 1980 is configured to receive the transaction information 1975. In some examples, the user agent 1980 receives the transaction information 1975 from the application 1994 via one or more APIs defined at the user agent 1980 and/or the application 1994 to enable the user agent 1980 and the application 1994 to communicate with each other. In some examples, the user agent 1980 receives the transaction information 1975 from the application 1994 via an inter-process communication (IPC) protocol that enables the user agent 1980 and the application 1994 to communicate with each other using the operating system.

The user agent 1980 may receive the transaction information 1975 via a uniform protocol that reduces the complexity of facilitating inter-ledger transactions involving one or more blockchain networks 1910. In some examples, the uniform protocol is platform specific. For example, with respect to a mobile platform, the user agent 1980 may receive the transaction information 1975 via one or more APIs defined on the mobile's devices operating system (e.g., Android/iOS APIs). In some examples, with respect to a web platform, the user agent 1980 may receive the transaction information 1975 via one or more JavaScript APIs. In some examples, the uniform protocol is platform-agnostic, where the same protocol is common across web and mobile platforms.

The transaction information 1975 may include a digital asset type 1909*a*, a transaction amount 1977, and/or a shared address 1905*b* of a digital asset holder 1902*b* associated with the requesting party 1990. In some examples, the shared address 1905*b* is the identifier (e.g., the public identifier) of the digital asset holder 1902*b* of the requesting party 1990. The digital asset type 1909*a* includes information that indicates the type of digital asset requested by the requesting party 1990. In the example of FIG. 19A, the digital asset type 1909*a* is digital asset B (e.g., Ethereum). In this example, for the item selected by the user 1901, the requesting party 1990 is asking to receive digital assets B for the transaction amount 1977 in the shared address 1905*b*.

Figure 19C:
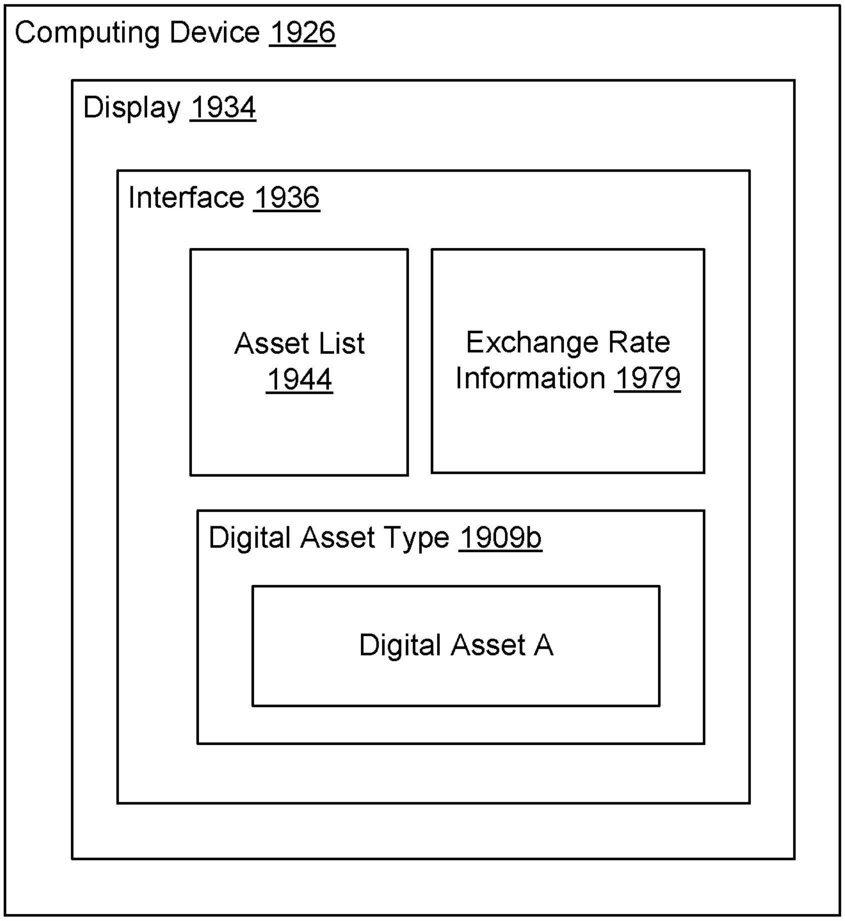
FIG. 19C illustrates an example of a computing device displaying an interface for displaying an asset list and/or receiving a type of digital asset according to an aspect.

In response to receiving the transaction information 1975, referring to FIG. 19C, the user agent 1980 may cause an interface 1936 to be provided (e.g., rendered) on a display 1934 of the computing device 1926. The interface 1936 may display an asset list 1944 that identifies the digital assets (and types of digital assets) associated with the digital asset holder 1902*a* of the user 1901.

A digital asset holder 1902*a* may be an example of any of the digital asset holders explained with reference to FIGS. 1 through 18. In some examples, the digital asset holder 1902*a* is a native (or built-in) asset holder that is a part of the browser application which also stores the user agent 1980. In some examples, the digital asset holder 1902*a* is a third-party digital asset holder, and the user agent 1980 can communicate with the third-party digital asset holder using any of the techniques described with reference to FIGS. 1 through 9. The digital asset holder 1902*a* may be an application or program that stores a private key 1904 for enabling transactions on the blockchain network(s) 1910. Also, the digital asset holder 1902*a* includes a shared address 1905*a* that can identify the locations of accounts on the blockchain networks 1910. In some examples, the digital asset holder 1902*a* may access or include asset information 1907 about the user's digital assets stored on the blockchain networks 1910. For example, the digital asset holder 1902*a* may identify one or more types of digital assets that are owned by the user 1901 and stored on the blockchain networks 1910. In the example of FIG. 19A, the digital asset holder 1902*a* is associated with digital assets A (e.g., Bitcoin), which is stored on the blockchain network 1910-1 or the blockchain network 1910-2.

The user agent 1980 may communicate with the digital asset holder 1902*a* to obtain information related to the digital assets owned by the user 1901. In some examples, in the case of the digital asset holder 1902*a* implemented as a native (or built-in) digital asset holder, the user agent 1980 may obtain an asset list 1944 from the asset information 1907 in the digital asset holder 1902*a*, and then render the asset list 1944 in the interface 1936. In some examples, in the case of the digital asset holder 1902*a* implemented as a third-party digital asset holder, the user agent 1980 may communicate with the digital asset holder 1902*a* via one or more APIs (e.g., API(s) 238) to obtain the asset list 1944, and then render the asset list 1944 in the interface 1936.

Referring to FIG. 19C, the interface 1936 may also display exchange rate information 1979 about the exchange rate for converting one or more of the digital assets owned by the user 1901 to the digital asset type 1909*a* requested by the requesting party 1990. For example, the user 1901 owns digital asset A stored on the blockchain network 1910-1 (or the blockchain network 1910-2), but the requesting party 1990 has requested to receive digital asset B. The exchange rate information 1979 may indicate the exchange rate for converting digital assets A to digital assets B using a particular digital asset exchange 1982. In some examples, the exchange rate information 1979 may indicate an exchange rate for multiple digital asset exchanges 1982 for converting digital assets A to digital assets B. In some examples, the exchange rate information 1979 may include any transaction fees associated with converting digital assets A to digital assets B. In some examples, the exchange rate information 1979 may identify the particular digital asset exchange 1982, and, in some examples, information about the particular digital asset exchange 1982 (including selectable web links). It is noted that the user 1901 may also own other digital assets, where the exchange rate information 1979 may provide the exchange rate(s) for converting the other digital assets to the requested digital assets.

In order to obtain the exchange rate information 1979, the user agent 1980 may communicate with one or more digital asset exchanges 1982. A digital asset exchange 1982 may be an application that can execute one or more inter-ledger conversion operations 1984 to convert one type of digital asset (e.g., Ethereum) to another type of digital asset (e.g., Bitcoin). In some examples, a digital asset exchange 1982 executes on a blockchain network 1910. In some examples, a digital asset exchange 1982 does not execute on a blockchain network 1910 (e.g., rather a server computer that does not use blockchain technology).

In some examples, the digital asset exchange 1982 is an application that executes on one or more blockchain networks 1910, which may include the blockchain network

1910-1, the blockchain network 1910-2, or a different blockchain network 1910. In some examples, if digital assets A and digital assets B are stored on the blockchain network 1910-1, the digital asset exchange 1982 may execute as a smart contract on the blockchain network 1910-1 to convert digital assets A to digital assets B (or vice versa). In some examples, the digital asset exchange 1982 includes a decentralized exchange (DEX). A DEX is an application that executes on one or more blockchain networks 1910, where the code is embodied as smart contacts on the blockchain network(s) 1910. In some examples, a DEX enables peer-to-peer transactions to take place online securely without the need of an intermediary (e.g., a central authority) using smart contracts on blockchain network(s) 1910. As part of the smart contract(s), the DEX calculates the exchange rate based on the liquidity pool size and converts the provided crypto-currency to the requested crypto-currency. For example, converting 100 Bitcoin to Ethereum, the DEX would take 100 Bitcoin from a user's digital asset holder 1902*a* on the Bitcoin ledger and put the corresponding Ethereum on the user's digital asset holder 1902*a* on the Ethereum ledger.

In some examples, a digital asset exchange 1982 includes a centralized exchange that converts tokens on different blockchain networks 1910. For example, digital assets A may be stored on the blockchain network 1910-1 and digital assets B may be stored on the blockchain network 1910-2, where the centralized exchange may communicate with the blockchain network 1910-1 and the blockchain network 1910-2 to convert the user's digital assets across the different blockchain networks 1910.

The user agent 1980 may obtain the asset information 1907 (e.g., the types/amounts of each digital asset) from the digital asset holder 1902*a*, the digital asset type 1909*a* identified in the transaction information 1975, and, in some examples, the transaction amount 1977, and may query one or more digital asset exchanges 1982 to obtain the exchange rate information 1979. In some examples, the user agent 1980 may communicate with the digital asset exchange(s) 1982 using one or more APIs defined at the user agent 1980. In some examples, the user agent 1980 may transmit and receive JSON messages to communicate with the blockchain network(s) 1910 that execute the digital asset exchange(s) 1982 to receive the exchange rate information 1979.

In some examples, the user agent 1980 includes an exchange selector 1986. The exchange selector 1986 may select a digital asset exchange 1982 from a plurality of digital asset exchanges 1982 based on the exchange rate information 1979 associated with a respective digital asset exchange 1982 of the plurality of digital asset exchanges 1982. For example, the exchange rate information 1979 may indicate the exchange rate for converting digital asset A to digital asset B. In some examples, the exchange selector 1986 may select a particular digital asset exchange 1982 for converting one type of digital asset to another type of digital asset based on selection criteria, which may include selecting the digital asset exchange 1982 having the best conversion rate, lowest transaction fee, and/or a combination of both. In some examples, the conversion rate for the selected digital asset exchange 1982 may be provided for a respective digital asset type in the asset list 1944.

After the user reviews the asset list 1944 and the exchange rate information 1979, the user agent 1980 may receive selection of a digital asset type 1909*b* via the interface 1936. In the example of FIGS. 19A through 19D, the user has selected digital asset A, which is stored on the blockchain network 1910-1.

In some examples, instead of providing an interface 1936 to enable the user 1901 to select a particular digital asset to convert to the requested digital asset, the user agent 1980 may automatically select a particular type of digital asset based on the user's stored preferences. For example, the user agent 1980 may store one or more user preferences such as a preferred digital asset type to use when the transaction information 1975 indicates a certain digital asset type.

In response to obtaining the digital asset type 1909*b*, the user agent 1980 may communicate with the digital asset exchange 1982 to enable the digital asset exchange 1982 to perform the inter-ledger conversion operation(s) 1984 to convert the user's digital assets from the digital asset type 1909*b* (e.g., digital asset A) to the digital asset type 1909*a* (e.g., digital asset B).

The user agent 1980 may transmit a conversion request 1971 to the digital asset exchange 1982, where the conversion request 1971 is configured to cause the digital asset exchange 1982 to convert the transaction amount 1977 of the user's digital assets in the digital asset holder 1902*a* from the digital asset type 1909*b* (e.g., digital asset A) to the digital asset type 1909*a* (e.g., digital asset B). The conversion request 1971 may identify the shared address 1905*a* of the digital asset holder 1902*a*, the transaction amount 1977, the digital asset type 1909*a*, and the digital asset type 1909*b*.

If digital assets A and digital assets B are stored in different ledgers on the same blockchain network 1910-1 (as shown in FIG. 19B), the digital asset exchange 1982 may communicate with the blockchain network 1910-1 (or the blockchain network 1910-2) to record a transaction to subtract the transaction amount 1977 from the user's digital assets (e.g., associated with digital asset holder 1902*a*) and record a transaction to add the transaction amount 1977 associated with the digital asset holder 1902*b*. In some examples, if digital assets A and digital asset B are stored on different blockchain networks (as shown in FIG. 19A), the digital asset exchange 1982 may communicate with the blockchain network 1910-1 to record a transaction to subtract the transaction amount 1977 from the user's digital assets stored on the blockchain network 1910-1 and may communicate with the blockchain network 1910-2 to record a transaction to add the transaction amount 1977 to the blockchain network 1910-2. In response to the digital asset exchange 1982 executing the inter-ledger conversion operation(s) 1984, the user agent 1980 may receive a conversion response 1973. The conversion response 1973 may include the results of the conversion and one or more transaction identifiers.

In some examples, before the conversion request 1971 is transmitted to the digital asset exchange 1982, the user agent 1980 communicates with the digital asset holder 1902*a* to authenticate the conversion request 1971 using the private key 1904, and then transmits the authenticated conversion request 1971 to the digital asset exchange 1982. For example, the digital asset holder 1902*a* may execute a smart contract or a cryptographic operation using the private key 1904 to authenticate (or sign) the conversion request 1971. In some examples, the user agent 1980 transmits the conversion request 1971 and receives the authenticated conversion request 1971 via one or more APIs (e.g., the API(s) 238 of FIGS. 2A through 2D). In some examples, the user agent 1980 transmits the conversion response 1973 to the digital asset holder 1902*a*. In some examples, the conversion request 1971 and the conversion response 1973 are communicated between the user agent 1980 and the digital asset exchange 1982 using JavaScript object notation (JSON) messages 1988.

In some examples, in response to the conversion response 1973, the digital asset holder 1902*a* may update the asset information 1907 to indicate that the user 1901 has digital asset B (at least having the transaction amount 1977), which has been converted from digital asset A. In response to the conversion response 1973, the user agent 1980 may communicate with a blockchain network 1910 (e.g., the blockchain network 1910-1 or the blockchain network 1910-2, whichever blockchain stores digital assets B) to transfer the transaction amount 1977 of digital asset B from the digital asset holder 1902*a* (associated with the user 1901) to the digital asset holder 1902*b* (associated with the requesting party 1990). In some examples, the user agent 1980 may communicate with the blockchain network 1910 by transmitting and receiving messages 1921. In some examples, the messages 1921 includes JSON messages. In some examples, the user agent 1980 may communicate with the blockchain network 1910 via one or more APIs (e.g., the API(s) 240 of FIGS. 2A through 2D).

The user agent 1980 may transmit a transaction request 1946 to the blockchain network 1910-2. Although FIG. 19A illustrates the user agent 1980 transmitting the transaction request 1946 to the blockchain network 1910-2, it is noted that the user agent 1980 may transmit the transaction request 1946 to the blockchain network 1910-1 (so, in some examples, blockchain network 1910-1 and blockchain network 1910-2 can be used interchangeably). If digital assets A and digital assets B are stored on the blockchain network 1910-1, the user agent 1980 transmits the transaction request 1946 to the blockchain network 1910-1. If digital assets A are stored on the blockchain network 1910-1 and digital assets B are stored on the blockchain network 1910-2, the user agent 1980 transmits the transaction request 1946 to the blockchain network 1910-2.

The user agent 1980 may transmit the transaction request 1946 to a node gateway (e.g., the node gateway 214 of FIGS. 2A through 2D) of the blockchain network 1910-2. The transaction request 1946 may cause the blockchain network 1910-2 to transfer the transaction amount 1977 from the digital asset holder 1902*a* to the digital asset holder 1902*b*. In some examples, the transaction request 1946 is configured to cause the blockchain network 1910-2 to add at least one transaction to the blockchain network 1910-2 that transfers the transaction amount 1977 from the user 1901 to the requesting party 1990. In some examples, the blockchain network 1910-2 adds a transaction to the blockchain network 1910-2, associated with the digital asset holder 1902*a*, that subtracts the transaction amount 1977 from the user's digital assets B. In some examples, the blockchain network 1910-2 adds a transaction to the blockchain network 1910-2, associated with the digital asset holder 1902*b*, that adds the transaction amount 1977 to the requesting party's digital assets B.

The transaction request 1946 may include details about the transaction(s) to be created on the blockchain network 1910-2. The transaction request 1946 may include the shared address 1905*a* (e.g., the sender), the shared address 1905*b* (e.g., the receiver) and the transaction amount 1977. In some examples, the transaction request 1946 includes information that identifies the type of digital asset (e.g., digital assets B).

In some examples, the transaction request 1946 may include authentication information indicating that the transaction is authenticated (e.g., signed). For example, before the transaction request 1946 is transmitted to the blockchain network 1910-2, the user agent 1980 may communicate with the digital asset holder 1902*a* to cause the digital asset holder 1902*a* to authenticate the transaction request 1946 using the private key 1904. In some examples, the user agent 1980 may communicate with the digital asset holder 1902*a* via one or more APIs (e.g., the API(s) 238 of FIGS. 2A through 2D). For example, the digital asset holder 1902*a* may execute a smart contract or a cryptographic operation using the private key 1904 to authenticate (or sign) the transaction request 1946. The digital asset holder 1902*a* may return the authenticated transaction request 1946, and the user agent 1980 may transmit the authenticated transaction request 1946 to the blockchain network 1910-2.

After the transaction(s) are committed to the blockchain network 1910-2, the user agent 1980 may receive a transaction response 1922 from the blockchain network 1910-2. The transaction response 1922 may include a transaction identifier of the transaction added to the blockchain network 1910-2 that is associated with the digital asset holder 1902*a*. In some examples, the transaction request 1946 and the transaction response 1922 are communicated between the user agent 1980 and the blockchain network 1910-2 using messages 1921 (e.g., JSON messages). In some examples, the transaction request 1946 and the transaction response 1922 are examples of the authenticated transaction request 246 and the transaction response 222, respectively, of FIGS. 2A through 2D. In some examples, in response to the transaction response 1922, the user agent 1980 may transmit a notification (e.g., the notification 252 of FIGS. 2A through 2D) to the digital asset holder 1902*a*. In some examples, the user agent 1980 may transmit a notification to the website 1992 or application 1994 associated with the requesting party 1990.

In some examples, the user agent 1980 may determine to use multiple digital asset exchanges 1982 to enable the conversion of one type of digital asset to another type of digital asset. For example, if the digital assets A and digital assets B are not major crypto-currencies (e.g., widely used), the user agent 1980 may not be able to find a single digital asset exchange 1982 to perform the conversion from digital assets A to digital assets B. In some examples, as shown in FIG. 19D, the user agent 1980 may use two or more digital asset exchanges 1982 to execute the conversion of the transaction amount 1977 from digital assets A to digital assets B.

The user agent 1980 may determine that a single digital asset exchange 1982 is not capable of converting digital assets A to digital assets B. In some examples, the user agent 1980 may store information about the digital asset exchanges 1982 such as a list of digital asset exchanges 1982 and their capabilities of converting one type of digital asset to another type of digital asset. In some examples, the user agent 1980 may communicate with the digital asset exchanges 1982 to obtain information about their capabilities of converting one type of digital asset to another type of digital asset.

The user agent 1980 may select two or more digital asset exchanges 1982 that use one or more intermediate digital currencies (e.g., digital asset C) to execute the conversion from digital asset A to digital asset B. In some examples, the user agent 1980 may identify a swap sequence (e.g., inter-ledger operation sequence) that identifies an order of execution of two or more inter-ledger conversion operations 1984 involving one or more intermediate digital assets (e.g., digital assets C).

Figure 19D:
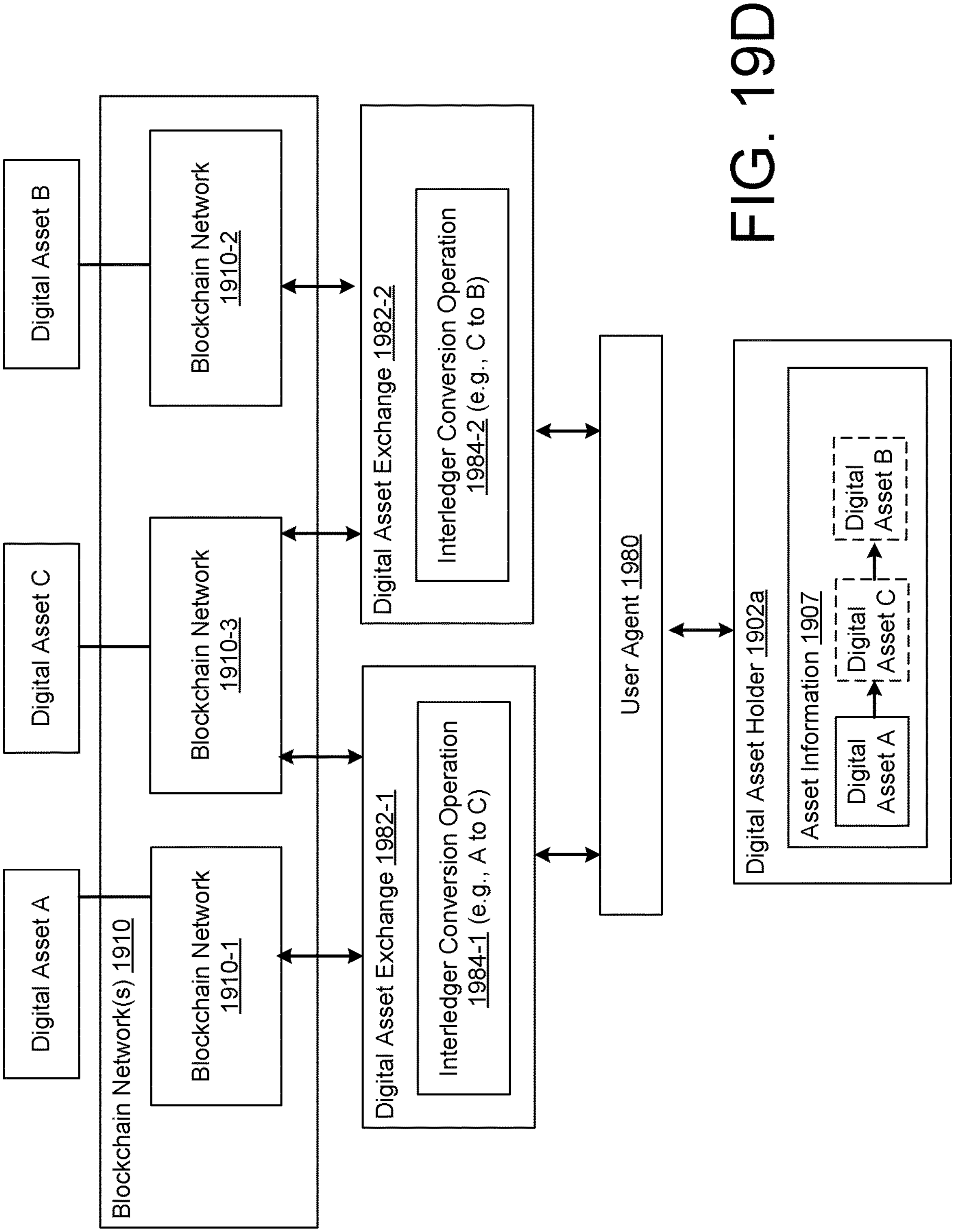
FIG. 19D illustrates another system for managing inter-ledger transactions involving multiple blockchain networks according to an aspect.

As shown in FIG. 19D, the user agent 1980 may select a digital asset exchange 1982-1 to execute an inter-ledger conversion operation 1984-1 to convert the transaction amount 1977 from digital assets A to digital assets C. Also, the user agent 1980 may select digital asset exchange 1982-2 to execute an inter-ledger conversion operation 1984-2 to convert the transaction amount 1977 from digital assets C to digital assets B. The digital asset exchange 1982-1 and the digital asset exchange 1982-2 may be separate applications (e.g., decentralized applications or centralized applications). In some examples, the digital asset exchange 1982-1 and the digital asset exchange 1982-2 may be separate decentralized exchanges (e.g., DEXs). In some examples, the digital asset exchange 1982-1 is a decentralized exchange (e.g., that converts tokens on the same blockchain network 1910) and the digital asset exchange 1982-2 is a centralized exchanged (e.g., that converts token across different blockchain networks 1910) or vice versa. In some examples, the digital asset exchange 1982-1 and the digital asset exchange 1982-2 are separate centralized exchanges. As shown in FIG. 19D, in some examples, digital assets A may be stored on blockchain network 1910-1, digital assets B may be stored on blockchain network 1910-2, and digital assets C may be stored on blockchain network 1910-3. However, it is noted that digital assets A, digital assets B, and digital assets C may be stored on one or more blockchain networks 1910. In some examples, digital assets A, digital assets B, and digital assets C may be stored on blockchain network 1910-1. In some examples, digital assets A and digital assets B may be stored on blockchain network 1910-1 and digital assets C may be stored on blockchain network 1910-2 or blockchain network 1910-3.

The user agent 1980 may transmit a conversion request 1971 (e.g., a first conversion request) to the digital asset exchange 1982-1. The conversion request 1971 is configured to cause the digital asset exchange 1982-1 to convert the transaction amount 1977 of the user's digital assets from digital assets A to digital assets C. The user agent 1980 may transmit a conversion request 1971 (e.g., a second conversion request) to the digital asset exchange 1982-2. The conversion request 1971 is configured to cause the digital asset exchange 1982-2 to convert the transaction amount 1977 of the user's digital assets from digital assets C to digital assets B. The user agent 1980 may communicate with the digital asset holder 1902*a* to update the asset information 1907 (e.g., digital assets A to digital assets C to digital assets B) and obtain any required authentications using the user's private key 1904.

Figure 20:
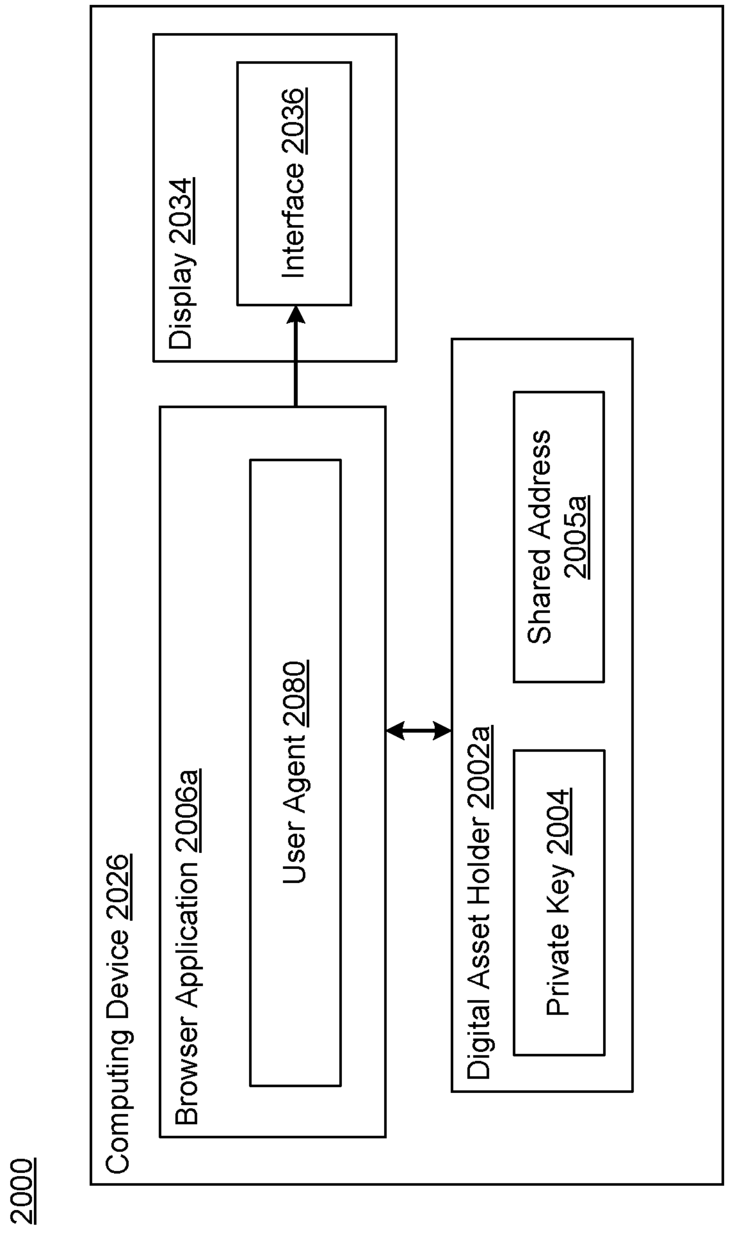
FIG. 20 illustrates a system depicting a browser application having a user agent according to an aspect.

FIG. 20 illustrates a system 2000 depicting a browser application 2006*a* having a user agent 2080 according to an aspect. For example, a computing device 2026 may execute a browser application 2006*a*, where the user agent 2080 is included within the browser application 2006*a*. The system 2000 may be an example of the system 1900 and may include any of the details discussed with reference to FIGS. 19A through 19D. In some examples, the system 2000 may be an example of any one or more of the systems discussed with reference to FIGS. 1 through 18 and may include any of the details discussed with reference to those figures. In some examples, the browser application 2006*a* is the browser application 206*a* of FIGS. 2A through 2D and may include any of the details discussed with those figures. The browser application 2006*a* may execute any of the functionalities described with reference to the user agent 1980 of FIGS. 19A through 19D. In some examples, the digital asset holder 2002*a* is a third-party digital asset holder.

The browser application 2006*a* may receive transaction information (e.g., the transaction information 1975 of FIGS. 19A through 19D) for completing a blockchain transaction with a requesting party (e.g., the requesting party 1990 of FIGS. 19A through 19D). In some examples, the browser application 2006*a* receives the transaction information from web content (e.g., webpage) hosted on a web server. The browser application 2006*a* may receive the transaction information via a uniform protocol that reduces the complexity of facilitating inter-ledger transactions involving one or more blockchain networks. In some examples, the browser application 2006*a* may receive the transaction information via one or more JavaScript APIs.

In response to receiving the transaction information, the browser application 2006*a* may cause an interface 2036 to be provided (e.g., rendered) on a display 2034 of the computing device 2026. In some examples, the interface 2036 includes a UI prompt rendered by the browser application 2006*a* in a browser tab. The interface 2036 may display an asset list that identifies the digital assets (and types of digital assets) associated with a digital asset holder 2002*a* of the user.

The digital asset holder 2002*a* may be an example of any of the digital asset holders explained with reference to FIGS. 1 through 18. In some examples, the digital asset holder 2002*a* is a third-party digital asset holder, and the browser application 2006*a* can communicate with the third-party digital asset holder using any of the techniques described with reference to FIGS. 1 through 9. The digital asset holder 2002*a* may be an application or program that stores a private key 2004 for enabling transactions on the blockchain network(s). Also, the digital asset holder 2002*a* includes a shared address 2005*a* that can identify the locations of accounts on the blockchain network(s). The browser application 2006*a* may communicate with the digital asset holder 2002*a* via one or more APIs (e.g., API(s) 238) to obtain the asset list, and then render the asset list in the interface 2036. Also, the interface 2036 may also display exchange rate information about the exchange rate for converting one or more of the digital assets owned by the user to the digital asset type requested by the requesting party. In order to obtain the exchange rate information, the browser application 2006*a* may communicate with one or more digital asset exchanges.

After the user reviews the asset list and the exchange rate information, the browser application 2006*a* may receive selection of a digital asset type via the interface 2036. In response to obtaining the digital asset type via the interface 2036, the browser application 2006*a* may communicate with the digital asset exchange(s) to enable the digital asset exchange(s) to perform the inter-ledger conversion operation(s) to convert the user's digital assets from one digital asset type to the digital asset type requested by the requesting party. The browser application 2006*a* may communicate with the blockchain network(s) to initiate the transfer of the user's digital assets to the requesting party.

Figure 21:
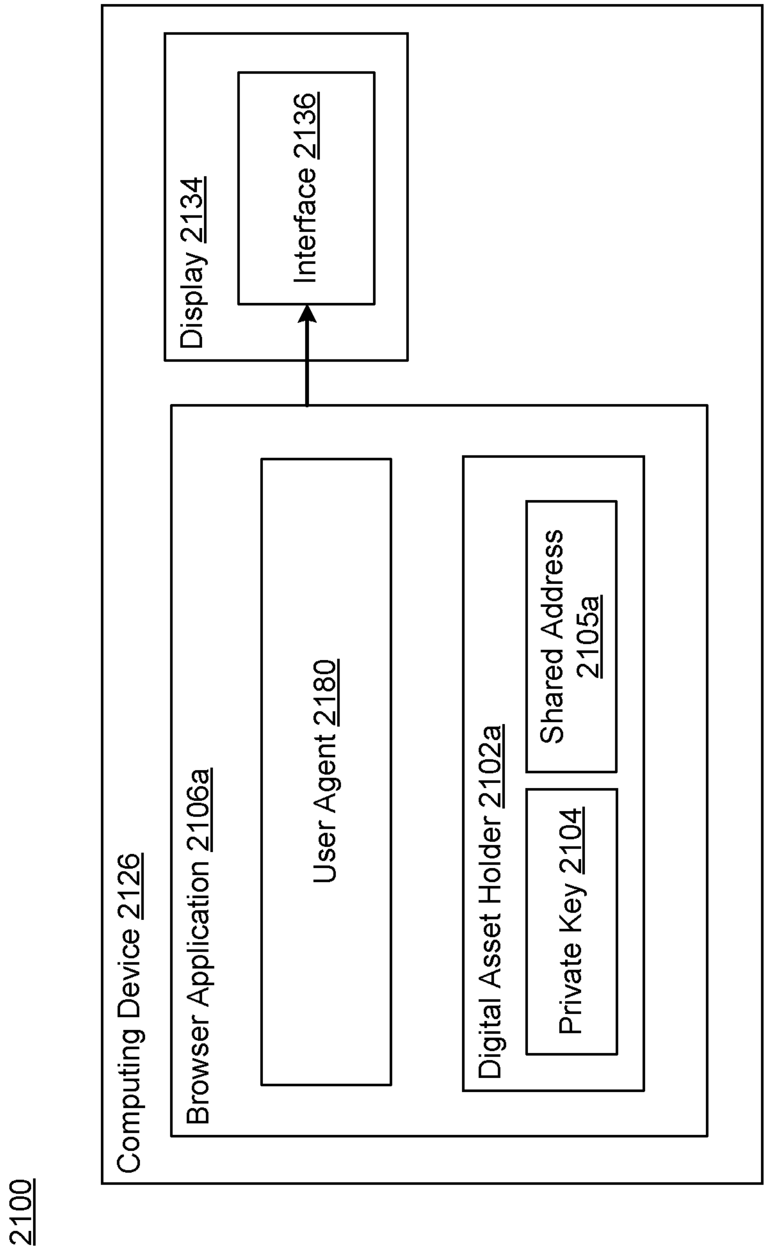
FIG. 21 illustrates a system depicting a browser application having a user agent and a digital asset holder according to another aspect.

FIG. 21 illustrates a system 2100 depicting a browser application 2106*a* having a user agent 2180 and a digital asset holder 2102*a* according to another aspect. In some examples, the digital asset holder 2102*a* is a native (or built-in) program that is included within (or associated with) the browser application 2106*a*. The system 2100 may be an example of the system 1900 and may include any of the details discussed with reference to FIGS. 19A through 19D. In some examples, the system 2100 may be an example of any one or more of the systems discussed with reference to FIGS. 1 through 18 and may include any of the details discussed with reference to those figures. In some examples, the browser application 2106*a* is the browser application 206*a* of FIGS. 2A through 2D and may include any of the details discussed with those figures. The browser application 2106*a* may execute any of the functionalities described with reference to the user agent 1980 of FIGS. 19A through 19D.

The browser application 2106*a* may receive transaction information (e.g., the transaction information 1975 of FIGS. 19A through 19D) for completing a blockchain transaction with a requesting party (e.g., the requesting party 1990 of FIGS. 19A through 19D). In some examples, the browser application 2106*a* receives the transaction information from web content (e.g., webpage) hosted on a web server. The browser application 2106*a* may receive the transaction information via a uniform protocol that reduces the complexity of facilitating inter-ledger transactions involving one or more blockchain networks. In some examples, the browser application 2106*a* may receive the transaction information via one or more JavaScript APIs.

In response to receiving the transaction information, the browser application 2106*a* may cause an interface 2136 to be provided (e.g., rendered) on a display 2134 of the computing device 2126. In some examples, the interface 2136 includes a UI prompt rendered by the browser application 2106*a*. In some examples, the interface 2136 is rendered by a browser tab. The interface 2136 may display an asset list that identifies the digital assets (and types of digital assets) associated with a digital asset holder 2102*a* of the user. The digital asset holder 2102*a* includes a private key 2104 and a shared address 2105*a*. In some examples, the browser application 2106*a* may communicate with the digital asset holder 2102*a* without the use of an API. Also, the interface 2136 may also display exchange rate information about the exchange rate for converting one or more of the digital assets owned by the user to the digital asset type requested by the requesting party. In order to obtain the exchange rate information, the browser application 2106*a* may communicate with one or more digital asset exchanges.

After the user reviews the asset list and the exchange rate information, the browser application 2106*a* may receive selection of a digital asset type via the interface 2136. In response to obtaining the digital asset type via the interface 2136, the browser application 2106*a* may communicate with the digital asset exchange(s) to enable the digital asset exchange(s) to perform the inter-ledger conversion operation(s) to convert the user's digital assets from one digital asset type to the digital asset type requested by the requesting party. The browser application 2106*a* may communicate with the blockchain network(s) to initiate the transfer of the user's digital assets to the requesting party.

Figure 22:
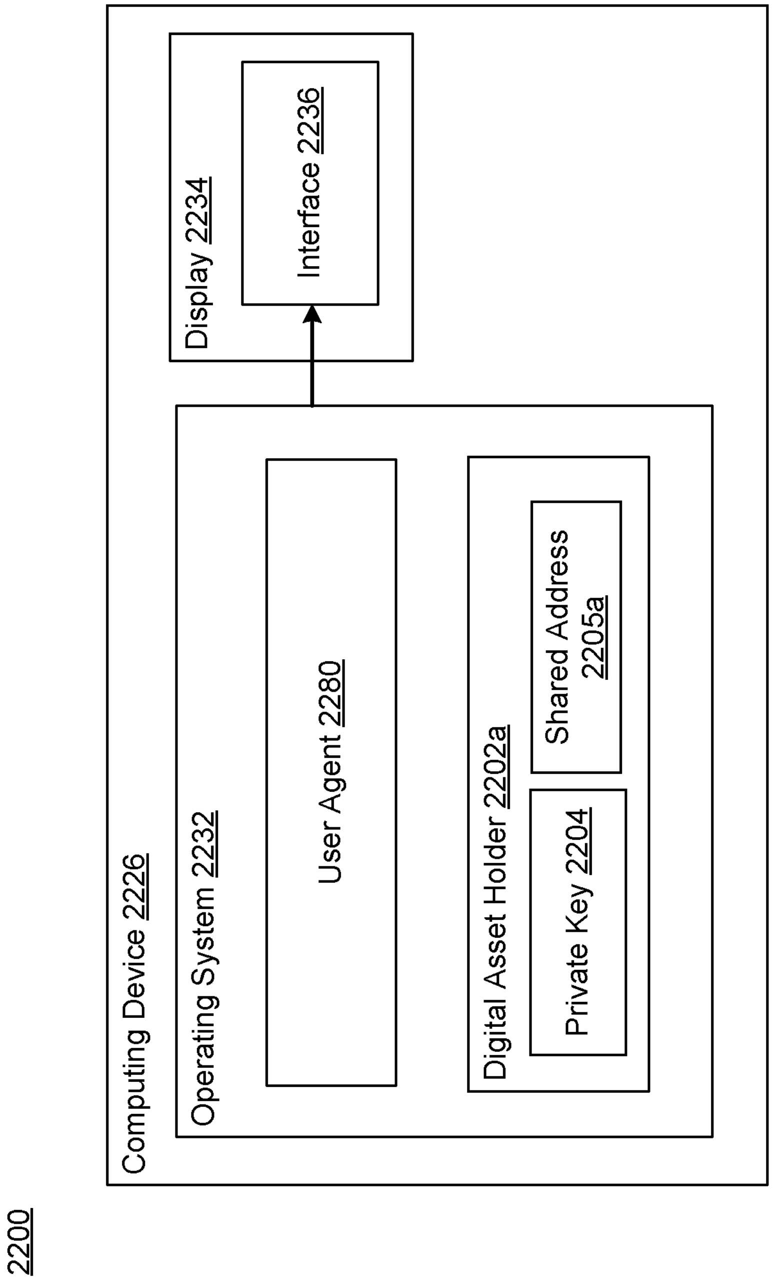
FIG. 22 illustrates a system depicting an operating system having a user agent according to an aspect.

FIG. 22 illustrates a system 2200 depicting an operating system 2232 having a user agent 2280 according to an aspect. For example, a computing device 2226 includes the operating system 2232, where the user agent 2280 is included within (or as part of) the operating system 2232. The system 2200 may be an example of the system 1900 and may include any of the details discussed with reference to FIGS. 19A through 19D. In some examples, the system 2200 may be an example of any one or more of the systems discussed with reference to FIGS. 1 through 18 and may include any of the details discussed with reference to those figures. The operating system 2232 may execute any of the functionalities described with reference to the user agent 1980 of FIGS. 19A through 19D. In some examples, the digital asset holder 2202*a* is a third-party digital asset holder or a native (built-in) digital asset holder.

The operating system 2232 is a system software that manages computer hardware, software resources, and provides common services for computing programs. In some examples, the operating system 2232 is an operating system designed for a larger display 234 such as a laptop or desktop (e.g., sometimes referred to as a desktop operating system). In some examples, the operating system 2232 is an operating system for a smaller display 234 such as a tablet or a smartphone (e.g., sometimes referred to as a mobile operating system).

The operating system 2232 may receive transaction information (e.g., the transaction information 1975 of FIGS. 19A through 19D) for completing a blockchain transaction with a requesting party (e.g., the requesting party 1990 of FIGS. 19A through 19D). In some examples, the operating system 2232 may receive the transaction information from one or more APIs defined on the operating system 2232. The operating system 2232 may receive the transaction information from web content (e.g., webpage) hosted on a web server or an application executing on the operating system 2232.

In response to receiving the transaction information, the operating system 2232 may cause an interface 2236 to be provided (e.g., rendered) on a display 2234 of the computing device 2226. In some examples, the interface 2236 includes a UI prompt rendered by an operating system component. The interface 2236 may display an asset list that identifies the digital assets (and types of digital assets) associated with a digital asset holder 2202*a* of the user.

The digital asset holder 2202*a* may be an example of any of the digital asset holders explained with reference to FIGS. 1 through 18. In some examples, the digital asset holder 2202*a* is a third-party digital asset holder, and the operating system 2232 can communicate with the third-party digital asset holder using any of the techniques described with reference to FIGS. 1 through 9. In some examples, the digital asset holder 2202*a* is a native (built-in) digital asset holder that is associated with the operating system 2232. In some examples, the digital asset holder 2202*a* is associated with or executed by a browser application. The digital asset holder 2202*a* may be an application or program that stores a private key 2204 for enabling transactions on the blockchain network(s). Also, the digital asset holder 2202*a* includes a shared address 2205*a* that can identify the locations of accounts on the blockchain network(s). The operating system 2232 may communicate with the digital asset holder 2202*a* to obtain the asset list, and then render the asset list in the interface 2236. Also, the interface 2236 may also display exchange rate information about the exchange rate for converting one or more of the digital assets owned by the user to the digital asset type requested by the requesting party. In order to obtain the exchange rate information, the browser application 2006*a* may communicate with one or more digital asset exchanges.

After the user reviews the asset list and the exchange rate information, the operating system 2232 may receive selection of a digital asset type via the interface 2236. In response to obtaining the digital asset type via the interface 2236, the operating system 2232 may communicate with the digital asset exchange(s) to enable the digital asset exchange(s) to perform the inter-ledger conversion operation(s) to convert the user's digital assets from one digital asset type to the digital asset type requested by the requesting party. The operating system 2232 may communicate with the blockchain networks to initiate the transfer of the user's digital assets to the requesting party.

Figure 23:
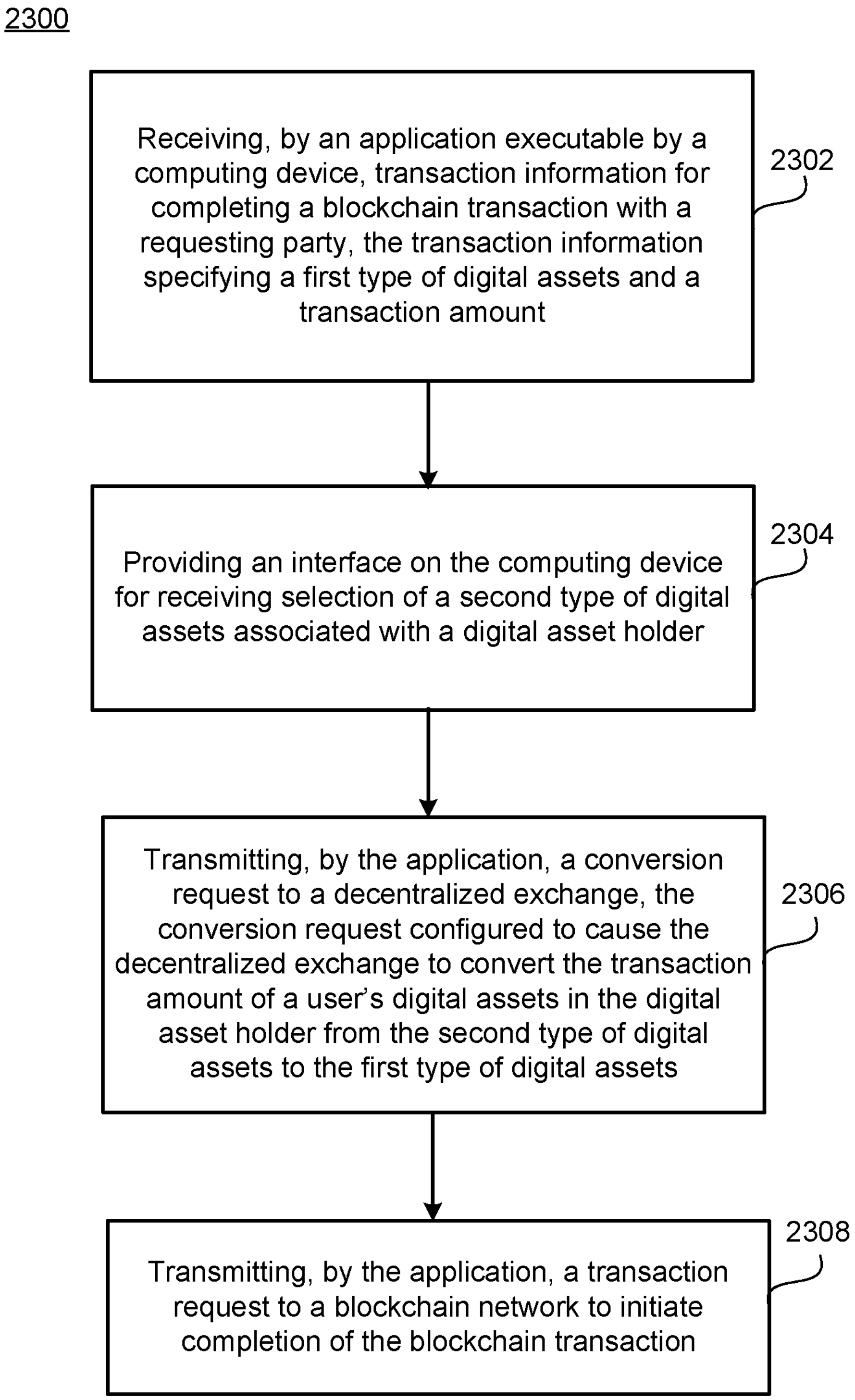
FIG. 23 is a flowchart depicting example operations of managing inter-ledger transactions involving one or more blockchain networks according to an aspect.

FIG. 23 is a flowchart 2300 depicting example operations of managing inter-ledger transactions involving one or more blockchain networks according to an aspect. For example, the flowchart 2300 may enable inter-ledger transfer of digital assets from a user to a requesting party. In some examples, the flowchart is executable by a user agent (e.g., user agent 1980 of FIGS. 19A through 19D). The user agent may be incorporated into a browser application. In some examples, the user agent may be incorporated into a non-browser application. In some examples, the user agent may be incorporated into an operating system of a computing device, where the operating system may be a mobile platform or a desktop platform. The user agent may function as an intermediary for transactions involving one or more blockchain networks.

Although the flowchart 2300 is explained with respect to the system 1900 of FIGS. 19A through 19D, the flowchart 2300 may be applicable to any of the embodiments discussed herein. Although the flowchart 2300 of FIG. 23 illustrates the operations in sequential order, it will be appreciated that this is merely an example, and that additional or alternative operations may be included. Further, operations of FIG. 23 and related operations may be executed in a different order than that shown, or in a parallel or overlapping fashion.

Operation 2302 includes receiving, by an application executable by a computing device 1926, transaction information 1975 for completing a blockchain transaction with a requesting party 1990, where the transaction information 1975 specifies a first type of digital assets (e.g., digital asset type 1909*a*) and a transaction amount 1977, and the digital assets of the first type (e.g., digital assets A) are stored on a first blockchain network (e.g., blockchain network 1910-1). The application includes a user agent 1980 configured to receive the transaction information 1975. In some examples, the application is a browser application. In some examples, the application is a non-browser application. In some examples, the application is an operating system.

Operation 2304 includes providing an interface 1936 on the computing device 1926 for receiving selection of a second type of digital assets (e.g., digital asset type 1909*b*) associated with a digital asset holder 1902*a*, where the digital assets of the second type (e.g., digital assets B) are stored on the first blockchain network (e.g., blockchain network 1910-1) or a second blockchain network (e.g., blockchain network 1910-2). In some examples, digital assets A and digital assets B are stored on a single blockchain network 1910. In some examples, digital assets A and digital assets B are stored on different blockchain networks 1910. The user agent 1980 may provide the interface 1936. In some examples, the interface 1936 includes a UI prompt. In some examples, the user agent 1980 may obtain an asset list 1944 associated with the digital asset holder 1902*a*, where the interface 1936 displays the asset list 1944, and the asset list 1944 identifies one or more types of digital assets associated with the digital asset holder 1902*a*, including the second type of digital assets (e.g., digital assets A). In some examples, the user agent 1980 receives exchange rate information 1979 from the digital asset exchange 1982, where the interface 1936 displays the exchange rate information 1979. The exchange rate information 1979 includes information that indicates an exchange rate for converting, using the digital asset exchange 1982, the transaction amount 1977 of the user's digital assets from the second type of digital assets (e.g., digital assets A) to the first type of digital assets (e.g., digital assets B). In some examples, the user agent 1980 may select the digital asset exchange 1982 from a plurality of digital asset exchanges 1982 based on exchange rate information 1979 associated with a respective digital asset exchange 1982 of the plurality of digital asset exchanges 1982.

Operation 2306 includes transmitting, by the application, a conversion request 1971 to a digital asset exchange 1982, where the conversion request 1971 is configured to cause the digital asset exchange 1982 to convert the transaction amount 1977 of a user's digital assets in the digital asset holder 1902*a* from the second type of digital assets (e.g., digital assets A) to the first type of digital assets (e.g., digital assets B). In some examples, the digital asset exchange 1982 includes a decentralized application executing on a blockchain network 1910 (e.g., converts token on the same blockchain network 1910). In some examples, the digital asset exchange 1982 includes a centralized application (e.g., converts tokens on different blockchain networks 1910). Operation 2308 includes transmitting, by the application, a transaction request 1946 to the first blockchain network (e.g., blockchain network 1910-2) or the second blockchain network (e.g., blockchain network 1910-1) to initiate completion of the blockchain transaction.

In some examples, the user agent 1980 determine to use a digital asset exchange 1982-1 and a digital asset exchange 1982-2 to convert the transaction amount 1977 of the user's digital assets from the second type of digital assets (e.g., digital assets A) to the first type of digital assets (e.g., digital assets B). In some examples, the user agent 1980 may transmit a first conversion request (e.g., conversion request 1971) to the digital asset exchange 1982-1, where the first conversion request is configured to cause the digital asset exchange 1982-1 to convert the transaction amount 1977 of the user's digital assets from the second type of digital assets (e.g., digital assets A) to a third type of digital assets (e.g., digital assets C). In some examples, digital assets A, digital assets B, and digital assets C are stored on the same blockchain network 1910. In some examples, the digital assets A, digital assets B, and digital assets C are stored on two or more different blockchain networks 1910. The user agent 1980 may transmit a second conversion request (e.g., conversion request 1971) to the digital asset exchange 1982-2 (or the digital asset exchange 1982-1), where the second conversion request is configured to cause the digital asset exchange 1982-2 (or the digital asset exchange 1982-1) to convert the transaction amount 1977 of the user's digital assets from the third type of digital assets (e.g., digital assets C) to the first type of digital assets (e.g., digital assets B).

According to some aspects, the method (e.g., the operations) may include one or more of the following features (or any combination thereof). The method may include obtaining an asset list associated with the digital asset holder, where the interface displays the asset list, the asset list identifying one or more types of digital assets associated with the digital asset holder, including the second type of digital assets. The method may include receiving exchange rate information from the digital asset exchange, where the interface displays the exchange rate information, the exchange rate information including information that indicates an exchange rate for converting, using the digital asset exchange, the transaction amount of the user's digital assets from the second type of digital assets to the first type of digital assets. The method may include selecting the digital asset exchange from a plurality of digital asset exchanges based on exchange rate information associated with a respective digital asset exchange of the plurality of digital asset exchanges. The digital asset exchange is a first digital asset exchange, where the method includes determining to use the first digital asset exchange and a second digital asset exchange to convert the transaction amount of the user's digital assets from the second type of digital assets to the first type of digital assets. The method further includes transmitting a first conversion request to the first digital asset exchange, the first conversion request configured to cause the first digital asset exchange to convert the transaction amount of the user's digital assets from the second type of digital assets to a third type of digital assets and transmitting a second conversion request to the second digital asset exchange, the second conversion request configured to cause the first digital asset exchange to convert the transaction amount of the user's digital assets from the third type of digital assets to the first type of digital assets. The application includes a browser application, and the browser application receives the transaction information from a website. The digital asset holder is a first digital asset holder, the transaction information including a shared address of a second digital asset holder, the second digital asset holder being associated with the requesting party. The transaction request is configured to cause the transaction amount of the user's digital assets to be associated with the second digital asset holder on the blockchain network.

According to an aspect, a system includes at least one processor, and a non-transitory computer-readable medium storing executable instructions that when executed by the at least one processor cause the at least one processor to receive transaction information for completing a blockchain transaction with a requesting party, the transaction information specifying a first type of digital assets, a transaction amount, and a shared address of a first digital asset holder associated with the requesting party, provide an interface on a computing device for receiving selection of a second type of digital assets associated with a second digital asset holder associated with a user of the computing device, transmit a conversion request to a digital asset exchange, the conversion request configured to cause the digital asset exchange to convert the transaction amount of a user's digital assets in the second digital asset holder from the second type of digital assets to the first type of digital assets, and transmit a transaction request to a blockchain network to associate the transaction amount with the first digital asset holder.

According to some aspects, the system may include one or more of the following features (or any combination thereof). The executable instructions include instructions that when executed by the at least one processor cause the at least one processor to obtain an asset list associated with the second digital asset holder, the asset list identifying one or more types of digital assets associated with the second digital asset holder, including the second type of digital assets. The first digital asset holder is a third-party digital asset holder, where the executable instructions include instructions that when executed by the at least one processor cause the at least one processor to transmit, via an application programming interface (API), an authentication request to the third-party digital asset holder, the authentication request being a request to authenticate the transaction request using a private key stored by the third-party digital asset holder. The executable instructions include instructions that when executed by the at least one processor cause the at least one processor to receive exchange rate information from the digital asset exchange, where the interface displays the exchange rate information, the exchange rate information including information that indicates an exchange rate for converting, using the digital asset exchange, the transaction amount of the user's digital assets from the second type of digital assets to the first type of digital assets. The executable instructions include instructions that when executed by the at least one processor cause the at least one processor to select the digital asset exchange from a plurality of digital asset exchanges based on exchange rate information associated with a respective digital asset exchange of the plurality of digital asset exchanges. The digital asset exchange is a first digital asset exchange, wherein the executable instructions include instructions that when executed by the at least one processor cause the at least one processor to determine to use the first digital asset exchange and a second digital asset exchange to convert the transaction amount of the user's digital assets from the second type of digital assets to the first type of digital assets, transmit a first conversion request to the first digital asset exchange, the first conversion request configured to cause the first digital asset exchange to convert the transaction amount of the user's digital assets from the second type of digital assets to a third type of digital assets, and transmit a second conversion request to the second digital asset exchange, the second conversion request configured to cause the first digital asset exchange to convert the transaction amount of the user's digital assets from the third type of digital assets to the first type of digital assets.

According to an aspect, a non-transitory computer-readable medium storing executable instructions that when executed by at least one processor cause the at least one processor to operations, where the operations include receiving, by a browser application executable by a computing device, transaction information for completing a blockchain transaction with a requesting party, the transaction information specifying a first type of digital assets and a transaction amount, providing, by the browser application, an interface on the computing device for receiving selection of a second type of digital assets associated with a digital asset holder, transmitting, by the browser application, a conversion request to a digital asset exchange, the conversion request configured to cause the digital asset exchange to convert the transaction amount of a user's digital assets in the digital asset holder from the second type of digital assets to the first type of digital assets, and transmitting, by the browser application, a transaction request to a blockchain network to initiate completion of the blockchain transaction.

According to some aspects, the operations may include one or more of the following features (or any combination thereof). The operations may include obtaining an asset list associated with the digital asset holder, where the interface displays the asset list, the asset list identifying one or more types of digital assets associated with the digital asset holder, including the second type of digital assets. The operations may include receiving exchange rate information from the digital asset exchange, where the interface displays the exchange rate information, the exchange rate information including information that indicates an exchange rate for converting, using the digital asset exchange, the transaction amount of the user's digital assets from the second type of digital assets to the first type of digital assets. The operations may include selecting the digital asset exchange from a plurality of digital asset exchanges based on exchange rate information associated with a respective digital asset exchange of the plurality of digital asset exchanges. The digital asset exchange is a first digital asset exchange, where the operations may include determining to use the first digital asset exchange and a second digital asset exchange to convert the transaction amount of the user's digital assets from the second type of digital assets to the first type of digital assets, transmitting a first conversion request to the first digital asset exchange, the first conversion request configured to cause the first digital asset exchange to convert the transaction amount of the user's digital assets from the second type of digital assets to a third type of digital assets, and transmitting a second conversion request to the second digital asset exchange, the second conversion request configured to cause the first digital asset exchange to convert the transaction amount of the user's digital assets from the third type of digital assets to the first type of digital assets.

FIGS. 24A through 24E illustrate a system 2400 for registering a digital asset holder 2402 as a default digital asset holder 2402-1 and/or using the default digital asset holder 2402-1 to facilitate a transaction 2412 on a blockchain network 2410. The system 2400 may be an example of any of the systems described with reference to FIGS. 1 through 23 and may include any of the details discussed with reference to those systems.

The system 2400 provides a technical solution of enabling a blockchain transaction (e.g., the transaction 2412) to be initiated from an application 2406 other than a digital asset holder 2402. On some computing environments (e.g., a mobile environment), blockchain transactions can only be processed using a digital asset holder, e.g., a native application installed on a user's device. For example, in some mobile environments, extensions to browser applications may be limited or not allowed, and, therefore, digital asset holders implemented as extensions cannot process blockchain transactions. According to some conventional approaches, a user may have to launch and use the digital asset holder on the user's device to initiate a blockchain transaction. However, according to the techniques discussed herein, a transaction 2412 can be initiated using an application 2406 other than a digital asset holder 2402, where, in some examples, the application 2406 can directly communicate with the default digital asset holder 2402-1 to authenticate and commit a transaction 2412 to the blockchain network 2410.

The system 2400 includes a computing device 2426 having an operating system 2432 configured to execute applications including the digital asset holder(s) 2402 and the application 2406. The operating system 2432 is a system software that manages computer hardware, software resources, and provides common services for computing programs. In some examples, the operating system 2432 is an operating system for a smaller display 2434 such as a tablet or a smartphone (e.g., sometimes referred to as a mobile operating system). As further described below, the operating system 2432 may register a particular digital asset holder 2402 as a default digital asset holder 2402-1 and enable the transfer of information (e.g., intent request 2481, intent response 2483) between an application 2406 and the default digital asset holder 2402-1 to add a transaction 2412 to the blockchain network 2410.

Identification of a particular digital asset holder 2402 as the default digital asset holder 2402-1 may be stored as a setting (e.g., an operating system (OS) setting) in a setting storage 2455 of the computing device 2426. The setting storage 2455 may be a memory device associated with the operating system 2432. The setting storage 2455 may store other OS settings. One or more digital asset holders 2402 may be downloaded and installed on the operating system 2432 of the computing device 2426. In some examples, the computing device 2426 is a mobile computing device (e.g., a smartphone, tablet, etc.) and the digital asset holders 2402 are native applications (e.g., iOS applications, Android applications, Linux applications, etc.) that can be downloaded from a digital media store and installed on the operating system 2432.

According to the techniques discussed herein, a user may register one of the digital asset holders 2402 as a default digital asset holder 2402-1, and the operating system 2432 may enable the transfer of information (e.g., intent request 2481, intent response 2483) between the default digital asset holder 2402-1 and an application 2406 (other than a digital asset holder 2402) to enable a transaction 2412 to be added to the blockchain network 2410. For example, using the techniques discussed herein, the application 2406 (other than a digital asset holder 2402) can access wallet identities and create transactions 2412 by directly communicating with the default digital asset holder 2402-1. In some examples, the default digital asset holder 2402-1 is automatically used for subsequent transactions 2412. In some examples, the default digital asset holder 2402-1 is used for subsequent transactions 2412 that are initiated from the application 2406, web content 2408, and/or any other application on the computing device 2426. In some examples, more than one default digital asset holder 2402-1 can be selected for future transactions 2412 (e.g., use one particular default digital asset holder 2402-1 for a transaction 2412 originating from a first application, another default digital asset holder 2402-1 for a transaction 2412 originating from a second application, etc.).

A user may use the application 2406 to initiate a transaction 2412, and, in response to one of the digital asset holders 2402 being registered as the default digital asset holder 2402-1, the application 2406 and the default digital asset holder 2402-1 may communicate (e.g., directly communicate) with each other via intent requests 2481 and/or intent responses 2483.

An intent request 2481 may be a messaging object that is used to request an action from another application (e.g., the default digital asset holder 2402-1). In some examples, the intent request 2481 may specify any activity that can be executed by a digital asset holder 2402. In some examples, the intent request 2481 is a request for an asset list of digital assets associated with the default digital asset holder 2402-1 (e.g., the asset list 244 of FIGS. 2A through 2D). The intent request 2481 may indicate an activity to be performed by the default digital asset holder 2402-1 and information that is required by the digital asset holder 2402-1 to execute the activity. In some examples, the intent request 2481 is a transaction creation request to create a transaction 2412 to be committed to the blockchain network 2410. In some examples, the intent request 2481 may include transactional details such as the type of digital asset, the amount, the sender, the receiver, and/or time information, etc. In some examples, after the activity is completed, the default digital asset holder 2402-1 may transmit an intent response 2483 to the application 2406, where the intent response 2483 includes the result of the activity executed by the default digital asset holder 2402-1.

The intent request 2481 may be a request to obtain an asset list. In response to receiving the intent request 2481, the default digital asset holder 2402-1 may generate the asset list and transmit an intent response 2483 to the application 2406, where the intent response 2483 includes the asset list. In some examples, the application 2406 may display the asset list.

The intent request 2481 may be a request to create a transaction 2412. In response to receiving the intent request 2481, the default digital asset holder 2402-1 may authenticate the transaction 2412 using the private key 2404. Also, the default digital asset holder 2402-1 may communicate with the blockchain network 2410 to add the transaction 2412 to the blockchain network 2410. In some examples, the default digital asset holder 2402-1 may transmit an intent response 2483, where the intent response 2483 includes the result of the transaction 2412 being added to the blockchain network 2410. In some examples, the default digital asset holder 2402-1 may transmit the authenticated transaction 2412 to the application 2406 via an intent response 2483, and the application 2406 communicates with the blockchain network 2410 to add the transaction 2412 to the blockchain network 2410.

The operating system 2432 may define a protocol that permits the transfer of the intent request 2481 and the intent response 2483 between the application 2406 and the default digital asset holder 2402-1. In some examples, the protocol is an inter-process communication (IPC) communication link. An IPC communication link may be a method that allows processes (e.g., applications) to send each other messages and data. The IPC communication link may be defined at the operating system level. In some examples, the application 2406 and/or the default digital asset holder 2402-1 may define one or more APIs to enable the application 2406 and the default digital asset holder 2402-1 to communicate with each other.

In some examples, the application 2406 is a native application other than a digital asset holder 2402 (e.g., the application 2406 does not store a private key 2404 for authenticating transactions 2412 to be added to a blockchain network 2410). In some examples, the application 2406 is a non-browser application. In some examples, the application 2406 is a browser application. In some examples, the application 2406 and the default digital asset holder 2402-1 can communicate with each other to add a transaction 2412 to the blockchain network 2410 without using a browser application as an intermediary (e.g., without any browser involvement).

The operating system 2432 includes or defines a registration engine 2467 configured to register a digital asset holder 2402 as a default digital asset holder 2402-1. The registration engine 2467 may be a component of the operating system 2432. The registration engine 2467 may be a portion of the operating system 2432 configured to manage the registration of a digital asset holder 2402 as a default digital asset holder 2402-1 as well as other functions discussed with reference to the registration engine 2467. In some examples, registration of a digital asset holder 2402 as the default digital asset holder 2402-1 includes updating a setting (e.g., an OS setting) in the setting storage 2455, where the setting identifies a particular digital asset holder 2402 as the default digital asset holder 2402-1.

In some examples, the registration engine 2467 may detect a blockchain transaction request 2411 generated on the computing device 2426, and, in response to the blockchain transaction request 2411, the registration engine 2467 may determine whether a digital asset holder 2402 is registered as a default digital asset holder 2402-1.

In some examples, the blockchain transaction request 2411 is an intent request 2481 generated by the application 2406. For example, the application 2406 displays application content that includes a control (e.g., a UI element, selectable item, etc.) to enable a user to initiate a transaction 2412. In response to the user selection, the application 2406 may generate an intent request 2481, which can be detected by the registration engine 2467. In some examples, the registration engine 2467 may monitor IPC communication link(s), and, if an intent request 2481 is directed to a digital asset holder 2402, the registration engine 2467 may intercept the intent request 2481 to determine if a default digital asset holder 2402-1 has been identified in the setting storage 2455. If a digital asset holder 2402 is registered as the default digital asset holder 2402, the operating system 2432 may transfer the intent request 2481 to the default digital asset holder 2402-1 to execute the specified action(s).

In some examples, the blockchain transaction request 2411 is a request that is generated in response to an interaction with web content 2408. For example, the registration engine 2467 may detect the blockchain transaction request 2411 from web content 2408 displayed on the display 2434 of the computing device 2426. In some examples, the application 2406 displays the web content 2408. The web content 2408 may be displayed via a web view controller of the application 2406. In some examples, the web content 2408 is displayed by a browser tab. In some examples, the user, while using the application 2406, may select a link to web content 2408, which can be rendered and displayed by a browser tab associated with a browser application.

The web content 2408 may include one or more objects 2436 that allows the creation of a transaction 2412 on the blockchain network 2410. When an object 2436 is invoked, the registration engine 2467 may intercept the blockchain transaction request 2411 to determine if a default digital asset holder 2402-1 has been identified in the setting storage 2455. In some examples, the object 2436 is a blockchain computer object. In some examples, the object 2436 is a JavaScript exposed object. In some examples, the object 2436 is an API exposed object. If the blockchain network 2410 is Ethereum, the object 2436 is an Ethereum object (e.g., window.etherum) to create transactions on the Ethereum blockchains. In some examples, the object 2436 is specific to the type of blockchain network. In some examples, the web content 2408 may include a first object (e.g., object 2436) for creating transactions on a first blockchain network and a second object (e.g., object 2436) for creating transactions on a second blockchain network, where the second blockchain network is different from the first blockchain network. In some examples, the first and second objects, when selected (e.g., invoked, initiated) refer to different callbacks or requests related to a particular transaction 2412.

To determine whether the digital asset holder 2402 is registered as the default digital asset holder 2402-1, the registration engine 2467 may determine whether a particular digital asset holder 2402 is identified as a default digital asset holder 2402-1 in the setting storage 2455. The setting storage 2455 may store information (e.g., the name of crypto-wallet, application identifier, etc.) about the digital asset holder 2402 that is registered as the default digital asset holder 2402-1. In some examples, the setting storage 2455 may identify any digital asset holder 2402 installed on the operating system 2432 and the setting storage 2455 may include information (e.g., a flag, indicator, etc.) that identifies one of the digital asset holders 2402 as the default digital asset holder 2402-1. In some examples, the registration engine 2467 may query the setting storage 2455 to determine whether a digital asset holder 2402 is registered as a default digital asset holder 2402-1.

Figure 24A:
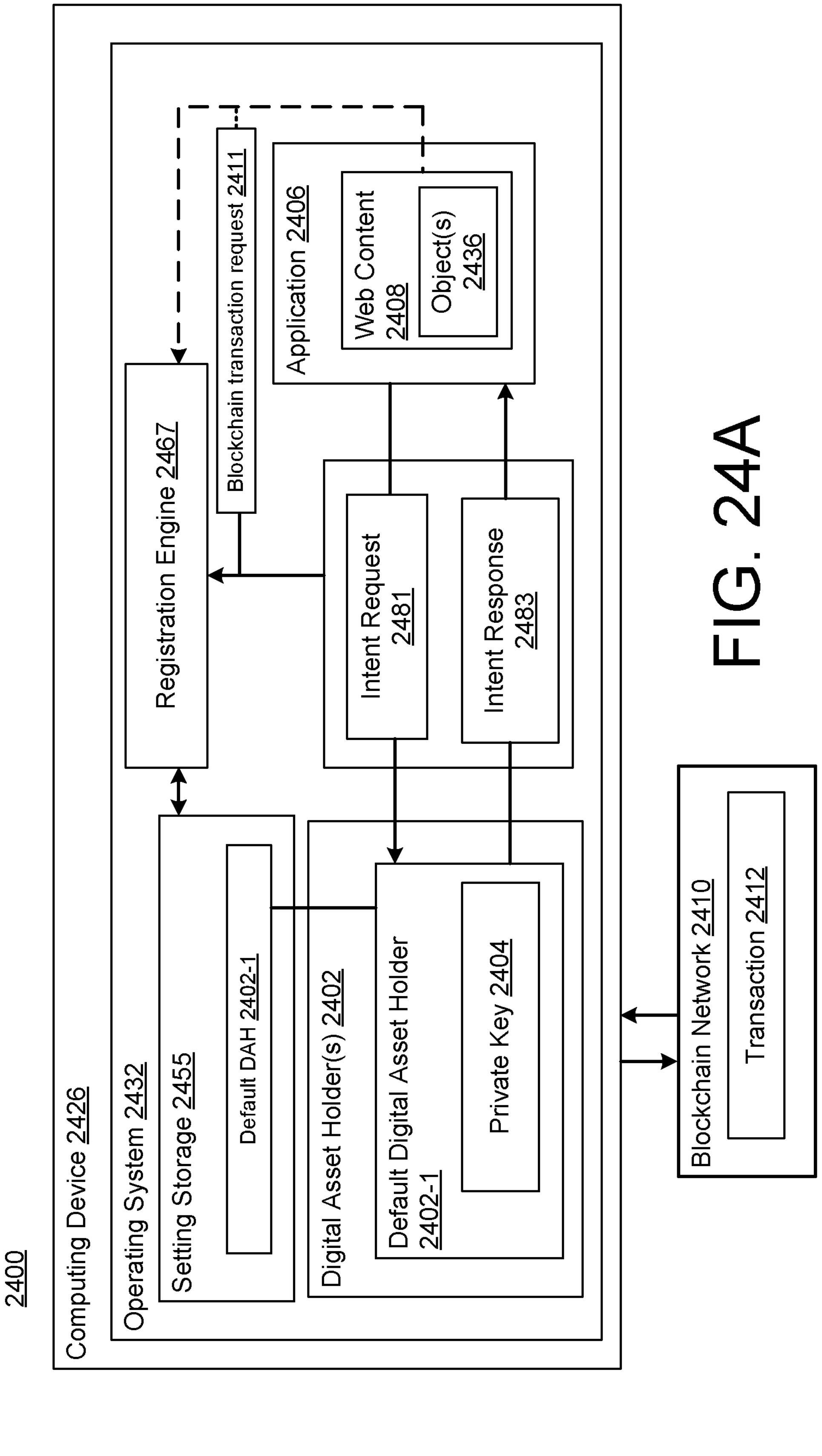
FIG. 24A illustrates a system for registering a digital asset holder as a default digital asset holder and/or using the default digital asset holder to facilitate a transaction on a blockchain network according to an aspect.
Figure 24B:
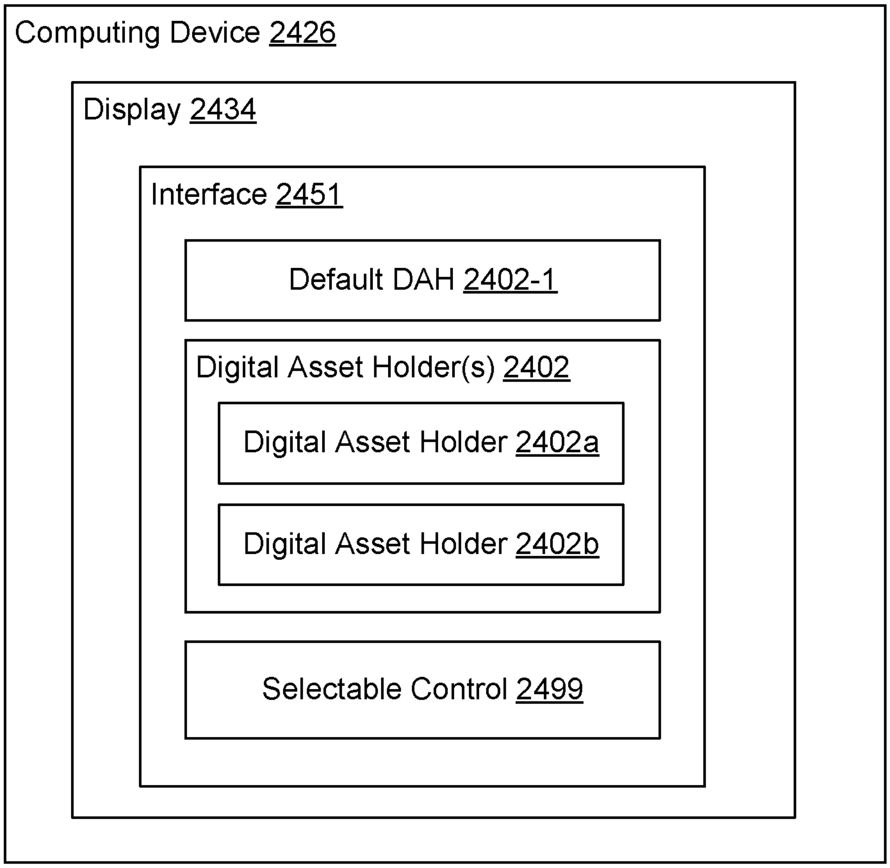
FIG. 24B illustrates an interface rendered by the system for receiving a user selection of a default digital asset holder according to an aspect.

Referring to FIG. 24B, if a digital asset holder 2402 is not registered as the default digital asset holder 2402-1, the registration engine 2467 may render an interface 2451 on the display 2434 of the computing device 2426. The interface 2451 may be configured to receive a user selection of a digital asset holder 2402 as the default digital asset holder 2402-1. In some examples, the registration engine 2467 may render the interface 2451 when the registration engine 2467 determines that at least one digital asset holder 2402 is installed on the computing device 2426 but a default digital asset holder 2402-1 has not been identified in the setting storage 2455. In some examples, the registration engine 2467 may render the interface 2451 when the registration engine 2467 determines that two or more digital asset holders 2402 are installed on the computing device 2426 but a default digital asset holder 2402-1 has not been identified in the setting storage 2455.

The interface 2451 may display information that identifies one or more digital asset holders 2402 that are associated with the computing device 2426 (e.g., installed on the computing device 2426). As shown in FIG. 24B, the interface 2451 may display information that identifies a digital asset holder 2402*a* and a digital asset holder 2402*b*. The digital asset holder 2402*a* and the digital asset holder 2402*b* may be separate native applications that are installed on the computing device 2426. The interface 2451 may permit the user to select one of the digital asset holder 2402*a* or the digital asset holder 2402*b* as the default digital asset holder 2402-1.

In some examples, if only one digital asset holder 2402 is installed on the computing device 2426 but a default digital asset holder 2402-1 has not been identified in the setting storage 2455, the registration engine 2467 may automatically select the sole digital asset holder 2402 as the default digital asset holder 2402-1, where the registration engine 2467 does not render the interface 2451. Rather, the operating system 2432 may transfer an intent request 2481 to the default digital asset holder 2402-1 to initiate an action on the default digital asset holder 2402-1. The action may be any action that could be executed by a digital asset holder 2402. In some examples, the action includes generating and returning an asset list (e.g., the asset list 244 of FIGS. 2A through 2D) to the application 2406. In some examples, the action includes authenticating the transaction 2412 using the private key 2404 and returning the authenticated transaction 2412 to the application 2406, where the application 2406 communicates with the blockchain network 2410 to add the transaction 2412 to the blockchain network 2410. In some examples, the action includes authenticating the transaction 2412, communicating with the blockchain network 2410 to add the transaction 2412 to the blockchain network 2410, and returning the results of the transaction 2412 to the application 2406.

In response to receiving the user selection of the default digital asset holder 2402-1 via the interface 2451, the registration engine 2467 may update the setting storage 2455 to indicate the user's selection as the default digital asset holder 2402-1. For example, if the user selects the digital asset holder 2402*a* on the interface 2451, the registration engine 2467 updates the setting storage 2455 to indicate that the default digital asset holder 2402-1 is the digital asset holder 2402*a*. In some examples, the default digital asset holder 2402-1 identified in the setting storage 2455 is used for future (subsequent) transactions 2412 that are initiated from the application 2406, the web content 2408, and/or any other application executable by the operating system 2432. In some examples, the default digital asset holder 2402-1 is used for the current transaction 2412 but not subsequent transactions 2412. In some examples, multiple default digital asset holders 2402-1 can be identified, e.g., one default digital asset holder 2402-1 for transactions 2412 originating from the application 2406 and another default digital asset holder 2402-1 for transactions 2412 originating from another application 2406, and, in some examples, yet another default digital asset holder 2402-1 for transactions originating from web content 2408.

In some examples, the selected default digital asset holder 2402-1 is used for the current transaction 2412, where the interface 2451 is rendered again when a subsequent transaction 2412 is initiated. In some examples, the selected default digital asset holder 2402-1 is used for the current transaction and future (subsequent) transactions, where the interface 2451 is not rendered again when a subsequent transaction 2412 is initiated (e.g., from the application 2406, the web content 2408, and/or any other application of the computing device 2426). In some examples, the interface 2451 includes a selectable control 2499 that enables the user to select whether the default digital asset holder 2402-1 is used for the current transaction 2412 (e.g., "time time") or the current transaction and future transactions (e.g., "always"). In other words, the selectable control 2499 may permit the user to select a particular digital asset holder 2402 as the default digital asset holder 2402-1 for a one-time transaction (e.g., temporary) or all transactions (e.g., permanent). In some examples, if the temporary option is selected, the setting storage 2455 is not updated to identify the default digital asset holder 2402-1. In some examples, if the temporary option is selected, the setting storage 2455 is updated to identify the default digital asset holder 2402-1 and the setting in the setting storage 2455 is reset to a state that does not indicate a default digital asset holder 2402-1 after the transaction 2412 is completed. If the permanent option is selected, the setting in the setting storage 2455 is updated to identify the selected digital asset holder 2402.

Figure 24C:
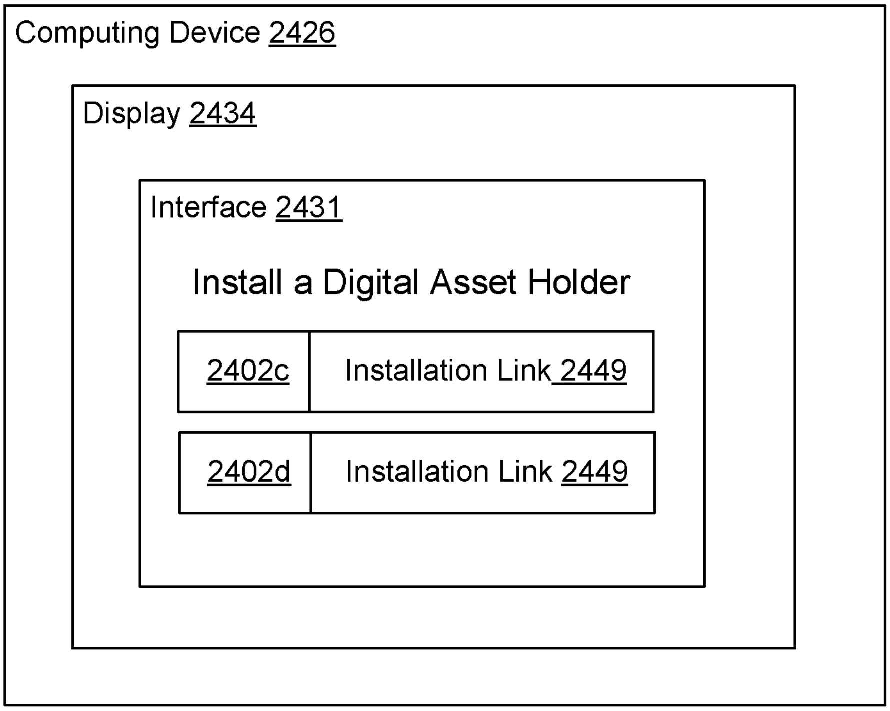
FIG. 24C illustrates an interface rendered by the system for prompting a user to install one or more digital asset holders according to an aspect.

Referring to FIG. 24C, if a digital asset holder 2402 is not registered as the default digital asset holder 2402-1, the registration engine 2467 may render an interface 2431 on the display 2434 of the computing device 2426. In some examples, the registration engine 2467 renders the interface 2431 when a digital asset holder 2402 is not registered as the default digital asset holder 2402-1 and no digital asset holders 2402 are installed on the operating system 2432. The interface 2431 may include information to prompt the user to install a particular digital asset holder 2402. The interface 2431 may identify one or more digital asset holders 2402 for potential installation. The interface 2431 may identify a digital asset holder 2402*c* and a digital asset holder 2402*d*. The digital asset holder 2402*c* and the digital asset holder 2402*d* are native applications that are not installed on the computing device 2426.

In some examples, the interface 2431 may include an installation link 2449, which, when selected, causes initiation of a particular digital asset holder 2402 to be installed on the computing device 2426. In some examples, when the installation link 2449 is selected, a digital media store application (e.g., play store, Apple Store, etc.) is launched and an installation page corresponding to the digital asset holder 2402 is displayed, where the user can download and install the digital asset holder 2402 from the installation page. As shown in FIG. 24C, the interface 2431 may include an installation link 2449 associated with the digital asset holder 2402*c*, which, when selected, facilitates the installation of the digital asset holder 2402*c*. The interface 2431 may include an installation link 2449 associated with the digital asset holder 2402*d*, which, when selected, facilitates the installation of the digital asset holder 2402*d*.

As indicated above, the registration engine 2467 may detect a blockchain transaction request 2411 generated on the computing device 2426, and, in response to the blockchain transaction request 2411, the registration engine 2467 may determine whether a digital asset holder 2402 is registered as a default digital asset holder 2402-1. If the digital asset holder 2402 is not registered as the default digital asset holder 2402-1, the registration engine 2467 may cause the rendering of an interface (e.g., the interface 2451, the interface 2431) to allow the user to register a digital asset holder 2402 as the default digital asset holder 2402-1.

Figure 24D:
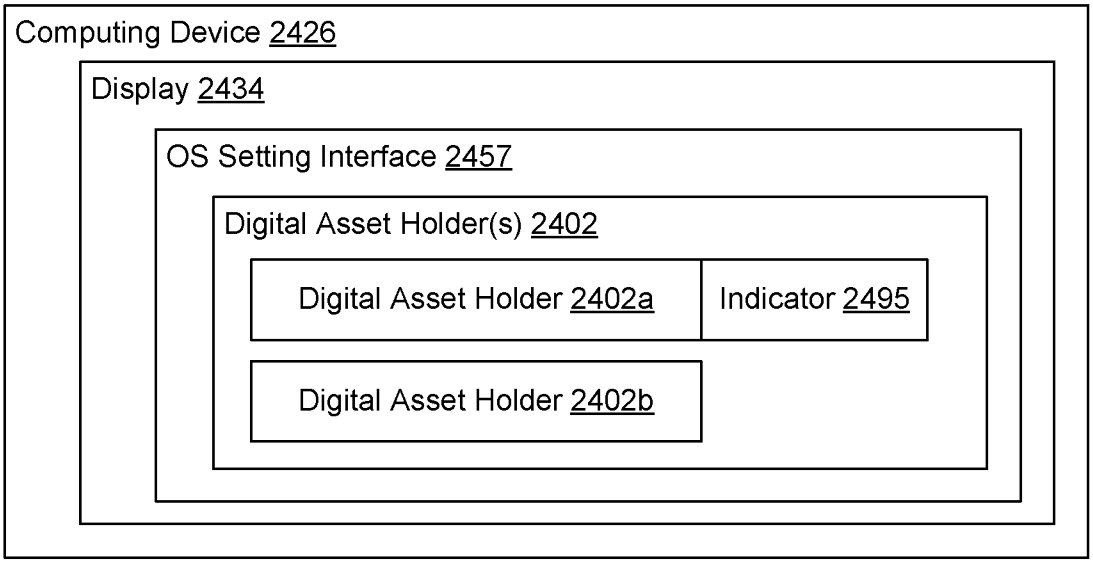
FIG. 24D illustrates a setting interface rendered by the system for indicating and/or receiving selection of a default digital asset holder according to an aspect.
Figure 24E:
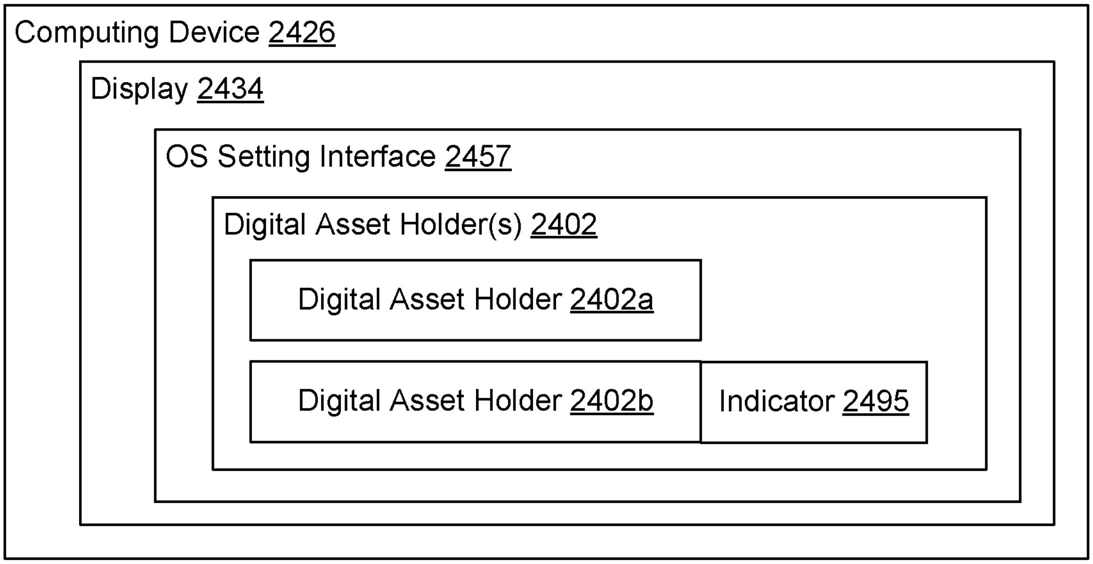
FIG. 24E illustrates the setting interface according to another aspect.

In some examples, referring to FIGS. 24 through 24E, a user may use the computing device 2426 to render an OS setting interface 2457 on the display 2434 of the computing device 2426 (as shown in FIGS. 24D and 24E) and the user can select a particular digital asset holder 2402, from a list of available digital asset holders 2402 (e.g., digital asset holder 2402*a*, digital asset holder 2402*b*), to use as the default digital asset holder 2402-1. The list may include any digital asset holders 2402 that are installed on the operating system 2432 of the computing device 2426. As shown in FIG. 24D, the user has selected digital asset holder 2402*a* as the default digital asset holder 2402-1, where the OS setting interface 2457 displays an indicator 2495 that visually identifies the digital asset holder 2402*a* as the default digital asset holder 2402-1. The indicator 2495 may be a computer icon, a symbol, and/or a particular text appearance (font color, highlighting, italics, etc. or some combination of these), etc. In some examples, referring to FIG. 24E, the operating system 2432 (e.g., the registration engine 2467) may receive, via the OS setting interface 2457, a change to the default digital asset holder 2402-1 that switches the default digital asset holder 2402-1 from the digital asset holder 2402*a* to the digital asset holder 2402*b*. The registration engine 2467 may update the setting in the setting storage 2455 and update the indicator 2495 to visually identify the digital asset holder 2402*b* as the default digital asset holder 2402-1.

Figure 25:
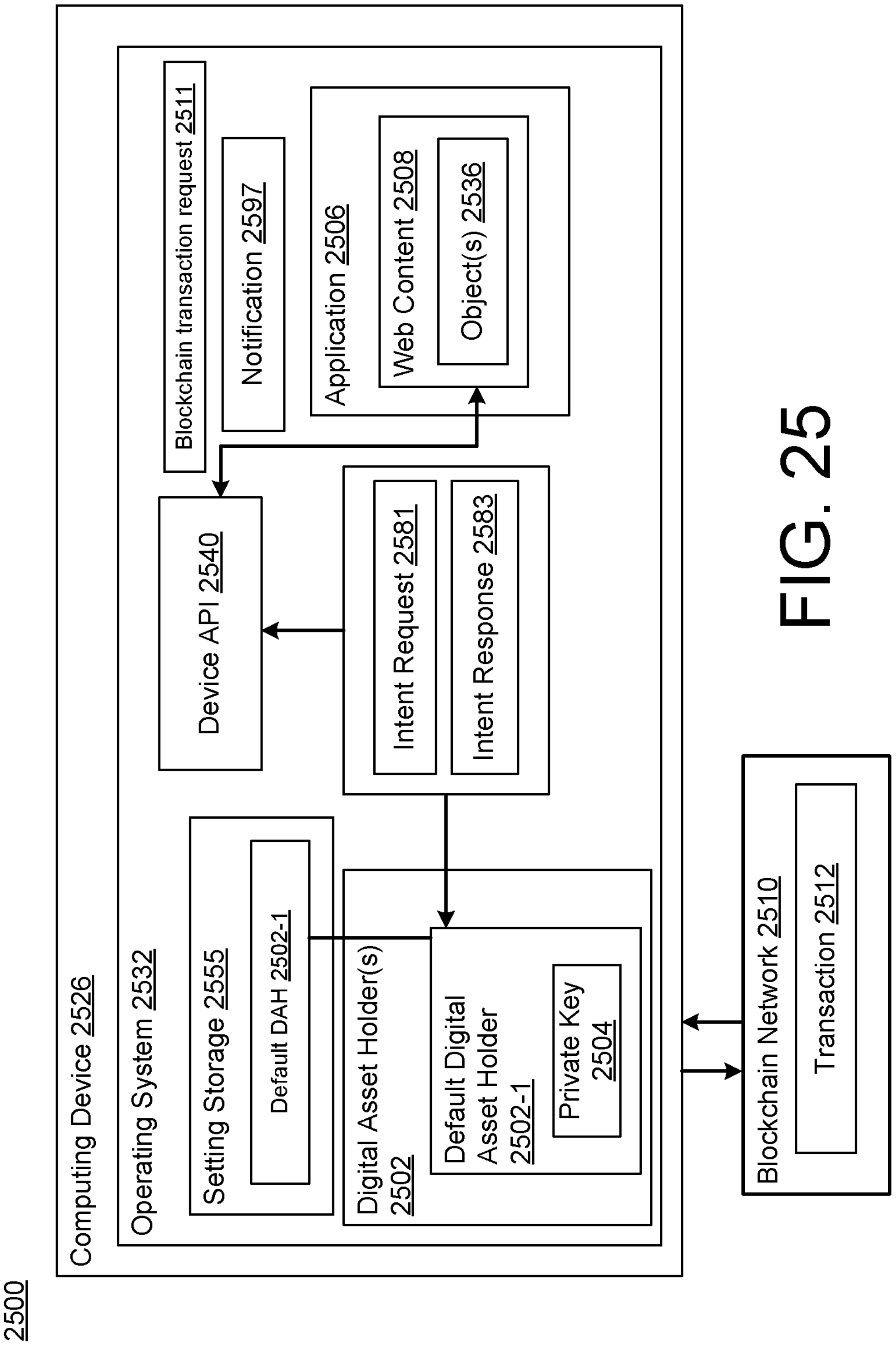
FIG. 25 illustrates a system for registering a digital asset holder as a default digital asset holder and/or using the default digital asset holder to facilitate a transaction on a blockchain network according to another aspect.

FIG. 25 illustrates a system 2500 for registering a digital asset holder 2502 as a default digital asset holder 2502-1 and using the default digital asset holder 2502-1 to facilitate a transaction 2512 on a blockchain network 2510. The system 2500 may be an example of the system 2400 of FIGS. 24A through 24E and may include any of the details discussed with reference to those figures. For example, the system 2500 may register a default digital asset holder 2502-1 according to any of the techniques described with reference to FIGS. 24A through 25E. Also, the system 2500 may be an example of any of the systems described with reference to FIGS. 1 through 23 and may include any of the details discussed with reference to those systems.

The system 2500 includes a computing device 2526 having an operating system 2532. The operating system 2532 defines a device application programming interface (API) 2540 that is configured to exchange information (e.g., intent request 2581, intent response 2583) between the default digital asset holder 2502-1 and web content 2508 (and, in some examples, application 2506). The device API 2540 may be an API defined at the operating system level of the computing device 2526. In the system 2400 of FIGS. 24A through 24E, the application 2406 generates the intent request 2481 (and receives the intent response 2583). In other words, the application 2406 and the default digital asset holder 2402-1 directly communicate with each other. In the system 2500 of FIG. 25, the device API 2540 detects the generation of a transaction 2512 from web content 2508 and directly communicates with the default digital asset holder 2502-1. For example, the device API 2540 generates the intent request 2581 (and receives the intent response 2583) and the device API 2540 notifies the website of the web content 2508 and/or the application 2506 of the result via notification(s) 2597. The system 2500 may have the technical benefit of facilitating transactions 2512 from web content 2508 on the blockchain network 2510 with minimal (or no) browser involvement. For example, although a browser application may be used to render the web content 2508 (in some examples), the browser application is not used as an intermediary to process the transaction 2512. Rather, the device API 2540 is used as an intermediary between the web content 2508 and the default digital asset holder 2502-1.

In further detail, a user may use the application 2506 to render web content 2508. The application 2506 may be a native application installed on the operating system 2532, and the application 2506 may display a link to web content 2508. In some examples, the application 2506 is a non-browser application. In some examples, the application 2506 is a browser application. The user may select the link to the web content 2508, which causes the web content to be displayed (e.g., a web view controller of the application 2506, by a browser tab of a browser application, by a custom browser tab of the browser application, etc.).

The web content 2508 may include one or more objects 2536. In some examples, the object 2536 is a blockchain computer object. In some examples, the object 2536 is a JavaScript exposed object. In some examples, the object 2536 is an API exposed object. If the blockchain network 2510 is Ethereum, the object 2536 is an Ethereum object (e.g., window.etherum) to create transactions on the Ethereum blockchains. In some examples, the object 2536 is specific to the type of blockchain network. In some examples, the web content 2508 may include a first object (e.g., object 2536) for creating transactions on a first blockchain network and a second object (e.g., object 2536) for creating transactions on a second blockchain network, where the second blockchain network is different from the first blockchain network. In some examples, the first and second objects, when selected (e.g., invoked, initiated) refer to different callbacks or requests related to a particular transaction 2512.

A user may select a particular control on the web content 2508, which causes the object 2536 to be invoked. When the object 2536 is invoked (e.g., selected, initiated, etc.), the device API 2540 detects a blockchain transaction request 2511. In some examples, when the object 2536 is invoked, a method is called, and the called method may be considered the blockchain transaction request 2511. In response to the blockchain transaction request 2511, the device API 2540 generates an intent request 2581 that is transmitted to the default digital asset holder 2502-1.

An intent request 2581 may be a messaging object that is used to request an action from another application (e.g., the default digital asset holder 2502-1). As indicated above, the device API 2540 generates the intent request 2581. In some examples, the intent request 2581 may specify any activity that can be executed by a digital asset holder 2502. In some examples, the intent request 2581 is a request for an asset list of digital assets associated with the default digital asset holder 2502-1 (e.g., the asset list 244 of FIGS. 2A through 2D). The intent request 2581 may indicate an activity to be performed by the default digital asset holder 2502-1 and information that is required by the digital asset holder 2502-1 to execute the activity. In some examples, after the activity is completed, the default digital asset holder 2502-1 may transmit an intent response 2583 to the device API 2540, where the intent response 2583 includes the result of the activity executed by the default digital asset holder 2502-1. The device API 2540 is configured to transmit a notification 2597 to the website of the web content 2508 and/or the application 2506, where the notification 2597 may include the information from the intent response 2583.

The intent request 2581 may be a request to obtain an asset list. In response to receiving the intent request 2581, the default digital asset holder 2502-1 may generate the asset list and transmit an intent response 2583 to the application 2506, where the intent response 2583 includes the asset list. In some examples, the device API 2540 may transmit a notification 2597 to the website of the web content 2508 and/or the application 2506, where the notification 2597 includes the asset list, which is displayed on the device's display.

The intent request 2581 may be a request to create a transaction 2512. In response to receiving the intent request 2581, the default digital asset holder 2502-1 may authenticate the transaction 2512 using the private key 2504. Also, the default digital asset holder 2502-1 may communicate with the blockchain network 2510 to add the transaction 2512 to the blockchain network 2510. In some examples, the default digital asset holder 2502-1 may transmit an intent response 2583, where the intent response 2583 includes the result of the transaction 2512 being added to the blockchain network 2510. In response to the intent response 2583, the device API 2540 may transmit a notification 2597 to the website of the web content 2508 and/or the application 2506, where the notification 2597 includes the result of the transaction 2512 being added to the blockchain network 2510. In some examples, the default digital asset holder 2502-1 may transmit the authenticated transaction 2512 to the device API 2540 via an intent response 2583, and the device API 2540 communicates with the blockchain network 2510 to add the transaction 2512 to the blockchain network 2510. Then, the device API 2540 may transmit a notification 2597 to the website of the web content 2508 and/or the application 2506, where the notification 2597 includes the result of the transaction 2512 being added to the blockchain network 2510.

The operating system 2532 may define a protocol that permits the transfer of the intent request 2581 and the intent response 2583 between the device API 2540 and the default digital asset holder 2502-1. In some examples, the protocol is an inter-process communication (IPC) communication link. An IPC communication link may be a method that allows processes (e.g., applications) to send each other messages and data. The IPC communication link may be defined at the operating system level. In some examples, the default digital asset holder 2502-1 may define one or more APIs to enable the device API 2540 and the default digital asset holder 2502-1 to communicate with each other.

In some examples, the application 2506 is a native application other than a digital asset holder 2502 (e.g., the application 2506 does not store a private key 2504 for authenticating transactions 2512 to be added to a blockchain network 2510). In some examples, the application 2506 is a non-browser application. In some examples, the application 2506 is a browser application. In some examples, the web content 2508 and/or the application 2506 and the default digital asset holder 2502-1 can communicate with each other via the device API 2540 to add a transaction 2512 to the blockchain network 2510 without using a browser application as an intermediary (e.g., without any browser involvement).

Also, similar to the system 2400 of FIGS. 24A through 24E, identification of a particular digital asset holder 2502 as the default digital asset holder 2502-1 may be stored as a setting (e.g., an operating system (OS) setting) in a setting storage 2555 of the computing device 2526. The setting storage 2555 may be a memory device associated with the operating system 2532. The setting storage 2555 may store other OS settings. One or more digital asset holders 2502 may be downloaded and installed on the operating system 2532 of the computing device 2526. In some examples, the computing device 2526 is a mobile computing device (e.g., a smartphone, tablet, etc.) and the digital asset holders 2502 are native applications (e.g., iOS applications, Android applications, Linux applications, etc.) that can be downloaded from a digital media store and installed on the operating system 2532.

According to the techniques discussed herein, a user may register one of the digital asset holders 2502 as a default digital asset holder 2502-1, and the operating system 2532 may enable the transfer of information (e.g., intent request 2581, intent response 2583) between the default digital asset holder 2502-1 and the device API 2540 for a transaction 2512 being initiated on web content 2508 to enable the transaction 2512 to be added to the blockchain network 2510.

A default digital asset holder 2502-1 may be registered according to any of the techniques described in the system 2400 of FIGS. 24A through 24E. For example, the operating system 2532 may execute any of the functionalities described with reference to the registration engine 2467, the operating system 2432 and/or the computing device 2426 of FIGS. 24A through 24E. For example, the operating system 2532 is configured to register a digital asset holder 2502 as a default digital asset holder 2502-1. In some examples, registration of a digital asset holder 2502 as the default digital asset holder 2502-1 includes updating a setting (e.g., an OS setting) in the setting storage 2555, where the setting identifies a particular digital asset holder 2502 as the default digital asset holder 2502-1. The operating system 2532 may detect the blockchain transaction request 2511, and, in response to the detection of the blockchain transaction request 2511, may query the setting storage 2555 and render the interface 2451 of FIG. 24B or the interface 2431 of FIG. 24C. In some examples, the operating system 2532 may render the OS setting interface 2457 of FIGS. 24D and 24E to select or change the default digital asset holder 2502-1.

Figure 26:
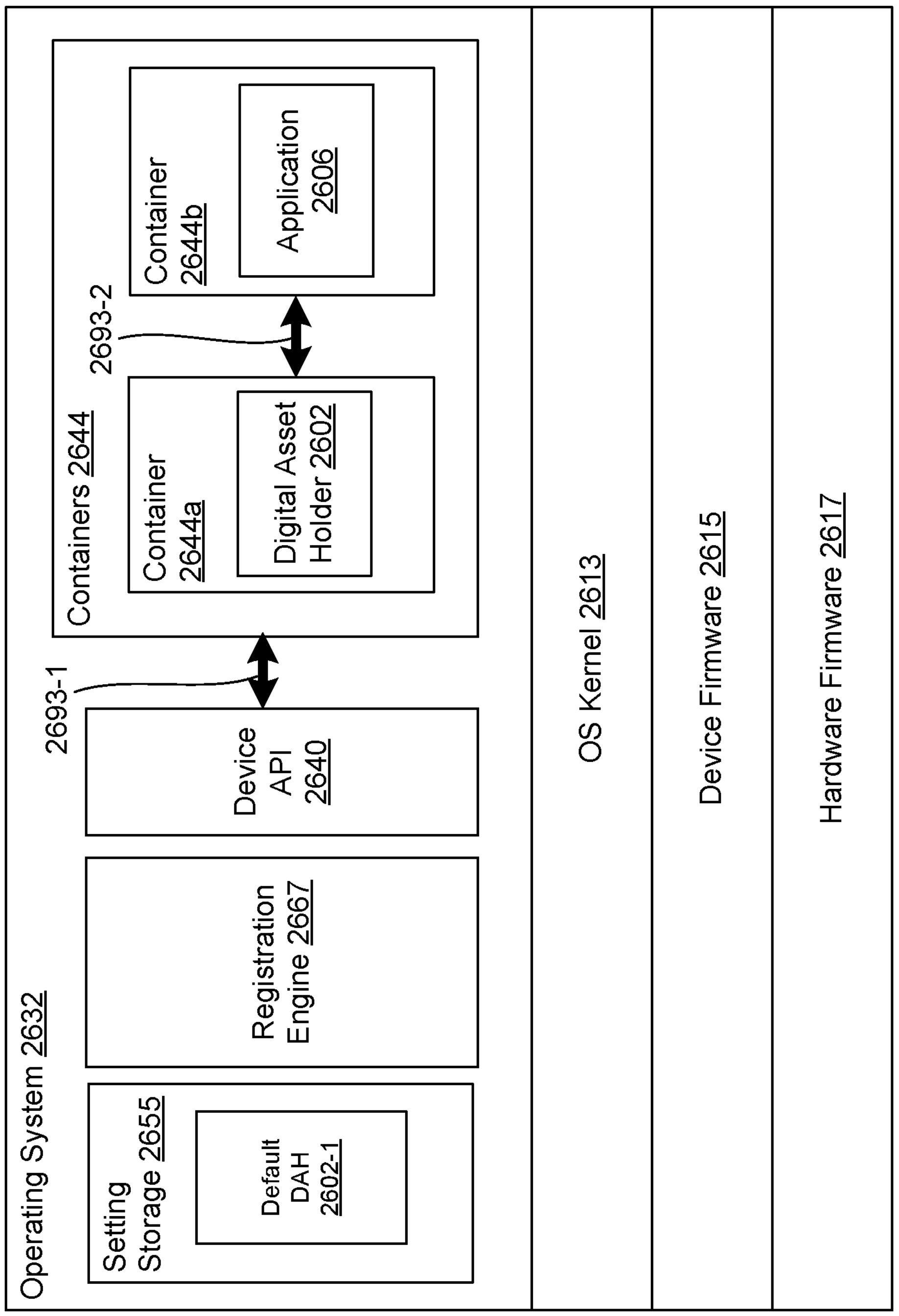
FIG. 26 illustrates an operating system for registering a digital asset holder as a default digital asset holder and/or using the default digital asset holder to facilitate a transaction on a blockchain network according to another aspect.

FIG. 26 illustrates an example of an operating system 2632 configured to enable the transfer of information (e.g., intent request, intent response) between processes (e.g., applications, APIs) to facilitate the process of adding a transaction to a blockchain network. In some examples, the operating system 2632 is an example of the operating system 2432 of FIGS. 24A through 24E and may include any of the details discussed with reference to those figures. In some examples, the operating system 2632 is an example of the operating system 2532 of FIG. 25 and may include any of the details discussed with reference to those figures. However, it is noted that the operating system 2632 may be an example of any of the systems discussed herein may include any of the details discussed with reference to any of the figures.

The operating system 2632 includes a setting storage 2655 and a registration engine 2667. The setting storage 2655 may store the setting relating to a default digital asset holder 2602-1. The registration engine 2667 may manage the registration of the default digital asset holder 2602-1. In some examples, the operating system 2632 includes a device API 2640. In some examples, the operating system 2632 does not include a device API 2640.

The operating system 2632 may include software containers 2644 configured to launch and execute applications, including one or more digital asset holders 2602 and application 2606. One of the digital asset holders 2602 is identified as the default digital asset holder 2602-1 in the setting storage 2655. A digital asset holder 2602 may be a native application installed on the operating system 2632. The application 2606 is a native application installed on the operating system 2632. The application 2606 is not a digital asset holder 2602, e.g., it does not store a user's private key for authenticating blockchain transactions. In some examples, the application 2606 is a non-browser application. In some examples, the application 2606 is a browser application. In some examples, instead of using a software container 2644, the operating system 2632 defines a virtual machine that is configured to launch and execute the applications. The registration engine 2667 and, in some examples, the device API 2640 are configured to communicate with the applications that are executed in their containers 2644 via an inter-process communication (IPC) link 2693-1.

The software containers 2644 include a container 2644*a* configured to launch and execute a digital asset holder 2602 and a container 2644*b* configured to launch and execute the application 2606. In some examples, the digital asset holder 2602, executed in the container 2644*a*, is registered as the default digital asset holder 2602-1. A software container 2644 may be an instance of another operating system. In some examples, the software container 2644*a* (or virtual machine) shares an OS kernel 2613 with the operating system 2632. In some examples, the software container 2644*b* (or virtual machine) shares an OS kernel 2613 with the operating system 2632. In some examples, the software container 2644*a* and the software container 2644*b* share the same OS kernel 2613. In some examples, the software container 2644*a*, the software container 2644*b*, and the operating system 2632 do not share an OS kernel 2613 with each other. The OS kernel 2613 is the primary interface between the hardware and the processes of a computing device. The OS kernel 2613 is an initial program that is loaded into memory before the boot loader. The OS kernel 2613 may operate on device firmware 2615, which operates on hardware firmware 2617. A software container 2644 (or virtual machine) may be a runtime platform that includes software dependencies required by the applications that it launches and executes, such as specific versions of programming language runtimes and other software libraries that assist with executing the applications.

In some examples, the operating system 2632 defines an IPC link 2693-2 between the container 2644*a* that executes the digital asset holder 2602 and the container 2644*b* that executes the application 2606. In some examples, the intent request can be transmitted from the container 2644*b* to the container 2644*a* via the IPC link 2693-2 and the intent request can be transmitted from the container 2644*a* to the container 2644*b* via the IPC link 2693-2. In some examples, the application 2606 generates the intent request, and the digital asset holder 2602 generates the intent request. In some examples, the registration engine 2667 detects the intent request (and, in some examples, the intent response) via the IPC link 2693-1. In some examples, the device API 2640 detects a blockchain transaction request from an API-exposed object being invoked on web content and communicates with the digital asset holder 2602 and the application 2606 via IPC link 2693-1. In some examples, the device API 2640 generates the intent request.

Figure 27:
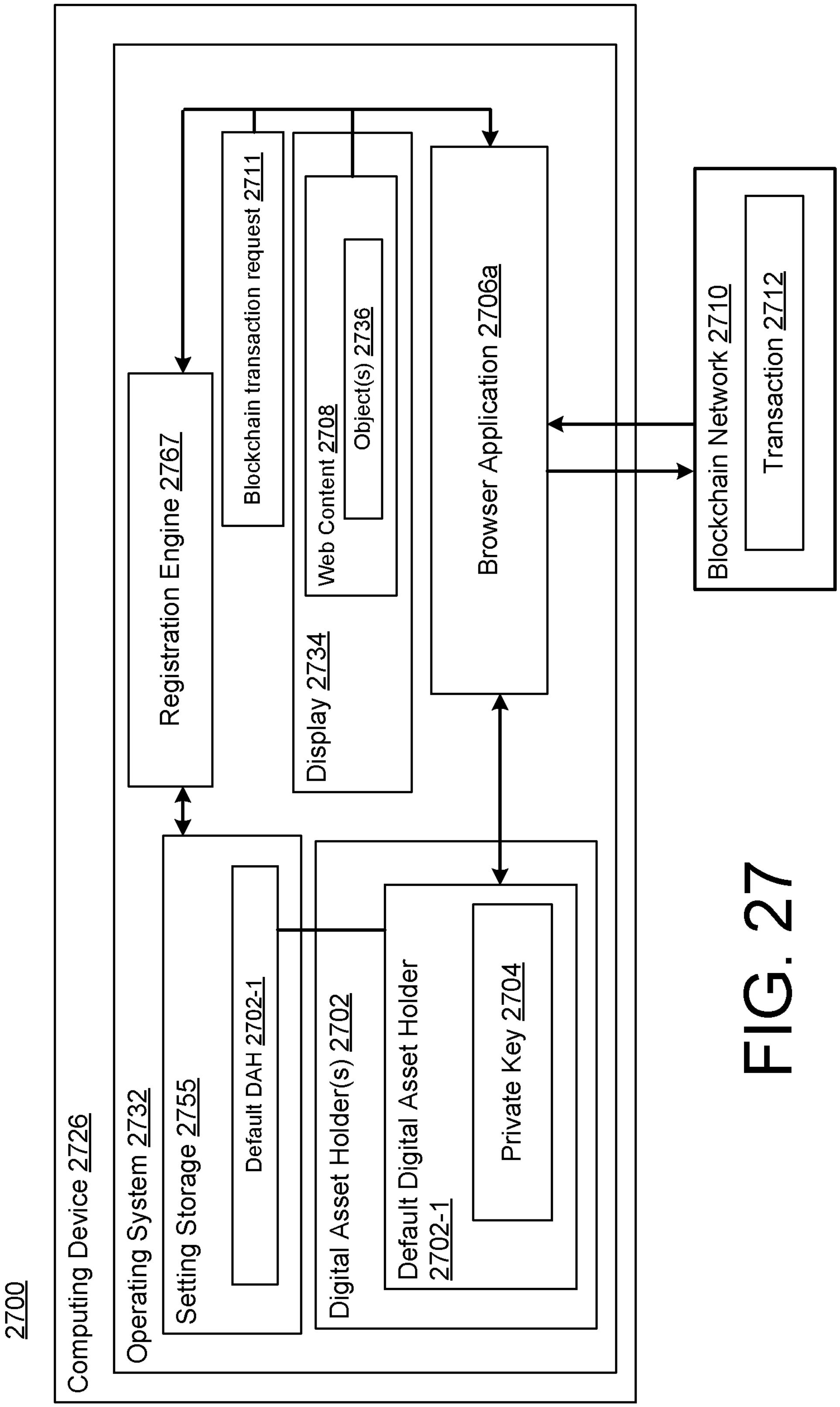
FIG. 27 illustrates a system for registering a digital asset holder as a default digital asset holder and/or using the default digital asset holder to facilitate a transaction on a blockchain network according to another aspect.

FIG. 27 illustrates a system 2700 for registering a digital asset holder 2702 as a default digital asset holder 2702-1 and using the default digital asset holder 2702-1 to complete a transaction 2712 on a blockchain network 2710. The system 2700 may be an example of any of the systems discussed herein and may include any of the details discussed with reference to any of the figures. In some examples, instead of using a device API (as discussed with reference to FIG. 25), a browser application 2706*a* is used as an intermediary between web content 2708 and the default digital asset holder 2702-1. In some examples, the default digital asset holder 2702-1 is a third-party digital asset holder that is not owned or administered by the browser application 2706*a*. In some examples, the system 2700 may include any of the techniques of connecting a third-party digital asset holder to a browser application 2706*a*, as discussed with reference to FIGS. 1 through 9.

The system 2700 includes a computing device 2726 having an operating system 2732. The operating system 2732 includes a setting storage 2755 that stores a setting (e.g., OS setting) related to the default digital asset holder 2702-1. The operating system 2732 includes a registration engine 2767 configured to manage registration of a digital asset holder 2702 as the default digital asset holder 2702-1. The operating system 2732 may execute a browser application 2706*a* configured to generate and render browser tabs. A digital asset holder 2702 may be a native application that is installed on the operating system 2732.

Web content 2708 may be displayed on a display 2734 of the computing device 2726. In some examples, the web content 2708 is rendered and displayed by the browser application 2706*a*. In some examples, the web content 2708 is rendered and displayed by a browser tab. In some examples, the web content 2708 is displayed by another native application (e.g., not a digital asset holder) via a web view controller. A user may use application 2706*a* to render web content 2708.

The web content 2708 may include one or more objects 2736. In some examples, the object 2736 is a blockchain computer object. In some examples, the object 2736 is a JavaScript exposed object. In some examples, the object 2736 is an API exposed object. If the blockchain network 2710 is Ethereum, the object 2736 is an Ethereum object (e.g., window.etherum) to create transactions on the Ethereum blockchains. In some examples, the object 2736 is specific to the type of blockchain network. In some examples, the web content 2708 may include a first object (e.g., object 2736) for creating transactions on a first blockchain network and a second object (e.g., object 2736) for creating transactions on a second blockchain network, where the second blockchain network is different from the first blockchain network. In some examples, the first and second objects, when selected (e.g., invoked, initiated) refer to different callbacks or requests related to a particular transaction 2712.

A user may select a particular control on the web content 2708, which causes the object 2736 to be invoked. When the object 2736 is invoked (e.g., selected, initiated, etc.), the browser application 2706*a* detects a blockchain transaction request 2711. In some examples, when the object 2736 is invoked, a method is called, and the called method may be considered the blockchain transaction request 2711. In response to the blockchain transaction request 2711, the browser application 2706*a* connects to the default digital asset holder 2702-1 to facilitate the adding of the transaction 2712 to the blockchain network 2710 when a digital asset holder 2702 is registered as the default digital asset holder 2702-1. For example, the browser application 2706*a* may connect to the default digital asset holder 2702-1 according to any of the techniques described in FIGS. 1 through 9.

Also, similar to the system 2400 of FIGS. 24A through 25E, identification of a particular digital asset holder 2702 as the default digital asset holder 2702-1 may be stored as a setting (e.g., an operating system (OS) setting) in a setting storage 2755 of the computing device 2726. The setting storage 2755 may be a memory device associated with the operating system 2732. The setting storage 2755 may store other OS settings. One or more digital asset holders 2702 may be downloaded and installed on the operating system 2732 of the computing device 2726. In some examples, the computing device 2726 is a mobile computing device (e.g., a smartphone, tablet, etc.) and the digital asset holders 2702 are native applications (e.g., iOS applications, Android applications, Linux applications, etc.) that can be downloaded from a digital media store and installed on the operating system 2732.

According to the techniques discussed herein, a user may register one of the digital asset holders 2702 as a default digital asset holder 2702-1. A default digital asset holder 2702-1 may be registered according to any of the techniques described in the system 2400 of FIGS. 24A through 24E. For example, the registration engine 2767 is configured to register a digital asset holder 2702 as a default digital asset holder 2702-1. In some examples, registration of a digital asset holder 2702 as the default digital asset holder 2702-1 includes updating a setting (e.g., an OS setting) in the setting storage 2755, where the setting identifies a particular digital asset holder 2702 as the default digital asset holder 2702-1. In some examples, the registration engine 2767 may detect the blockchain transaction request 2711, and, in response to the detection of the blockchain transaction request 2711, may query the setting storage 2755 and render the interface 2451 of FIG. 24B or the interface 2431 of FIG. 24C. In some examples, the registration engine 2767 may render the OS setting interface 2457 of FIGS. 24D and 24E to select or change the default digital asset holder 2702-1.

In response to an object 2736 being invoked, the browser application 2706*a* may connect to the default digital asset holder 2702-1 to process the transaction 2712 when the default digital asset holder 2702-1 is identified in the setting storage 2755. In some examples, the browser application 2706*a* communicates with the default digital asset holder 2702-1 to obtain an authenticated transaction 2712. For example, the browser application 2706*a* may transmit a transaction request to the default digital asset holder 2702-1, where the default digital asset holder 2702-1 authenticates the transaction 2712 using the private key 2704. The authenticated transaction 2712 is returned to the browser application 2706*a* and the browser application 2706*a* communicates with the blockchain network 2710 to add the transaction 2712 to the blockchain network 2710. Then, the browser application 2706*a* notifies the website and/or the application of the result.

Figure 28:
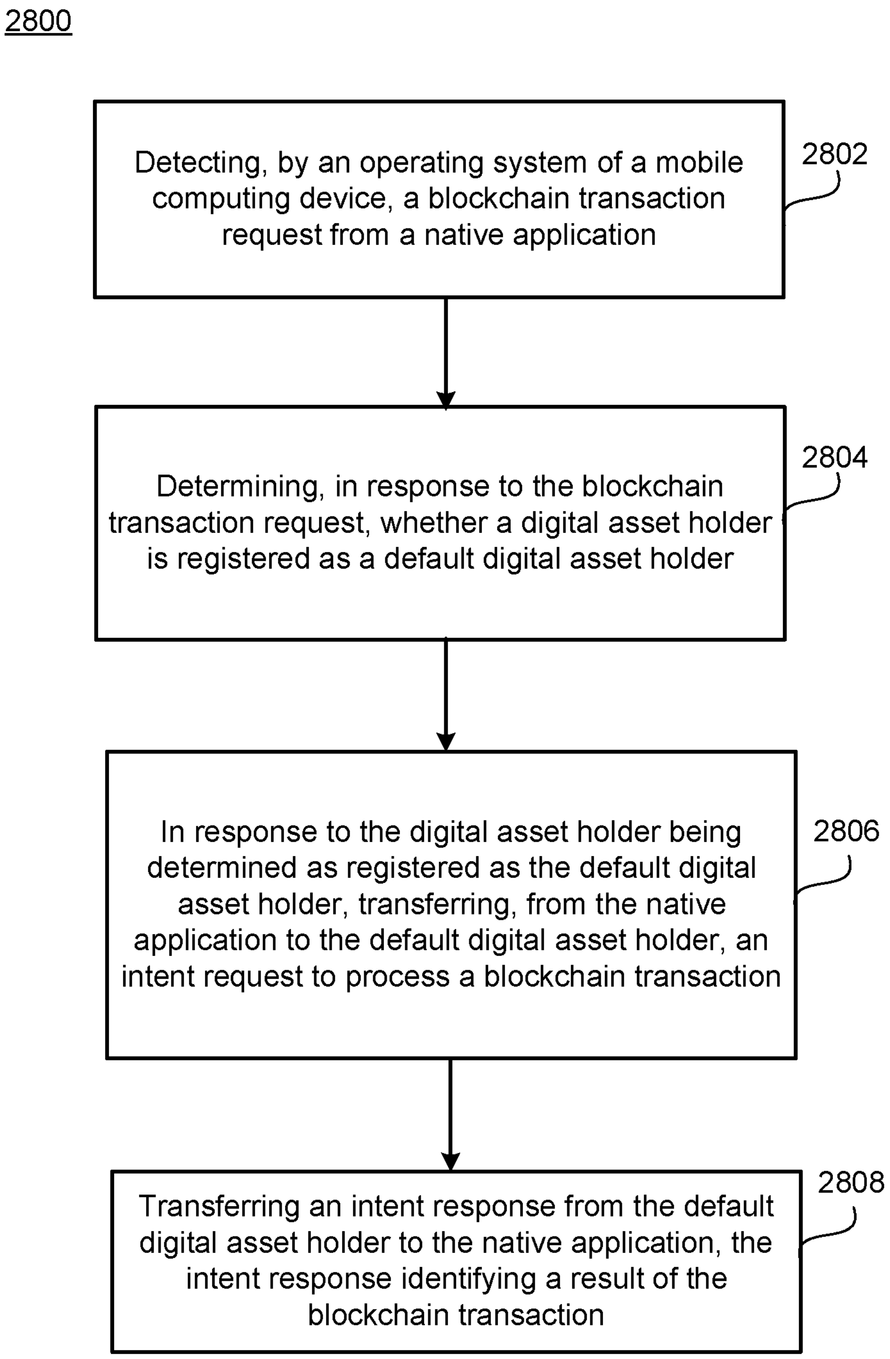
FIG. 28 illustrates a flowchart depicting example operations of registering a digital asset holder as a default digital asset holder and/or using the default digital asset holder to facilitate a transaction on a blockchain network according to an aspect.

FIG. 28 is a flowchart 2800 depicting example operations of registering a digital asset holder as a default digital asset holder and/or using the default digital asset holder to process a transaction on a blockchain network according to an aspect. The operations may be executed by an operating system of a mobile computing device such as a smartphone or a laptop. In some examples, the operating system is a mobile operating system configured to execute on a smaller display screen. In some examples, a digital asset holder is a native application that is/can be installed on the operating system. A user may use an application to institute a blockchain transaction and the application may communicate (e.g., directly communicate) with the native application using intents (e.g., intent request, intent response) to process the blockchain transaction on a blockchain network. Although the operations are described with respect to the system 2400 of FIGS. 24A through 25E, the operations may be executed by any of the systems discussed herein. Although the flowchart 2800 of FIG. 28 illustrates the operations in sequential order, it will be appreciated that this is merely an example, and that additional or alternative operations may be included. Further, operations of FIG. 28 and related operations may be executed in a different order than that shown, or in a parallel or overlapping fashion.

Operation 2802 includes detecting, by an operating system 2432 of a mobile computing device (e.g., computing device 2426), a blockchain transaction request 2411 from a native application (e.g., application 2406). In some examples, the blockchain request 2411 is an intent request 2481.

Operation 2804 includes determining, in response to the blockchain transaction request 2411, whether a digital asset holder 2402 is registered as a default digital asset holder 2402-1. In some examples, to determine whether a default digital asset holder 2402-1 has been registered, a setting storage 2455 may be queried to determine whether (and which) digital asset holder 2402 has been identified as the default digital asset holder 2402-1.

Operation 2806 includes, in response to the digital asset holder 2402 being determined as registered as the default digital asset holder 2402-1, transferring, from the native application to the default digital asset holder 2402-1, an intent request 2481 to process a blockchain transaction (e.g., transaction 2412). Operation 2808 includes transferring an intent response 2483 from the default digital asset holder 2402-1 to the native application, the intent response 2483 identifying a result of the blockchain transaction. The intent request 2481 is configured to cause the default digital asset holder 2402-1 to authenticate the blockchain transaction and communicate with a blockchain network 2410 to add the blockchain transaction to the blockchain network 2410. In some examples, the intent request 2481 is transferred via an inter-process communication link (e.g., IPC link 2693-2 of FIG. 26) defined on the operating system 2432 of the mobile computing device.

In some examples, the operations include, in response to the digital asset holder 2402 not being determined as registered as the default digital asset holder 2402-1, rendering an interface 2451 on a display 2434 of the mobile computing device, the interface configured to receive a user selection of the digital asset holder 2402 as the default digital asset holder 2402-1. In some examples, in response to receiving the user selection of the digital asset holder 2402 as the default digital asset holder 2402-1, the operations include updating a setting storage 2455 that identifies the digital asset holder 2402 as the default digital asset holder 2402-1. In some examples, in response to the digital asset holder 2402 not being determined as registered as the default digital asset holder 2402-1, the operations include rendering an interface 2431 on a display 2434 of the mobile computing device, the interface 2431 configured to prompt a user to install a particular digital asset holder 2402.

In some examples, the operations include rendering an operating system setting interface 2457 on a display 2434 of the mobile computing device, the operating system setting interface 2457 identifying the first digital asset holder 2402*a* and a second digital asset holder 2402*b*, the operating system setting interface 2457 displaying an indicator 2495 that visually identifies the first digital asset holder 2402*a* as the default digital asset holder 2402-1. In some examples, the operations include receiving, via the operating system setting interface 2457, a change to the default digital asset holder 2402-1 that switches the default digital asset holder 2402-1 from the first digital asset holder 2402*a* to the second digital asset holder 2402*b* and updating the indicator 2495 to visually identify the second digital asset holder 2402*b* as the default digital asset holder 2402-1.

In some aspects, the techniques described herein relate to a method, further including: in response to the digital asset holder not being determined as registered as the default digital asset holder, rendering an interface on a display of the computing device, the interface configured to receive a user selection of the digital asset holder as the default digital asset holder.

In some aspects, the techniques described herein relate to a method, further including: in response to receiving the user selection of the digital asset holder as the default digital asset holder, updating a setting storage that identifies the digital asset holder as the default digital asset holder. In some aspects, the techniques described herein relate to a method, further including: in response to the digital asset holder not being determined as registered as the default digital asset holder, rendering an interface on a display of the computing device, the interface configured to prompt a user to install a particular digital asset holder.

In some aspects, the techniques described herein relate to a method, wherein the intent request is configured to cause the default digital asset holder to authenticate the blockchain transaction and communicate with a blockchain network to add the blockchain transaction to the blockchain network. In some aspects, the techniques described herein relate to a method, wherein the intent request is a first intent request and the intent response is a first intent response, the method further including: transferring, from the application to the default digital asset holder, a second intent request to obtain an asset list associated with the default digital asset holder; and transferring, from the digital asset holder to the application, a second intent response that includes the asset list. In some aspects, the techniques described herein relate to a method, wherein the intent request is transferred via an inter-process communication link defined on the operating system of the computing device.

In some aspects, the techniques described herein relate to a method, wherein the digital asset holder is a first digital asset holder, the method further including: rendering an operating system setting interface on a display of the computing device, the operating system setting interface identifying the first digital asset holder and a second digital asset holder, the operating system setting interface displaying an indicator that visually identifies the first digital asset holder as the default digital asset holder.

In some aspects, the techniques described herein relate to a method, further including: receiving, via the operating system setting interface, a change to the default digital asset holder that switches the default digital asset holder from the first digital asset holder to the second digital asset holder; and updating the indicator to visually identify the second digital asset holder as the default digital asset holder. In some aspects, the techniques described herein relate to a method, wherein the first digital asset holder is a first application installed on the operating system of the computing device and the second digital asset holder is a second application installed on the operating system of the computing device.

In some aspects, the techniques described herein relate to a system including: at least one processor; and a non-transitory computer-readable medium storing executable instructions that, when executed by the at least one processor, cause the at least one processor to: detect a blockchain transaction request from an application or web content; determine, in response to the blockchain transaction request, whether a digital asset holder is registered as a default digital asset holder; in response to determining the digital asset holder is not registered as the default digital asset holder, render an interface on the computing device, the interface configured to receive a user selection of the digital asset holder as the default digital asset holder; and in response to receiving the user selection of the digital asset holder, update a setting storage that identifies the digital asset holder as the default digital asset holder.

In some aspects, the techniques described herein relate to a system, wherein the executable instructions include instructions that cause the at least one processor to: in response to determining the digital asset holder is registered as the default digital asset holder, transfer, from the application to the default digital asset holder, an intent request to add a blockchain transaction to a blockchain network; and transfer an intent response from the default digital asset holder to the application, the intent response identifying a result of the blockchain transaction.

In some aspects, the techniques described herein relate to a system, wherein the intent request is configured to cause the default digital asset holder to authenticate the blockchain transaction and communicate with a blockchain network to add the blockchain transaction to the blockchain network. In some aspects, the techniques described herein relate to a system, wherein the intent request is a first intent request and the intent response is a first intent response, the executable instructions including instructions that cause the at least one processor to: transfer, from the application to the default digital asset holder, a second intent request to obtain an asset list associated with the default digital asset holder; and transfer, from the default digital asset holder to the application, a second intent response that includes the asset list. In some aspects, the techniques described herein relate to a system, wherein the intent request is transferred via an inter-process communication link defined on an operating system of the computing device.

In some aspects, the techniques described herein relate to a system, wherein the interface is a first interface, the executable instructions including instructions that cause the at least one processor to: determine the digital asset holder is not installed on the computing device; and render a second interface on the display of the computing device, the second interface configured to prompt a user to install a particular digital asset holder.

In some aspects, the techniques described herein relate to a system, wherein the digital asset holder is a first digital asset holder, the executable instructions including instructions that cause the at least one processor to: render an operating system setting interface that identifies the first digital asset holder and identifies a second digital asset holder and displays an indicator that visually identifies the first digital asset holder as the default digital asset holder.

In some aspects, the techniques described herein relate to a system, wherein the executable instructions include instructions that cause the at least one processor to: receive, via the operating system setting interface, a change to the default digital asset holder that switches the default digital asset holder from the first digital asset holder to the second digital asset holder; and update the indicator to visually identify the second digital asset holder as the default digital asset holder.

In some aspects, the techniques described herein relate to a non-transitory computer-readable medium storing executable instructions that when executed by at least one processor cause the at least one processor to execute operations, the operations including: detecting, by an operating system of a computing device, a blockchain transaction request from an application; determining, in response to the blockchain transaction request, whether a digital asset holder is registered as a default digital asset holder; in response to the digital asset holder not being determined as registered as the default digital asset holder, rendering an interface on a display of the computing device, the interface configured to receive a user selection of the digital asset holder as the default digital asset holder; and in response to the digital asset holder being determined as registered as the default digital asset holder, transferring, from the application to the default digital asset holder, an intent request to add a blockchain transaction to a blockchain network.

In some aspects, the techniques described herein relate to a non-transitory computer-readable medium, wherein the operations further include: transferring an intent response from the default digital asset holder to the application, the intent response identifying a result of the blockchain transaction. In some aspects, the techniques described herein relate to a non-transitory computer-readable medium, wherein the intent request is a first intent request and the intent response is a first intent response, the operations further including: transferring, from the application to the default digital asset holder, a second intent request to obtain an asset list associated with the default digital asset holder; and transferring, from the default digital asset holder to the application, a second intent response that includes the asset list.

In some aspects, the techniques described herein relate to a non-transitory computer-readable medium, wherein the intent request is configured to cause the digital asset holder to authenticate the blockchain transaction and communicate with a blockchain network to add the blockchain transaction to the blockchain network. In some aspects, the techniques described herein relate to a non-transitory computer-readable medium, wherein the intent request is transferred via an inter-process communication link defined on the operating system of the computing device. In some aspects, the techniques described herein relate to a non-transitory computer-readable medium, wherein the operations further include: in response to receiving the user selection of the digital asset holder as the default digital asset holder, updating a setting storage that identifies the digital asset holder as the default digital asset holder.

In some aspects, the techniques described herein relate to a non-transitory computer-readable medium, wherein the digital asset holder is a first digital asset holder, the operations further include: rendering an operating system setting interface on the display of the computing device, the operating system setting interface identifying the first digital asset holder and a second digital asset holder, the operating system setting interface displaying an indicator that visually identifies the first digital asset holder as the default digital asset holder.

In some aspects, the techniques described herein relate to a non-transitory computer-readable medium, wherein the operations further include: receiving, via the operating system setting interface, a change to the default digital asset holder that switches the default digital asset holder from the first digital asset holder to the second digital asset holder; and updating the indicator to visually identify the second digital asset holder as the default digital asset holder.

Figure 29:
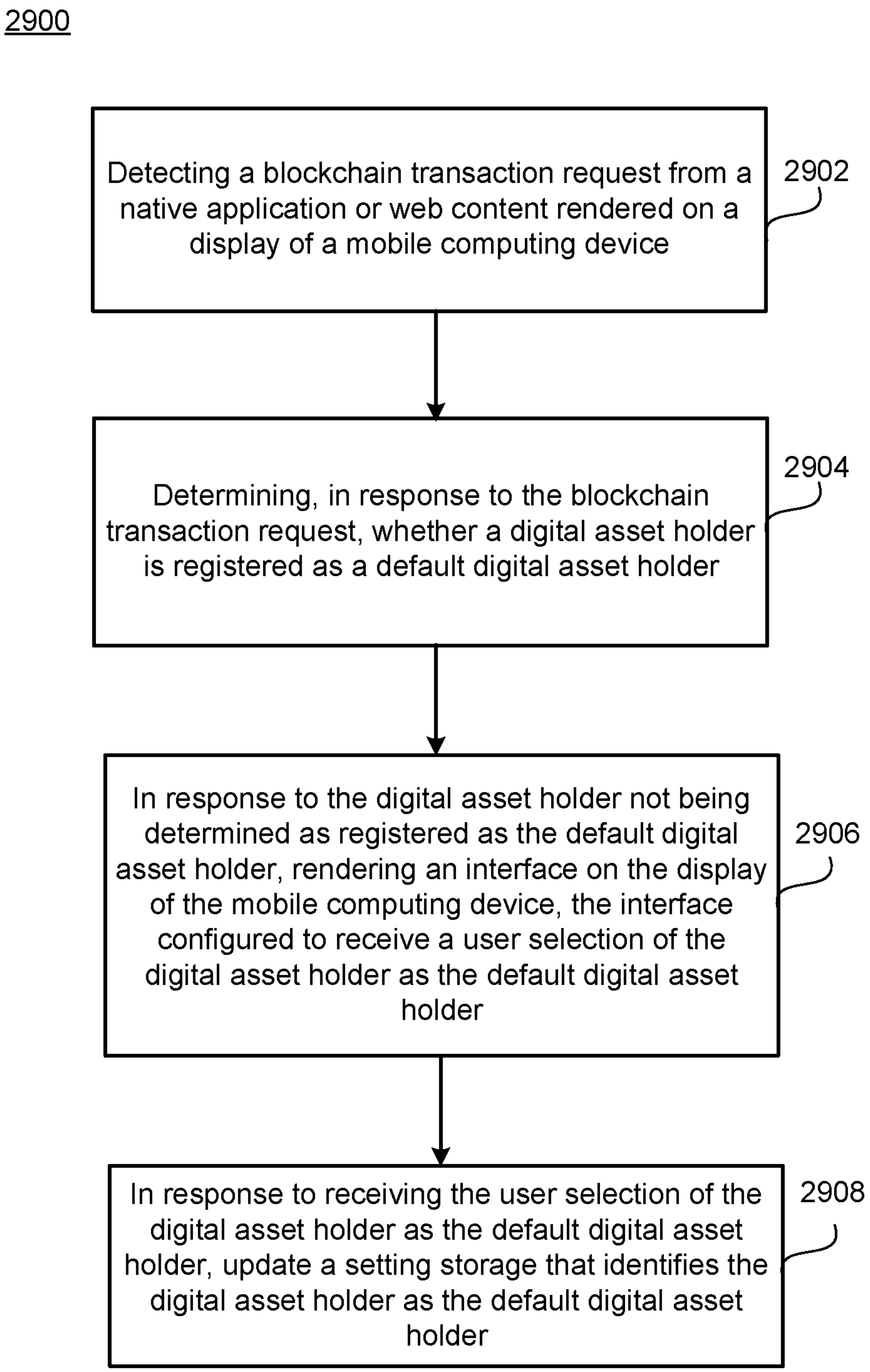
FIG. 29 illustrates a flowchart depicting example operations of registering a digital asset holder as a default digital asset holder and/or using the default digital asset holder to facilitate a transaction on a blockchain network according to another aspect.

FIG. 29 is a flowchart 2900 depicting example operations of registering a digital asset holder as a default digital asset holder and/or using the default digital asset holder to process a transaction on a blockchain network according to an aspect. The operations may be executed by an operating system of a mobile computing device such as a smartphone or a laptop. In some examples, the operating system is a mobile operating system configured to execute on a smaller display screen. In some examples, a digital asset holder is a native application that is/can be installed on the operating system. A blockchain transaction can be instituted from web content or an application and the operating system may determine whether a user has registered a digital asset holder as a default digital asset holder, and, if not, may render an interface to permit the user to select a particular digital asset holder as the default digital asset holder. In some examples, the selected default digital asset holder is used for the current transaction, where the interface is rendered again when a subsequent transaction is initiated. In some examples, the selected default digital asset holder is used for the current transaction and future transactions, where the interface is not rendered again when a subsequent transaction is initiated. In some examples, the interface includes a selectable control that enables the user to select whether the default digital asset holder is used for just the current transaction or the current transaction and future transactions (e.g., "this time" v. "always").

Although the operations are described with respect to the system 2400 of FIGS. 24A through 25E, the operations may be executed by any of the systems discussed herein. In some examples, the operations can be executed with respect to the system 2500 of FIG. 25, the operating system 2632 of FIG. 26, and/or the system 2700 of FIG. 27. Although the flowchart 2900 of FIG. 29 illustrates the operations in sequential order, it will be appreciated that this is merely an example, and that additional or alternative operations may be included. Further, operations of FIG. 29 and related operations may be executed in a different order than that shown, or in a parallel or overlapping fashion.

Operation 2902 includes detecting a blockchain transaction request 2411 from a native application (e.g., application 2406) or web content 2408 rendered on a display 2434 of a mobile computing device (e.g., computing device 2426). In some examples, the blockchain transaction request 2411 is an intent request 2481 generated by the application 2406. In some examples, the blockchain transaction request 2411 is a method that is called in response to an object 2436 (included in the web content 2408) being selected (e.g., invoked).

Operation 2904 includes determining, in response to the blockchain transaction request 2411, whether a digital asset holder 2402 is registered as a default digital asset holder 2402-1. Operation 2906 includes, in response to the digital asset holder 2402 not being determined as registered as the default digital asset holder 2402-1, rendering an interface 2451 on the display 2434 of the mobile computing device, the interface configured to receive a user selection of the digital asset holder 2402 as the default digital asset holder 2402-1. Operation 2908 includes, in response to receiving the user selection of the digital asset holder 2402 as the default digital asset holder 2402-1, updating a setting storage 2455 that identifies the digital asset holder 2402 as the default digital asset holder 2402-1.

In some examples, the operations include determining that the digital asset holder 2402 is not installed on the mobile computing device and rendering an interface 2431 on the display 2434, where the interface 2431 is configured to prompt a user to install a particular digital asset holder 2402. In some examples, in response to the digital asset holder 2402 being determined as registered as the default digital asset holder 2402-1, the operations include transferring, from the native application to the default digital asset holder 2402-1, an intent request 2481 to add a transaction 2412 to a blockchain network 2410 and transfer an intent response 2483 from the default digital asset holder 2402-1 to the application 2406, where the intent response 2483 identifies a result of the transaction 2412. In some examples, the intent request 2481 is configured to cause the default digital asset holder 2402-1 to authenticate the transaction 2412 and communicate with a blockchain network 2410 to add the transaction 2412 to the blockchain network 2410.

According to an aspect, a non-transitory computer-readable medium storing executable instructions that when executed by at least one processor cause the at least one processor to execute operations, the operations including detecting, by an operating system of a computing device, a blockchain transaction request from an application, determining, in response to the blockchain transaction request, whether a digital asset holder is registered as a default digital asset holder, in response to the digital asset holder not being determined as registered as the default digital asset holder, rendering an interface on a display of the computing device, the interface configured to receive a user selection of the digital asset holder as the default digital asset holder, and, in response to the digital asset holder being determined as registered as the default digital asset holder, transferring, from the application to the default digital asset holder, an intent request to add a blockchain transaction to a blockchain network.

In some aspects, the techniques described herein relate to a non-transitory computer-readable medium, wherein the operations further include: transferring an intent response from the default digital asset holder to the application, the intent response identifying a result of the blockchain transaction. In some aspects, the techniques described herein relate to a non-transitory computer-readable medium, wherein the intent request is a first intent request and the intent response is a first intent response, the operations further including: transferring, from the application to the default digital asset holder, a second intent request to obtain an asset list associated with the default digital asset holder; and transferring, from the default digital asset holder to the application, a second intent response that includes the asset list.

In some aspects, the techniques described herein relate to a non-transitory computer-readable medium, wherein the intent request is configured to cause the digital asset holder to authenticate the blockchain transaction and communicate with a blockchain network to add the blockchain transaction to the blockchain network. In some aspects, the techniques described herein relate to a non-transitory computer-readable medium, wherein the intent request is transferred via an inter-process communication link defined on the operating system of the computing device. In some aspects, the techniques described herein relate to a non-transitory computer-readable medium, wherein the operations further include: in response to receiving the user selection of the digital asset holder as the default digital asset holder, updating a setting storage that identifies the digital asset holder as the default digital asset holder.

In some aspects, the techniques described herein relate to a non-transitory computer-readable medium, wherein the digital asset holder is a first digital asset holder, the operations further include: rendering an operating system setting interface on the display of the computing device, the operating system setting interface identifying the first digital asset holder and a second digital asset holder, the operating system setting interface displaying an indicator that visually identifies the first digital asset holder as the default digital asset holder. In some aspects, the techniques described herein relate to a non-transitory computer-readable medium, wherein the operations further include: receiving, via the operating system setting interface, a change to the default digital asset holder that switches the default digital asset holder from the first digital asset holder to the second digital asset holder; and updating the indicator to visually identify the second digital asset holder as the default digital asset holder.

Figure 30:
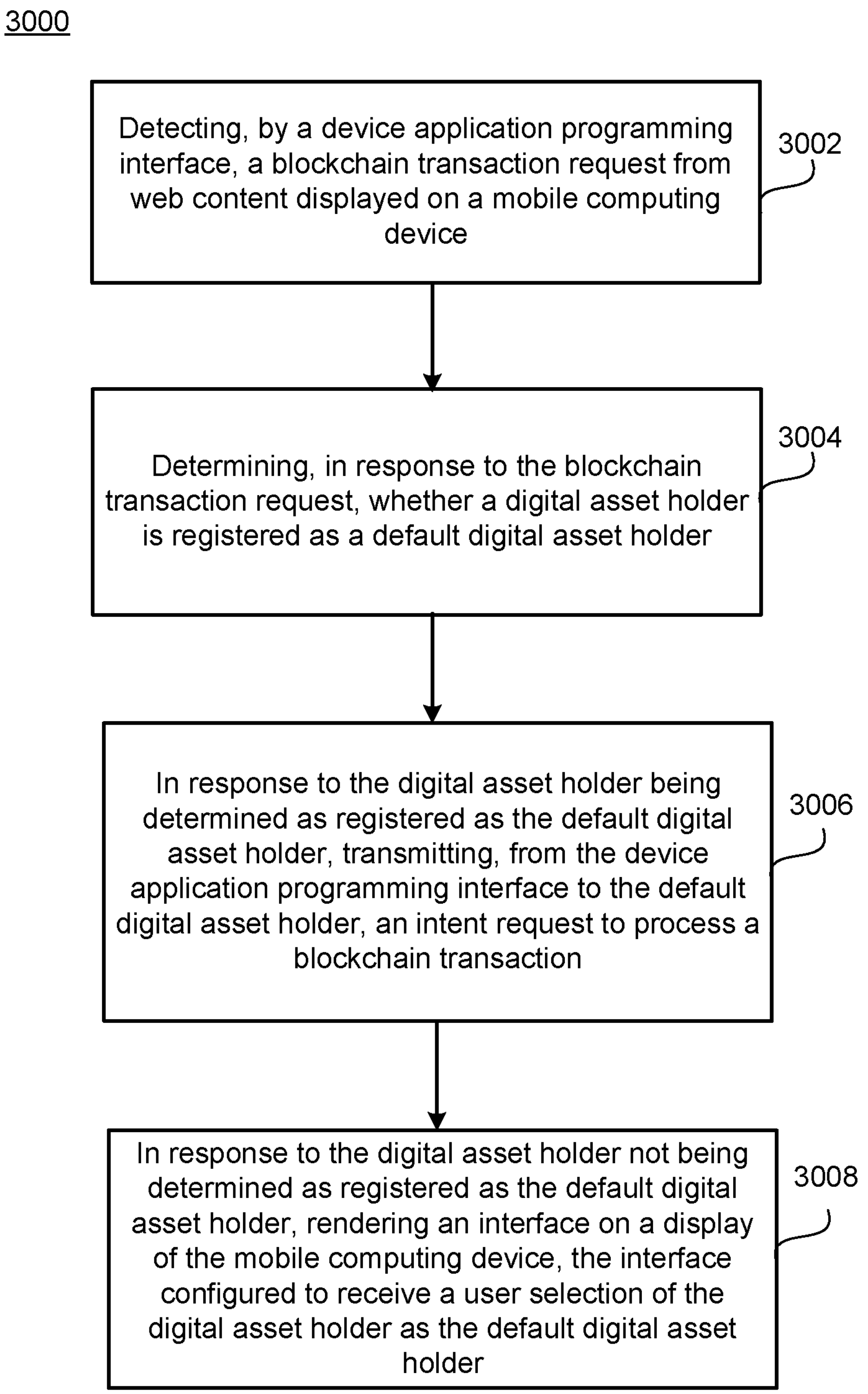
FIG. 30 illustrates a flowchart depicting example operations of registering a digital asset holder as a default digital asset holder and/or using the default digital asset holder to facilitate a transaction on a blockchain network according to another aspect.

FIG. 30 is a flowchart 3000 depicting example operations of registering a digital asset holder as a default digital asset holder and/or using the default digital asset holder to process a transaction on a blockchain network according to an aspect. The operations may be executed by an operating system of a mobile computing device such as a smartphone or a laptop. In some examples, the operating system is a mobile operating system configured to execute on a smaller display screen. In some examples, a digital asset holder is a native application that is/can be installed on the operating system. A blockchain transaction can be instituted from web content or an application and the operating system may determine whether a user has registered a digital asset holder as a default digital asset holder, and, if not, may render an interface to permit the user to select a particular digital asset holder as the default digital asset holder. If so, a device API may generate and send an intent request to the default digital asset holder. Although the operations are described with respect to the system 2500 of FIG. 25, the operations may be executed by any of the systems discussed herein. Although the flowchart 3000 of FIG. 30 illustrates the operations in sequential order, it will be appreciated that this is merely an example, and that additional or alternative operations may be included. Further, operations of FIG. 30 and related operations may be executed in a different order than that shown, or in a parallel or overlapping fashion.

Operation 3002 includes detecting, by a device API 2540, a blockchain transaction request 2511 from web content 2508 displayed on a computing device 2526. Operation 3004 includes determining, in response to the blockchain transaction request 2511, whether a digital asset holder 2502 is registered as a default digital asset holder 2502-1. Operation 3006 includes, in response to the digital asset holder 2502 being determined as registered as the default digital asset holder 2502-1, transmitting, from the device API 2540 to the default digital asset holder 2502-1, an intent request 2581 to process a transaction 2512. Operation 3008 may include, in response to the digital asset holder 2502 not being determined as registered as the default digital asset holder 2502-1, rendering an interface 2451 of FIG. 24B on a display of the mobile computing device, where the interface 2451 is configured to receive a user selection of the digital asset holder 2502 as the default digital asset holder 2502-1.

In some examples, the operations include transferring an intent response 2583 from the default digital asset holder 2502-1 to the device API 2540, where the intent response 2583 identifies a result of the transaction 2512. In some examples, in response to the intent response 2583, the operations include transmitting, from the device API 2540 to a website that hosts the web content 2508, a notification 2597 indicating that the result of the transaction 2512. In some examples, in response to the digital asset holder 2502 not being determined as registered as the default digital asset holder 2502-1, the operations include rendering an interface 2451 of FIG. 24B on a display of the computing device 2526, where the interface 2451 of FIG. 24B is configured to receive a user selection of the digital asset holder 2502 as the default digital asset holder 2502-1. In some examples, in response to receiving the user selection of the digital asset holder 2502 as the default digital asset holder 2502-1, the operations include updating a setting storage 2555 that identifies the digital asset holder 2502 as the default digital asset holder 2502-1. In some examples, in response to the digital asset holder 2502 not being determined as registered as the default digital asset holder 2502-1, rendering an interface 2431 of FIG. 24C on a display of the computing device 2526, where the interface 2431 is configured to prompt a user to install a particular digital asset holder 2502. In some examples, the operations include rendering an OS setting interface 2457 of FIG. 24D or 24E on a display of the computing device 2526, where the OS setting interface 2457 identifies a digital asset holder 2402*a* and a digital asset holder 2402*b*. The OS setting interface 2457 may display an indicator 2495 that visually identifies the digital asset holder 2402*a* as the default digital asset holder 2502-1.

In some aspects, the techniques described herein relate to a method, further including: transferring an intent response from the default digital asset holder to the device application programming interface, the intent response identifying a result of the blockchain transaction. In some aspects, the techniques described herein relate to a method, further including: in response to the intent response, transmitting, from the device application programming interface to a website that hosts the web content, a notification indicating the result of the blockchain transaction. In some aspects, the techniques described herein relate to a method, further including: in response to the digital asset holder not being determined as registered as the default digital asset holder, rendering an interface on a display of the computing device, the interface configured to receive a user selection of the digital asset holder as the default digital asset holder.

In some aspects, the techniques described herein relate to a method, further including: in response to receiving the user selection of the digital asset holder as the default digital asset holder, updating a setting storage that identifies the digital asset holder as the default digital asset holder. In some aspects, the techniques described herein relate to a method, further including: in response to the digital asset holder not being determined as registered as the default digital asset holder, rendering an interface on a display of the computing device, the interface configured to prompt a user to install a particular digital asset holder.

In some aspects, the techniques described herein relate to a method, wherein the intent request is configured to cause the default digital asset holder to authenticate the blockchain transaction. In some aspects, the techniques described herein relate to a method, wherein the digital asset holder is a first digital asset holder, the method further including: rendering an operating system setting interface on a display of the computing device, the operating system setting interface identifying the first digital asset holder and a second digital asset holder, the operating system setting interface displaying an indicator that visually identifies the first digital asset holder as the default digital asset holder.

In some aspects, the techniques described herein relate to a method, further including: receiving, via the operating system setting interface, a change to the default digital asset holder that switches the default digital asset holder from the first digital asset holder to the second digital asset holder; and updating the indicator to visually identify the second digital asset holder as the default digital asset holder.

In some aspects, the techniques described herein relate to a system including: at least one processor; and a non-transitory computer-readable medium storing executable instructions that when executed by the at least one processor cause the at least one processor to: detect, by a device application programming interface, a blockchain transaction request from web content; determine, in response to the blockchain transaction request, whether a digital asset holder is registered as a default digital asset holder; in response to the digital asset holder not being determined as registered as the default digital asset holder, render an interface on a display of the computing device, the interface configured to receive a user selection of the digital asset holder as the default digital asset holder; and in response to the digital asset holder being determined as registered as the default digital asset holder, transmit, from the device application programming interface to the default digital asset holder, an intent request to process a blockchain transaction.

In some aspects, the techniques described herein relate to a system, wherein the executable instructions include instructions that cause the at least one processor to: transmit an intent response from the default digital asset holder to the device application programming interface, the intent response identifying a result of the blockchain transaction; and in response to the intent response, transmit, from the device application programming interface to a website that hosts the web content, a notification indicating the result of the blockchain transaction.

In some aspects, the techniques described herein relate to a system, wherein the executable instructions include instructions that cause the at least one processor to: in response to receiving the user selection of the digital asset holder as the default digital asset holder, update a setting storage that identifies the digital asset holder as the default digital asset holder. In some aspects, the techniques described herein relate to a system, wherein the interface is a first interface, the executable instructions including instructions that cause the at least one processor to: in response to the digital asset holder not being determined as registered as the default digital asset holder, render a second interface on the display of the computing device, the interface configured to prompt a user to install a particular digital asset holder.

In some aspects, the techniques described herein relate to a system, wherein the digital asset holder is a first digital asset holder, the executable instructions including instructions that cause the at least one processor to: render an operating system setting interface on the display of the computing device, the operating system setting interface identifying the first digital asset holder and a second digital asset holder, the operating system setting interface displaying an indicator that visually identifies the first digital asset holder as the default digital asset holder.

In some aspects, the techniques described herein relate to a system, wherein the executable instructions include instructions that cause the at least one processor to: receive, via the operating system setting interface, a change to the default digital asset holder that switches the default digital asset holder from the first digital asset holder to the second digital asset holder; and update the indicator to visually identify the second digital asset holder as the default digital asset holder.

In some aspects, the techniques described herein relate to a non-transitory computer-readable medium storing executable instructions that cause the at least one processor to execute operations, the operations including: detecting, by a device application programming interface, a blockchain transaction request from web content; determining, in response to the blockchain transaction request, whether a digital asset holder is registered as a default digital asset holder; and in response to the digital asset holder being determined as registered as the default digital asset holder, transmitting, from the device application programming interface to the default digital asset holder, an intent request to process a blockchain transaction.

In some aspects, the techniques described herein relate to a non-transitory computer-readable medium, wherein the operations further includes: transmitting an intent response from the default digital asset holder to the device application programming interface, the intent response identifying a result of the blockchain transaction; and in response to the intent response, transmitting, from the device application programming interface to a website that hosts the web content, a notification indicating the result of the blockchain transaction.

In some aspects, the techniques described herein relate to a non-transitory computer-readable medium, wherein the operations further include: in response to the digital asset holder not being determined as registered as the default digital asset holder, rendering an interface on a display of the computing device, the interface configured to receive a user selection of the digital asset holder as the default digital asset holder.

In some aspects, the techniques described herein relate to a non-transitory computer-readable medium, wherein the operations further include: in response to receiving the user selection of the digital asset holder as the default digital asset holder, updating a setting storage that identifies the digital asset holder as the default digital asset holder.

In some aspects, the techniques described herein relate to a non-transitory computer-readable medium, wherein the digital asset holder is a first digital asset holder, the operations further including: rendering an operating system setting interface on a display of the computing device, the operating system setting interface identifying the first digital asset holder and a second digital asset holder, the operating system setting interface displaying an indicator that visually identifies the first digital asset holder as the default digital asset holder.

In some aspects, the techniques described herein relate to a non-transitory computer-readable medium, wherein the operations further include: receiving, via the operating system setting interface, a change to the default digital asset holder that switches the default digital asset holder from the first digital asset holder to the second digital asset holder; and updating the indicator to visually identify the second digital asset holder as the default digital asset holder.

Figure 31:
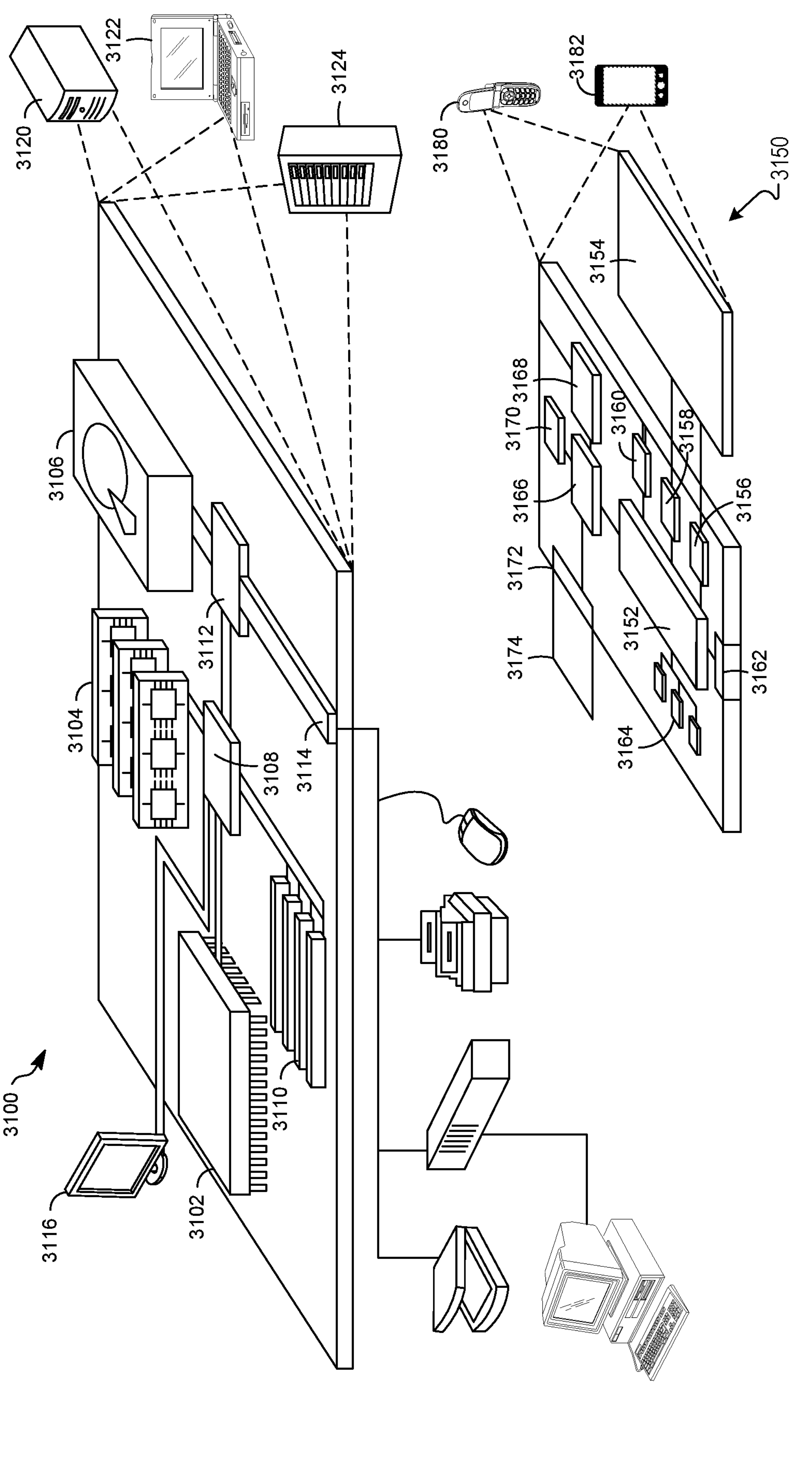
FIG. 31 shows an example of a computer device and a mobile computer device according to an aspect.

FIG. 31 shows an example of a computing device 3100 and a mobile computing device 3150, which may be used with the techniques described here. In some implementations, the computing device 3100 and the mobile computing device 3150 may be examples of any of the computing devices discussed with reference to the previous figures. Computing device 3100 is intended to represent various forms of digital computers, such as laptops, desktops, tablets, workstations, personal digital assistants, televisions, servers, blade servers, mainframes, and other appropriate computing devices. Computing device 3150 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 3100 includes a processor 3102, memory 3104, a storage device 3106, a high-speed interface 3108 connecting to memory 3104 and high-speed expansion ports 3110, and a low speed interface 3112 connecting to low speed bus 3114 and storage device 3106. The processor 3102 can be a semiconductor-based processor. The memory 3104 can be a semiconductor-based memory. Each of the components 3102, 3104, 3106, 3108, 3110, and 3112, are interconnected using various busses, and may be mounted on a common motherboard or in other manners as appropriate. The processor 3102 can process instructions for execution within the computing device 3100, including instructions stored in the memory 3104 or on the storage device 3106 to display graphical information for a GUI on an external input/output device, such as display 3116 coupled to high speed interface 3108. In other implementations, multiple processors and/or multiple buses may be used, as appropriate, along with multiple memories and types of memory. Also, multiple computing devices 3100 may be connected, with each device providing portions of the necessary operations (e.g., as a server bank, a group of blade servers, or a multi-processor system).

The memory 3104 stores information within the computing device 3100. In one implementation, the memory 3104 is a volatile memory unit or units. In another implementation, the memory 3104 is a non-volatile memory unit or units. The memory 3104 may also be another form of computer-readable medium, such as a magnetic or optical disk.

The storage device 3106 is capable of providing mass storage for the computing device 3100. In one implementation, the storage device 3106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 3104, the storage device 3106, or memory on processor 3102.

The high speed controller 3108 manages bandwidth-intensive operations for the computing device 3100, while the low speed controller 3112 manages lower bandwidth-intensive operations. Such allocation of functions are examples only. In one implementation, the high-speed controller 3108 is coupled to memory 3104, display 3116 (e.g., through a graphics processor or accelerator), and to high-speed expansion ports 3110, which may accept various expansion cards (not shown). In the implementation, low-speed controller 3112 is coupled to storage device 3106 and low-speed expansion port 3114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 3100 may be implemented in a number of different forms, as shown in the figure. For example, it may be implemented as a standard server 3120, or multiple times in a group of such servers. It may also be implemented as part of a rack server system 3124. In addition, it may be implemented in a personal computer such as a laptop computer 3122. Alternatively, components from computing device 3100 may be combined with other components in a mobile device (not shown), such as device 3150. Each of such devices may contain one or more computing devices 3100, 3150, and an entire system may be made up of multiple computing devices 3100, 3150 communicating with each other.

Computing device 3150 includes a processor 3152, memory 3164, an input/output device such as a display 3154, a communication interface 3166, and a transceiver 3168, among other components. The device 3150 may also be provided with a storage device, such as a microdrive or other device, to provide additional storage. Each of the components 3150, 3152, 3164, 3154, 3166, and 3168, are interconnected using various buses, and several of the components may be mounted on a common motherboard or in other manners as appropriate.

The processor 3152 can execute instructions within the computing device 3150, including instructions stored in the memory 3164. The processor may be implemented as a chipset of chips that include separate and multiple analog and digital processors. The processor may provide, for example, for coordination of the other components of the device 3150, such as control of user interfaces, applications run by device 3150, and wireless communication by device 3150.

Processor 3152 may communicate with a user through control interface 3158 and display interface 3156 coupled to a display 3154. The display 3154 may be, for example, a TFT LCD (Thin-Film-Transistor Liquid Crystal Display) or an OLED (Organic Light Emitting Diode) display, or other appropriate display technology. The display interface 3156 may comprise appropriate circuitry for driving the display 3154 to present graphical and other information to a user. The control interface 3158 may receive commands from a user and convert them for submission to the processor 3152. In addition, an external interface 3162 may be provided in communication with processor 3152, so as to enable near area communication of device 3150 with other devices. External interface 3162 may provide, for example, for wired communication in some implementations, or for wireless communication in other implementations, and multiple interfaces may also be used.

The memory 3164 stores information within the computing device 3150. The memory 3164 can be implemented as one or more of a computer-readable medium or media, a volatile memory unit or units, or a non-volatile memory unit or units. Expansion memory 3174 may also be provided and connected to device 3150 through expansion interface 3172, which may include, for example, a SIMM (Single In Line Memory Module) card interface. Such expansion memory 3174 may provide extra storage space for device 3150 or may also store applications or other information for device 3150. Specifically, expansion memory 3174 may include instructions to carry out or supplement the processes described above and may include secure information also. Thus, for example, expansion memory 3174 may be provided as a security module for device 3150 and may be programmed with instructions that permit secure use of device 3150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 3164, expansion memory 3174, or memory on processor 3152 that may be received, for example, over transceiver 3168 or external interface 3162.

Device 3150 may communicate wirelessly through communication interface 3166, which may include digital signal processing circuitry where necessary. Communication interface 3166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 3168. In addition, short-range communication may occur, such as using a Bluetooth, Wi-Fi, or other such transceiver (not shown). In addition, GPS (Global Positioning System) receiver module 3170 may provide additional navigation- and location-related wireless data to device 3150, which may be used as appropriate by applications running on device 3150.

Device 3150 may also communicate audibly using audio codec 3160, which may receive spoken information from a user and convert it to usable digital information. Audio codec 3160 may likewise generate audible sound for a user, such as through a speaker, e.g., in a handset of device 3150. Such sound may include sound from voice telephone calls, may include recorded sound (e.g., voice messages, music files, etc.) and may also include sound generated by applications operating on device 3150.

The computing device 3150 may be implemented in a number of different forms, as shown in the figure. For example, it may be implemented as a cellular device 3180. It may also be implemented as part of a smartphone 3182, personal digital assistant, or another similar mobile device.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method, performed by a device, comprising:

rendering web content on the device;

inserting a programming interface in the web content, the programming interface providing an executable function for the web content, the executable function configured to cause a browser application, associated with the device, to request an action of a digital asset application associated with the device, the digital asset application storing a private key for authenticating blockchain transactions of a blockchain network, the programming interface including a callback function to the web content;

in response to a user selection that triggers the executable function provided for the programming interface, detecting a transaction request from the web content;

storing a reference to the callback function at the browser application;

initiating authentication of the transaction request by the digital asset application using the private key;

transmitting the transaction request to the blockchain network;

receiving a transaction response from the blockchain network, the transaction response including a transaction identifier for a transaction added to the blockchain network;

in response to being received from the blockchain network, executing the callback function to update the web content with information from the transaction response, including displaying a transaction status message that includes the transaction identifier; and transmitting a notification message to the digital asset application, the notification message including the transaction identifier.

2. The method of claim 1, wherein initiating authentication of the transaction request includes:

transmitting, to the digital asset application, an authentication request to authenticate transaction data of the transaction request; and receiving, from the digital asset application, an authentication response that authenticates the transaction data.

3. The method of claim 2, further comprising:

transmitting an asset request to the digital asset application;

receiving an asset list from the digital asset application, the asset list identifying a plurality of digital assets available to complete the transaction request;

displaying, within the web content, a user interface object listing the plurality of digital assets; and in response to receiving a user selection of one of the plurality of digital assets, transmitting the authentication request.

4. The method of claim 1, further comprising:

transmitting a JavaScript object notation message to a node gateway of the blockchain network, the JavaScript object notation message including the transaction request.

5. The method of claim 1, wherein the digital asset application includes a native application installed on a mobile operating system of the device, and wherein initiating the authentication includes transmitting an intent request, to the native application, to authenticate the transaction request.

6. The method of claim 1, wherein the digital asset application includes a web application on the device, the web application being executable by the browser application.

7. The method of claim 1, wherein the digital asset application includes a server application that is executable by a server computer that is remote from the device.

8. The method of claim 1, wherein rendering the web content on the device includes:

receiving a resource locator, associated with the web content, from a non-browser application executing on the device;

receiving, from the non-browser application, a developer-defined parameter about a customization of a web interface; and initiating display of the web interface with the developer-defined parameter, the web interface including a read-only address field with the resource locator associated with the web content, the web interface displaying the web content.

9. A device comprising:

at least one processor; and a non-transitory computer-readable medium storing executable instructions that when executed by the at least one processor cause the at least one processor to:

render web content on the device;

insert a programming interface in the web content, the programming interface providing an executable function for the web content, the executable function configured to cause a browser application, associated with the device, to request an action of a digital asset application associated with the device, the digital asset application storing a private key for authenticating blockchain transactions of a blockchain network, the programming interface including a callback function to the web content;

in response to a user selection that triggers the executable function provided for the programming interface, detect a transaction request from the web content;

store a reference to the callback function at the browser application;

initiate authentication of the transaction request by the digital asset application using the private key;

transmit the transaction request to the blockchain network;

receive a transaction response from the blockchain network, the transaction response including a transaction identifier for a transaction added to the blockchain network;

in response to the transaction response being received from the blockchain network, execute the callback function to update the web content with information from the transaction response, including display a transaction status message that includes the transaction identifier; and transmit a notification message to the digital asset application, the notification message including the transaction identifier.

10. The device of claim 9, wherein the digital asset application includes a native application installed on an operating system of the device, wherein the executable instructions include instructions that cause the at least one processor to:

connect the native application with the browser application by generating an inter-process communication channel between the native application and the browser application, the native application storing the private key.

11. The device of claim 9, wherein the digital asset application includes a native application installed on an operating system of the device, wherein the executable instructions include instructions that cause the at least one processor to:

invoke a native operating system interface to route the notification message to the native application.

12. The device of claim 9, wherein the executable instructions include instructions that cause the at least one processor to:

receive a resource locator, associated with the web content, from a non-browser application executing on the device;

receive, from the non-browser application, a developer-defined parameter about a customization of a web interface; and initiate display of the web interface with the developer-defined parameter, the web interface including a read-only address field with the resource locator associated with the web content, the web interface displaying the web content.

13. A non-transitory computer-readable medium storing executable instructions that when executed by at least one processor cause a device to execute operations, the operations comprising:

rendering web content on the device;

inserting a programming interface in the web content, the programming interface providing an executable function for the web content, the executable function configured to cause browser application, associated with the device, to request an action of a digital asset application associated with the device, the digital asset application storing a private key for authenticating blockchain transactions of a blockchain network, the programming interface including a callback function to the web content;

in response to a user selection that triggers the executable function provided for the programming interface, detecting a transaction request from the web content;

storing a reference to the callback function at the browser application;

initiating authentication of the transaction request by the digital asset application;

transmitting the transaction request to the blockchain network;

receiving a transaction response from the blockchain network, the transaction response including a transaction identifier for a transaction added to the blockchain network;

in response to the transaction response the transaction response being received from the blockchain network, executing the callback function to update the web content with information from the transaction response, including displaying a transaction status message that includes the transaction identifier; and transmitting a notification message to the digital asset application, the notification message including the transaction identifier.

14. The non-transitory computer-readable medium of claim 13, wherein the programming interface includes a script-injected object that exposes an application programming interface to the web content via JavaScript.

15. The non-transitory computer-readable medium of claim 13, wherein the operations further comprise:

receiving an asset list from the digital asset application, the asset list identifying a plurality of digital assets available to complete the transaction request;

displaying, within the web content, a user interface object listing the plurality of digital assets;

in response to receiving a user selection of one of the plurality of digital assets, transmitting, to the digital asset application, an authentication request to authenticate transaction data of the transaction request; and receiving, from the digital asset application, an authentication response that authenticates the transaction data.

16. The non-transitory computer-readable medium of claim 13, wherein the operations further comprise:

receiving a resource locator, associated with the web content, from a non-browser application executing on the device;

receiving, from the non-browser application, a developer-defined parameter about a customization of a web interface;

initiating display of the web interface with the developer-defined parameter, the web interface including a read-only address field with the resource locator associated with the web content, the web interface displaying the web content; and in response to a user selection to dismiss the web interface, transitioning from the web interface to an interface of the non-browser application.

17. The non-transitory computer-readable medium of claim 13, wherein the operations further comprise:

connecting the digital asset application with the browser application by generating an inter-process communication channel between the digital asset application and the browser application, the digital asset application storing the private key.

* * * * *